(12) United States Patent
Nagaya

(10) Patent No.: US 7,287,611 B2
(45) Date of Patent: Oct. 30, 2007

(54) IN-WHEEL MOTOR SYSTEM

(75) Inventor: Go Nagaya, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 278 days.

(21) Appl. No.: 10/526,082

(22) PCT Filed: Aug. 29, 2003

(86) PCT No.: PCT/JP03/11027

§ 371 (c)(1),
(2), (4) Date: Feb. 28, 2005

(87) PCT Pub. No.: WO2004/020236

PCT Pub. Date: Mar. 11, 2004

(65) Prior Publication Data

US 2005/0247496 A1 Nov. 10, 2005

(30) Foreign Application Priority Data

| Aug. 29, 2002 | (JP) | ............................ 2002-251401 |
| Aug. 29, 2002 | (JP) | ............................ 2002-251425 |
| Nov. 15, 2002 | (JP) | ............................ 2002-331604 |
| Jan. 21, 2003 | (JP) | ............................ 2003-011860 |
| Jul. 15, 2003 | (JP) | ............................ 2003-196922 |

(51) Int. Cl.
  *B60K 1/00* (2006.01)
(52) U.S. Cl. .................. 180/65.5; 280/124.1; 301/6.91
(58) Field of Classification Search ............... 180/65.5; 280/124.108, 124.125, 93.512, 124.1; 301/6.91
See application file for complete search history.

(56) References Cited

U.S. PATENT DOCUMENTS

| 2,155,521 A | * | 4/1939 | Zavarella ............. 280/124.127 |
| 2,537,479 A | * | 1/1951 | Motte .......................... 180/385 |
| 4,991,698 A | * | 2/1991 | Hanson ....................... 188/380 |
| 5,438,228 A | * | 8/1995 | Couture et al. ........... 310/67 R |
| 5,468,055 A | * | 11/1995 | Simon et al. .............. 301/6.91 |
| 6,364,078 B1 | * | 4/2002 | Parison et al. .............. 188/380 |
| 2005/0056471 A1 | * | 3/2005 | Kurata |

FOREIGN PATENT DOCUMENTS

| JP | 3-31029 A | 2/1991 |
| JP | 2000-309269 A | 11/2000 |
| WO | WO95/16300 A1 | 6/1995 |

OTHER PUBLICATIONS

Okuno, JP Patent Application Publication 2005-104166 A, Apr. 21, 2005.*

* cited by examiner

*Primary Examiner*—Christopher Bottorff
(74) *Attorney, Agent, or Firm*—Sughrue Mion Pllc.

(57) ABSTRACT

An in-wheel motor system, wherein the rotating side case 3b of an in-wheel motor 3 is connected to a wheel 2 by a flexible coupling 10 comprising a plurality of hollow disk-like plates 11A to 11C and direct-acting guides 12A and 12B, the non-rotating side case 3a of the motor 3 is connected to a knuckle 5 by a damping mechanism 20 for connecting the non-rotating side case 3a of the motor to the knuckle 5 which is a frame dress-up part of the vehicle, comprising two plates 26 and 27 whose moving directions are limited to the vertical direction of the vehicle by direct-acting guides 21 and which are interconnected by first spring elements 22 which move in the vertical direction of the vehicle and dampers 25 with a spring element, each comprising a damper 23 and a second spring element connected to the damper 23 in series and arranged parallel to the first spring elements 22, whereby the drive force of the in-wheel motor 3 can be transmitted to the wheel 2 without fail and the road holding properties of a vehicle can be further improved by greatly reducing variations in the ground-contact load of a tire.

32 Claims, 58 Drawing Sheets

FIG.7

| | COMPARATIVE EXAMPLE 1 | COMPARATIVE EXAMPLE 2 | COMPARATIVE EXAMPLE 3 | COMPARATIVE EXAMPLE 4 | EXAMPLE 1 | EXAMPLE 2 | EXAMPLE 3 |
|---|---|---|---|---|---|---|---|
| TYPE | CAR MOUNTED | IWM | DD-IWM | DD-IWM | DD-IWM | DD-IWM | DD-IWM |
| k4 EQUIVALENT SPRING | — | — | — | — | + SPRING ELEMENT | + SPRING ELEMENT | + SPRING ELEMENT |
| m4 EQUIVALENT MASS | — | — | — | — | — | CYLINDER ADDED TO m4 | CYLINDER ADDED TO m4 |
| DYNAMIC DAMPER PORTION | — | — | — | k3 STRONG SPRING | C3 CHANGED | C3 CHANGED | C3, k3 CHANGED |
| MOTOR (kg) | 30 | 30 | 30 | 30 | 30 | 30 | 30 |
| FRAME DRESS-UP PART (kg) | 40 | 40 | 45 | 45 | 45 | 40 | 40 |
| DAMPER MASS (kg) | — | — | 30 | 30 | 30 | 30 | 30 |
| m1 (kg) | 40 | 70 | 45 | 45 | 45 | 40 | 40 |
| m2 (kg) | 370 | 340 | 340 | 340 | 340 | 340 | 340 |
| m3 (kg) | — | — | 30 | 30 | 30 | 30 | 30 |
| m4 (kg) | — | — | — | — | — | 5 | 5 |
| k1 (N/m) | 360000 | 360000 | 360000 | 360000 | 360000 | 360000 | 360000 |
| k2 (N/m) | 32000 | 32000 | 32000 | 32000 | 32000 | 32000 | 32000 |
| k3 (N/m) | — | — | 41000 | 90000 | 41000 | 41000 | 27000 |
| k4 (N/m) | — | — | — | — | 110000 | 110000 | 110000 |
| c1 (N/(m/s)) | 50 | 50 | 50 | 50 | 50 | 50 | 50 |
| c2 (N/(m/s)) | 1500 | 1500 | 1500 | 1500 | 1500 | 1500 | 1500 |
| c3 (N/(m/s)) | — | — | 1000 | 1000 | 600 | 600 | 800 |

FIG.8(a) PRIOR ART
FIG.8(b) PRIOR ART
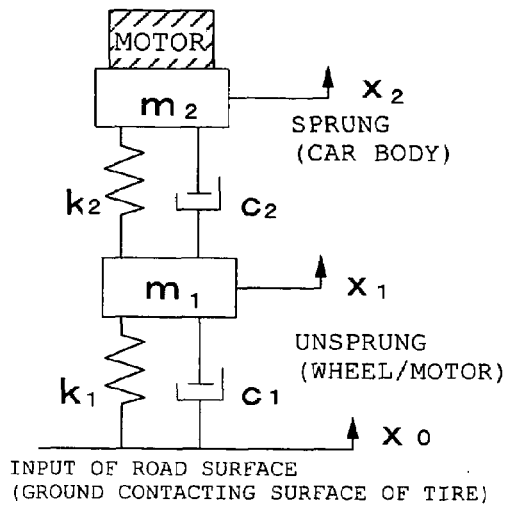
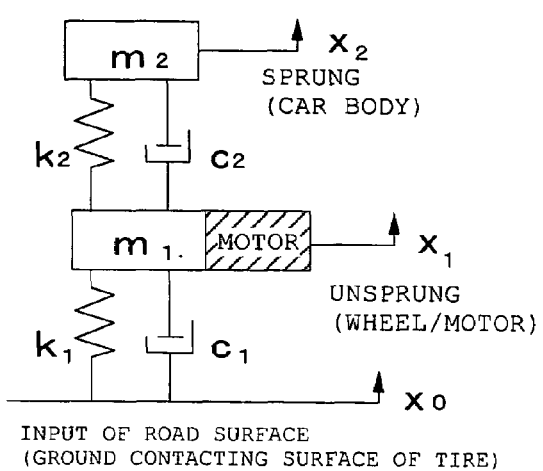
FIG.9 PRIOR ART
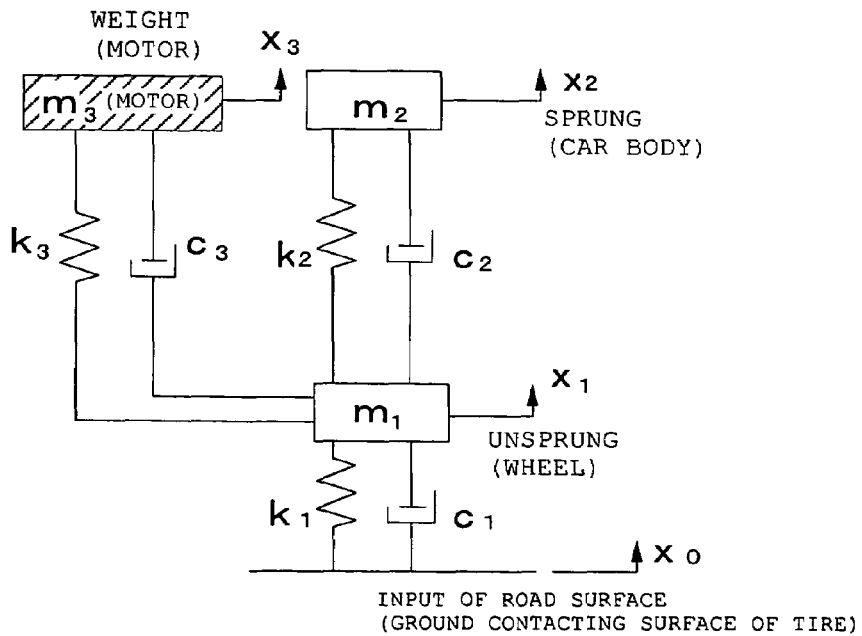

FIG.13

| TYPE | COMPARATIVE EXAMPLE 1 | COMPARATIVE EXAMPLE 2 | COMPARATIVE EXAMPLE 3 | COMPARATIVE EXAMPLE 4 | EXAMPLE 1 | EXAMPLE 2 | EXAMPLE 3 |
|---|---|---|---|---|---|---|---|
| | CAR MOUNTED | 1WM | DD-1WM | DD-1WM | DD-1WM | DD-1WM | DD-1WM |
| k4 EQUIVALENT SPRING | — | — | — | — | + SPRING ELEMENT | + SPRING ELEMENT | + SPRING ELEMENT |
| m4 EQUIVALENT MASS | — | — | — | — | — | CYLINDER ADDED TO m4 | CYLINDER ADDED TO m4 |
| DYNAMIC DAMPER PORTION | | | | k3 STRONG SPRING | c3 CHANGED | c3 CHANGED | c3, k3 CHANGED |
| MOTOR (kg) | 30 | 30 | 30 | 30 | 30 | 30 | 30 |
| FRAME DRESS-UP PART (kg) | 40 | 40 | 45 | 45 | 45 | 40 | 40 |
| DAMPER MASS (kg) | — | — | 30 | 30 | 30 | 30 | 30 |
| m1 (kg) | 40 | 70 | 45 | 45 | 45 | 40 | 40 |
| m2 (kg) | 370 | 340 | 340 | 340 | 340 | 340 | 340 |
| m3 (kg) | — | — | 30 | 30 | 30 | 30 | 30 |
| m4 (kg) | — | — | — | — | — | 5 | 5 |
| k1 (N/m) | 673000 | 673000 | 673000 | 673000 | 673000 | 673000 | 673000 |
| k2 (N/m) | 100000 | 100000 | 100000 | 100000 | 100000 | 100000 | 100000 |
| k3 (N/m) | — | — | 60000 | 120000 | 60000 | 60000 | 40000 |
| k4 (N/m) | — | — | — | — | 150000 | 150000 | 150000 |
| c1 (N/(m/s)) | 50 | 50 | 50 | 50 | 50 | 50 | 50 |
| c2 (N/(m/s)) | 1200 | 1200 | 1200 | 1200 | 1200 | 1200 | 1200 |
| c3 (N/(m/s)) | — | — | 1100 | 1100 | 1200 | 1200 | 900 |

FIG. 22

| | COMPARATIVE EXAMPLE 1 | COMPARATIVE EXAMPLE 2 | COMPARATIVE EXAMPLE 3 | EXAMPLE 1 | EXAMPLE 2 |
|---|---|---|---|---|---|
| m3 MASS (MOTOR MASS) | — | — | MOTOR | MOTOR+CYLINDER | MOTOR |
| c 3 EQUIVALENT DAMPING | — | — | — | STRONG | WEAK |
| c 4 EQUIVALENT DAMPING | — | — | — | WEAK | STRONG |
| k 4 EQUIVALENT SPRING | — | — | — | STRONG | WEAK |
| m4 EQUIVALENT MASS | — | — | — | — | CYLINDER |
| UNSPRUNG MASS m1 (kg) | 40 | 70 | 45 | 40 | 40 |
| SPRUNG MASS m1 (kg) | 370 | 340 | 340 | 340 | 340 |
| MASS m3 (kg) OF DYNAMIC DAMPER (MOTOR) | — | — | 30 | 35 | 30 |
| CYLINDER MASS m4 (kg) | — | — | — | — | 5 |
| TIRE LONGITUDINAL SPRING k 1 (N/m) | 360000 | 360000 | 360000 | 360000 | 360000 |
| CAR SUSPENSION SPRING k 2 (N/m) | 32000 | 32000 | 32000 | 32000 | 32000 |
| MOTOR SUPPORTING SPRING k 3 (N/m) | — | — | 41000 | 41000 | 30000 |
| DAMPER SUPPORTING SPRING k 4 (N/m) | — | — | — | 170000 | 120000 |
| TIRE DAMPING c 1 (N/(m/s)) | 50 | 50 | 50 | 50 | 50 |
| SUSPENSION DAMPING c 2 (N/(m/s)) | 1500 | 1500 | 1500 | 1500 | 1500 |
| DAMPER ① c 3 (N/(m/s)) FOR DYNAMIC DAMPER | — | — | 1000 | 1000 | 200 |
| DAMPER ② c 4 (N/(m/s)) FOR DYNAMIC DAMPER | — | — | — | 500 | 900 |

FIG.23(a) PRIOR ART    FIG.23(b) PRIOR ART
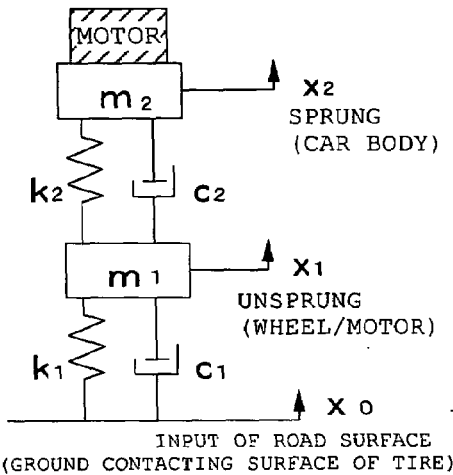
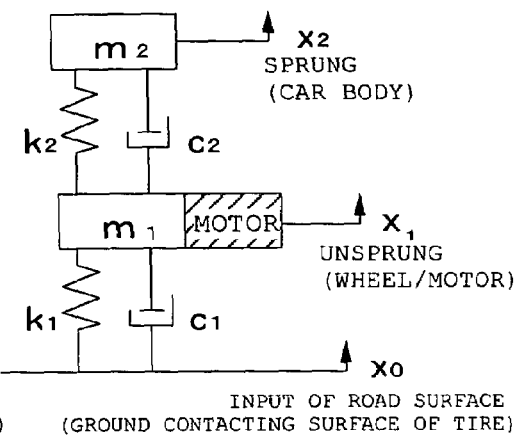
FIG.24 PRIOR ART
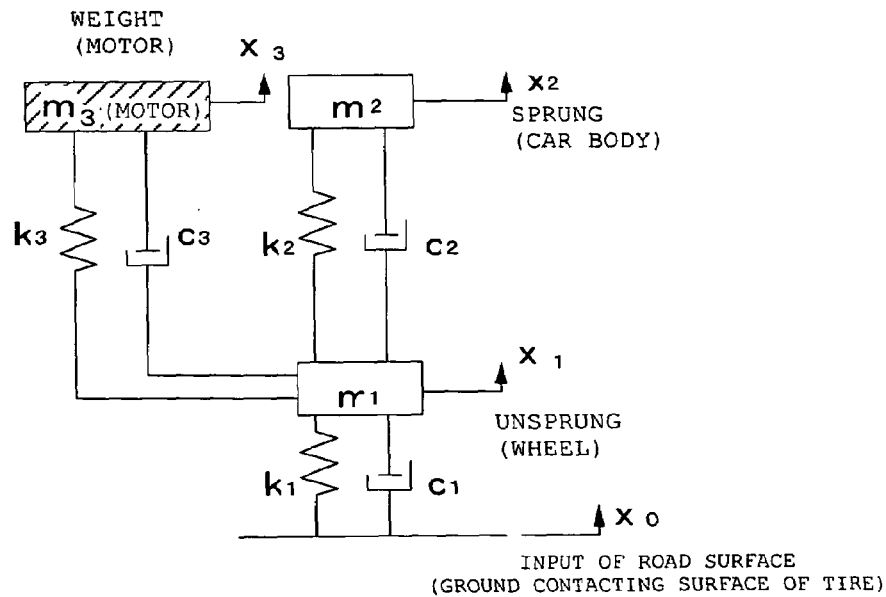

FIG.39

| TYPE | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 |
|---|---|---|---|---|---|---|---|
| MOTOR SUPPORTING METHOD | CAR MOUNTED | IWM | DD-IWM | DD-IWM | DD-IWM | DD-IWM | DD-IWM |
|  |  |  | k3, c3 | k3, D1 | k3, D1 CYLINDER ADDED TO m5 | k3, D2 | k3, D2 CYLINDER ADDED TO m4, m5 |
| m1 (kg) | 40 | 70 | 40 | 40 | 40 | 40 | 40 |
| m2 (kg) | 350 | 300 | 300 | 300 | 300 | 300 | 300 |
| m3 (kg) | — | — | 32 | 32 | 30 | 32 | 30 |
| m4 (kg) | — | — | — | — | — | — | 1 |
| m5 (kg) | — | — | — | — | 2 | — | 1 |
| k1 (N/m) | 360000 | 360000 | 360000 | 360000 | 360000 | 360000 | 360000 |
| k2 (N/m) | 32000 | 32000 | 32000 | 32000 | 32000 | 32000 | 32000 |
| k3 (N/m) | — | — | 39200 | 140000 | 210000 | 90000 | 120000 |
| k4 (N/m) | — | — | — | — | — | 120000 | 90000 |
| k5 (N/m) | — | — | — | 40000 | 40000 | 40000 | 40000 |
| c1 (N/(m/s)) | 50 | 50 | 50 | 50 | 50 | 50 | 50 |
| c2 (N/(m/s)) | 1500 | 1500 | 1500 | 1500 | 1500 | 1500 | 1500 |
| c3 (N/(m/s)) | — | — | 1000 | 300 | — | 700 | 500 |
| c4 (N/(m/s)) | — | — | — | — | — | 50 | 50 |
| c5 (N/(m/s)) | — | — | — | 1500 | 1700 | 1500 | 1500 |

D1 ; COMPOSITE CONNECTION DAMPER, D2 ; SECOND COMPOSITE CONNECTION DAMPER

FIG.40(a) PRIOR ART
FIG.40(b) PRIOR ART
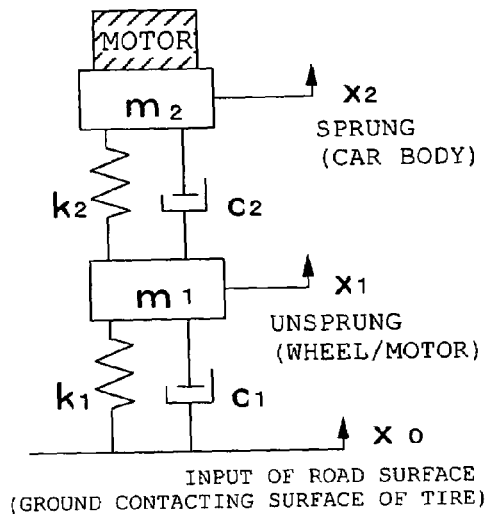
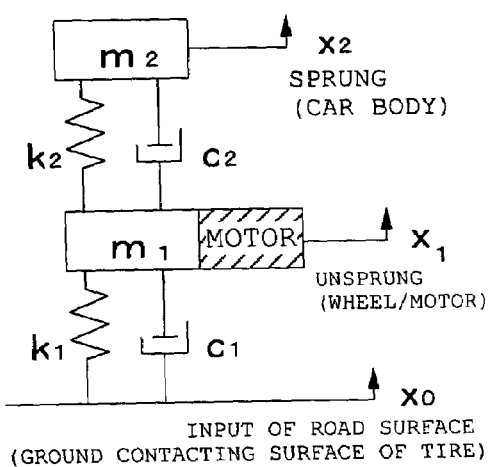
FIG.41 PRIOR ART
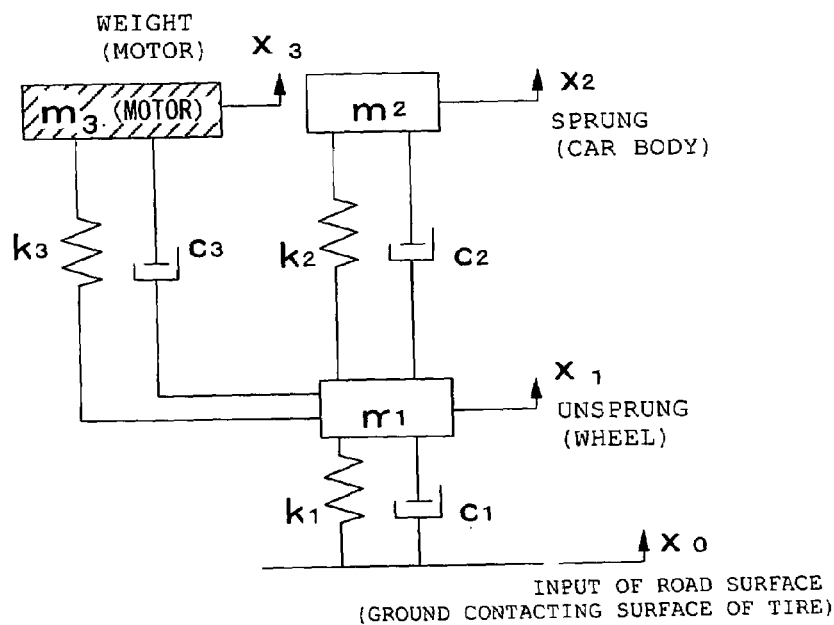

FIG. 48

| TYPE | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 |
|---|---|---|---|---|---|---|---|
| MOTOR SUPPORTING METHOD | CAR MOUNTED | IWM | DD-IWM k3, c3 | DD-IWM k3, D1 | DD-IWM k3, D1 CYLINDER ADDED TO m5 | DD-IWM k3, D2 | DD-IWM k3, D2 CYLINDER ADDED TO m4, m5 |
| m1 (kg) | 40 | 70 | 40 | 40 | 40 | 40 | 40 |
| m2 (kg) | 350 | 300 | 300 | 300 | 300 | 300 | 300 |
| m3 (kg) | — | — | 32 | 32 | 30 | 32 | 30 |
| m4 (kg) | — | — | — | — | — | — | 1 |
| m5 (kg) | — | — | — | — | 2 | — | 1 |
| k1 (N/m) | 670000 | 670000 | 670000 | 670000 | 670000 | 670000 | 670000 |
| k2 (N/m) | 100000 | 100000 | 100000 | 100000 | 100000 | 100000 | 100000 |
| k3 (N/m) | — | — | 60000 | 140000 | 450000 | 400000 | 400000 |
| k4 (N/m) | — | — | — | — | — | 60000 | 60000 |
| k5 (N/m) | — | — | — | 100000 | 60000 | 40000 | 40000 |
| c1 (N/(m/s)) | 50 | 50 | 50 | 50 | 50 | 50 | 50 |
| c2 (N/(m/s)) | 1200 | 1200 | 1200 | 1200 | 1200 | 1200 | 1200 |
| c3 (N/(m/s)) | — | — | 1100 | 1200 | — | 1200 | 1200 |
| c4 (N/(m/s)) | — | — | — | — | — | 50 | 50 |
| c5 (N/(m/s)) | — | — | — | 2000 | 2200 | 1700 | 1700 |

D1 : COMPOSITE CONNECTION DAMPER, D2 : SECOND COMPOSITE CONNECTION DAMPER

IN-WHEEL MOTOR SYSTEM

BACKGROUND OF THE INVENTION

1. Field of the Invention

The present invention relates to an in-wheel motor system for use in vehicles having direct-drive wheels as drive wheels.

2. Description of the Prior Art

In recent years, in a vehicle driven by a motor such as an electric car, an in-wheel motor system which incorporates a motor in wheels is being employed due to its high space efficiency and drive force transmission efficiency. The in-wheel motor of the prior art has a structure that a motor portion is fixed to a spindle shaft connected to a part called "upright" or "knuckle" which is a frame dress-up part of the vehicle so that a motor rotor and a wheel can turn. FIG. 72 shows the constitution of an in-wheel motor 80 disclosed by JP-A 9-506236 (the term "JP-A" as used herein means an "unexamined published Japanese patent application"). In this in-wheel motor 80, a rotor 80R having magnet means (permanent magnet) 80M is installed in a housing 82 fixed to a wheel 81, a stator 80S having a coil 80C is mounted on the inner side of the above magnet means 80M and fixed to a hollow shaft 84 connected to a knuckle 83, and the inner and outer side walls 82a and 82b of the above housing 82 are linked to the above stator 80S by bearings 84a and 84b, respectively, so that the rotor 80R can turn round the stator 80S.

In general, in a vehicle having a suspension mechanism such as a spring around its legs, it is known that as the mass of unsprung parts such as a wheel, knuckle and suspension arm so called "unsprung mass" increases, variations in the ground-contact load of a tire become larger and the road holding properties become worse when the vehicle runs on a rough road.

In the in-wheel motor of the prior art, as the motor portion is fixed to the spindle shaft connected to a part called "upright" or "knuckle" which is a frame dress-up part of the vehicle as described above, the above unsprung mass increases by the mass of the in-wheel motor with the result that variations in the ground-contact force of each tire become larger and the road holding properties become worse.

To solve the above problems, as shown in FIG. 73, there is proposed an in-wheel motor system in which a rotating side case 3b for supporting the rotor 3R of a hollow in-wheel motor 3 and a wheel 2 are interconnected by a flexible coupling 10 comprising a plurality of hollow disk-like plates 11A to 11C and direct-acting guides 12A and 12B mounted to the front and rear sides of the center hollow disk-like plate 11B in such a manner that their moving directions cross each other, and a non-rotating side case 3a for supporting a stator 3S and a knuckle 5 are interconnected by a damping mechanism 90 comprising a damper 92 mounted to a direct-acting guide 91 for guiding in the vertical direction of the vehicle and a spring member 93 which is connected to the damper 92 in parallel and expands and contracts in the moving direction of the above direct-acting guide 91 or a damping mechanism 20K comprising two plates 26 and 27 whose moving directions are limited to the vertical direction of the vehicle by direct-acting guides 21 and which are interconnected by spring elements 22 and a damper 23 moving in the vertical direction of the vehicle as shown in FIG. 74 (for example, see the pamphlet of WO02/83446).

Since the in-wheel motor 3 can be float mounted to the knuckle 5 which is a frame dress-up part of the vehicle due to this constitution, the motor shaft and the wheel shaft can be moved separately in the radial direction. That is, as the mass of the motor is separated from an unsprung mass corresponding portion of the vehicle and serves as the weight of a so-called "dynamic damper", a dynamic damper effect is added without increasing the unsprung mass. Therefore, variations in the ground-contact load of the tire are greatly reduced and the road holding properties of the vehicle are greatly improved.

However, it cannot be said that the above constitution in which the in-wheel motor 3 is supported by the damper 92 and the spring member 93 which are connected to each other in parallel in the vertical direction is always satisfactory as compared with the constitution of the prior art in which the in-wheel motor 80 is mounted to an unsprung mass corresponding portion because variations in ground-contact load at a frequency near the unsprung resonance frequency are not fully reduced though variations in the ground-contact load of the tire are greatly reduced.

It is an object of the present invention to provide an in-wheel motor system which is excellent in road holding properties by further improving a structure for applying the mass of a motor as the weight of a dynamic damper.

SUMMARY OF THE INVENTION

According to a first aspect of the present invention, there is provided an in-wheel motor system in which an in-wheel motor, installed in a wheel portion, for driving a wheel is mounted to an unsprung portion of a vehicle by a damping member or a damping unit, wherein the motor is mounted to the unsprung portion of the vehicle by a damping member comprising a plurality of shock absorbers, each having a spring element and a damper element connected to the spring element in parallel or a damping member comprising either one or more of at least one damper with a spring element, each comprising a spring element and a damper element connected to the spring element in series and at least one composite connection damper whose spring element and damper element connected in parallel are connected to a spring element in series.

The unsprung portion of the vehicle is a frame dress-up part such as a wheel, knuckle or suspension arm.

According to a second aspect of the present invention, there is provided an in-wheel motor system, wherein the motor is a hollow motor.

According to a third aspect of the present invention, there is provided an in-wheel motor system, wherein the motor is supported to the unsprung portion of the vehicle in the vertical direction by spring elements (to be referred to as "first spring elements" hereinafter) and dampers with a spring element, each comprising a spring element (second spring element) and a damper element (second damper element) connected to the spring element in series.

According to a fourth aspect of the present invention, there is provided an in-wheel motor system, wherein the stator side of the motor is supported to a knuckle by the first spring elements in the vertical direction, and the stator side and the unsprung portion of the vehicle are interconnected by dampers with a spring element, each comprising the second spring element and the second damper element connected to the spring element in series and arranged parallel to the first spring elements.

According to a fifth aspect of the present invention, there is provided an in-wheel motor system, wherein the motor is supported by springs and dampers with a spring element in the horizontal direction in addition to the vertical direction.

According to a sixth aspect of the present invention, there is provided an in-wheel motor system, wherein the motor is supported to the unsprung portion in the vertical direction by the first spring elements, a first damper element and a damper with a spring element, comprising a second spring element and a second damper element connected to the second spring element in series.

According to a seventh aspect of the present invention, there is provided an in-wheel motor system, wherein the stator side of the motor is supported to the knuckle by the first spring elements and the first damper element arranged parallel to each other in the vertical direction, and the stator side and the unsprung portion are interconnected by a damper with a spring element, comprising a second spring element and a second damper element connected to the second spring element in series and arranged parallel to the first spring elements and the first damper element.

According to an eighth aspect of the present invention, there is provided an in-wheel motor system, wherein the motor is supported by springs, dampers and dampers with a spring element in the horizontal direction in addition to the vertical direction.

According to a ninth aspect of the present invention, there is provided an in-wheel motor system, wherein the cylinder body of the damper with a spring element is connected in series between the damper element (second damper element) and the spring element (second spring element) constituting the damper with a spring element.

According to a tenth aspect of the present invention, there is provided an in-wheel motor system, wherein the spring element (second spring element) constituting the damper with a spring element is a metal spring, air spring or rubber spring.

According to an eleventh aspect of the present invention, there is provided an in-wheel motor system, wherein the spring element (second spring element) constituting the damper with a spring element is mounted on both sides in the axial direction of the piston of the damper with a spring element.

According to a twelfth aspect of the present invention, there is provided an in-wheel motor system, wherein the motor is supported to the unsprung portion of the vehicle in the vertical direction by a composite connection damper whose spring element and damper element connected in parallel are connected to a spring element in series.

According to a thirteenth aspect of the present invention, there is provided an in-wheel motor system, wherein the motor is supported to the unsprung portion of the vehicle in the vertical direction by the composite connection damper and a damper element arranged parallel to the composite connection damper.

According to a fourteenth aspect of the present invention, there is provided an in-wheel motor system, wherein the composite connection damper is used as a first composite connection damper, a composite connection damper whose spring element and damper element connected in parallel are connected to a damper element in series is used as a second composite connection damper, and the motor is supported to the unsprung portion of the vehicle in the vertical direction by the first composite connection damper and the second composite connection damper.

According to a fifteenth aspect of the present invention, there is provided an in-wheel motor system, wherein the cylinder body of the damper element arranged parallel to the spring element is interposed between the damper element connected to the damper element and spring element of the second composite connection damper in series and the spring element.

According to a sixteenth aspect of the present invention, there is provided an in-wheel motor system, wherein the cylinder body of the damper element is situated at the other end of the spring element arranged parallel to the damper element of the composite connection damper.

According to a seventeenth aspect of the present invention, there is provided an in-wheel motor system, wherein the spring element constituting the composite connection damper is a metal spring, air spring or rubber spring.

According to an eighteenth aspect of the present invention, there is provided an in-wheel motor system, wherein the motor is supported by a damper and the composite connection damper, or a plurality of the composite connection dampers in the horizontal direction in addition to the vertical direction.

According to a nineteenth aspect of the present invention, there is provided an in-wheel motor system, wherein the plurality of shock absorbers include at least two shock absorbers which differ from each other in one or both of direction and damping factor.

According to a twentieth aspect of the present invention, there is provided an in-wheel motor system, wherein the movable end of at least one of the shock absorbers is connected to the motor side and the fixed end thereof is connected to the unsprung side of the vehicle, the movable end of at least one of the other shock absorbers is connected to the unsprung side of the vehicle and the fixed end thereof is connected to the motor side.

According to a twenty-first aspect of the present invention, there is provided an in-wheel motor system, wherein the shock absorber is composed of a hydraulic unit having a spring, piston and hydraulic cylinder.

According to a twenty-second aspect of the present invention, there is provided an in-wheel motor system, wherein the piston upper chamber and piston lower chamber of the hydraulic cylinder of a shock absorber whose movable end is connected to the motor side are connected to the piston upper chamber and piston lower chamber of the hydraulic cylinder of a shock absorber whose movable end is connected to the unsprung side by working oil flow passages having an independent valve, respectively.

According to a twenty-third aspect of the present invention, there is provided an in-wheel motor system comprising an in-wheel motor for driving a wheel, which is installed in a wheel portion and mounted to an unsprung portion of a vehicle by a damping member or damping unit, wherein a motor rotor and a wheel are interconnected by a plurality of cross guides which are arranged in the circumferential direction of the rotor at equal intervals and whose moving directions cross each other on the front and rear sides.

According to a twenty-fourth aspect of the present invention, there is provided an in-wheel motor system, wherein the cross guides are arranged such that the moving directions of all the motor side guide rails of the cross guides become 45° from the radial direction of the motor rotor and the moving directions of all the wheel side guide rails become perpendicular to the moving directions of the motor side guide rails.

According to a twenty-fifth aspect of the present invention, there is provided an in-wheel motor system, wherein one or more elastic annular dust boots are installed between the motor and the wheel to block a space formed between the motor and the wheel from the outside.

According to a twenty-sixth aspect of the present invention, there is provided an in-wheel motor system, wherein the rotating side case of the motor and the wheel are interconnected by a flexible coupling, and the annular dust boot is mounted between the end portion on a side opposite to the flexible coupling mounting side of the rotating side case of the motor and the end opposite to the above end of the wheel.

According to a twenty-seventh aspect of the present invention, there is provided an in-wheel motor system, wherein an annular dust boot is provided to block the coupling portion of the flexible coupling from the outside.

According to a twenty-eighth aspect of the present invention, there is provided an in-wheel motor system, wherein the annular dust boot has a wavy sectional form in a direction perpendicular to the axis.

According to a twenty-ninth aspect of the present invention, there is provided an in-wheel motor system, wherein a plurality of holes are formed in the vicinity of the wheel side mounting portion of the annular dust boot.

According to a thirtieth aspect of the present invention, there is provided an in-wheel motor system, wherein a hollow disk-like partition which can move in the axial direction of the motor is provided on the exterior side of a motor bearing for connecting the rotating side case and the non-rotating side case of the motor.

According to a thirty-first aspect of the present invention, there is provided an in-wheel motor system, wherein a hollow portion is formed in bearing fixing covers mounted to the exterior side of the motor bearing and the hollow disk-like partition is stored in the hollow portion.

According to a thirty-second aspect of the present invention, there is provided an in-wheel motor system, wherein the space in the radial direction between the hollow disk-like partition and the bearing fixing cover on the rotation side is made larger than the space in the radial direction between the hollow disk-like partition and the bearing fixing cover on the non-rotation side.

BRIEF DESCRIPTION OF THE DRAWINGS

FIG. 7 is a table showing parameters indicative of the characteristic properties in the vertical direction of vehicles;

FIGS. 8(a) and 8(b) are diagrams showing vehicle vibration models (variations in ground-contact load) in the in-wheel motor systems of the prior art;

FIG. 9 is a diagram showing a vehicle vibration model (variations in ground-contact load) in the dynamic damper type in-wheel motor system of the prior art;

FIG. 13 is a table showing parameters indicative of the characteristic properties in the horizontal direction of vehicles;

FIG. 22 is a table showing parameters indicative of the characteristic properties in the vertical direction of vehicles;

FIGS. 23(a) and 23(b) are diagrams showing vehicle vibration models (variations in ground-contact load) in the in-wheel motor systems of the prior art;

FIG. 24 is a diagram showing a vehicle vibration model (variations in ground-contact load) in the dynamic damper type in-wheel motor system of the prior art;

FIG. 39 is a table showing parameters indicative of the characteristic properties in the vertical direction of vehicles;

FIGS. 40(a) and 40(b) are diagrams showing vehicle vibration models (variations in ground-contact load) in the in-wheel motor systems of the prior art;

FIG. 41 is a diagram showing a vehicle vibration model (variations in ground-contact load) in the dynamic damper type in-wheel motor system of the prior art;

FIG. 48 is a table showing parameters indicative of the characteristic properties in the horizontal direction of vehicles;

DETAILED DESCRIPTION OF THE PREFERRED EMBODIMENT

Preferred embodiments of the present invention will be described hereinunder with reference to the accompanying drawings.

Embodiment 1

Figure 1:
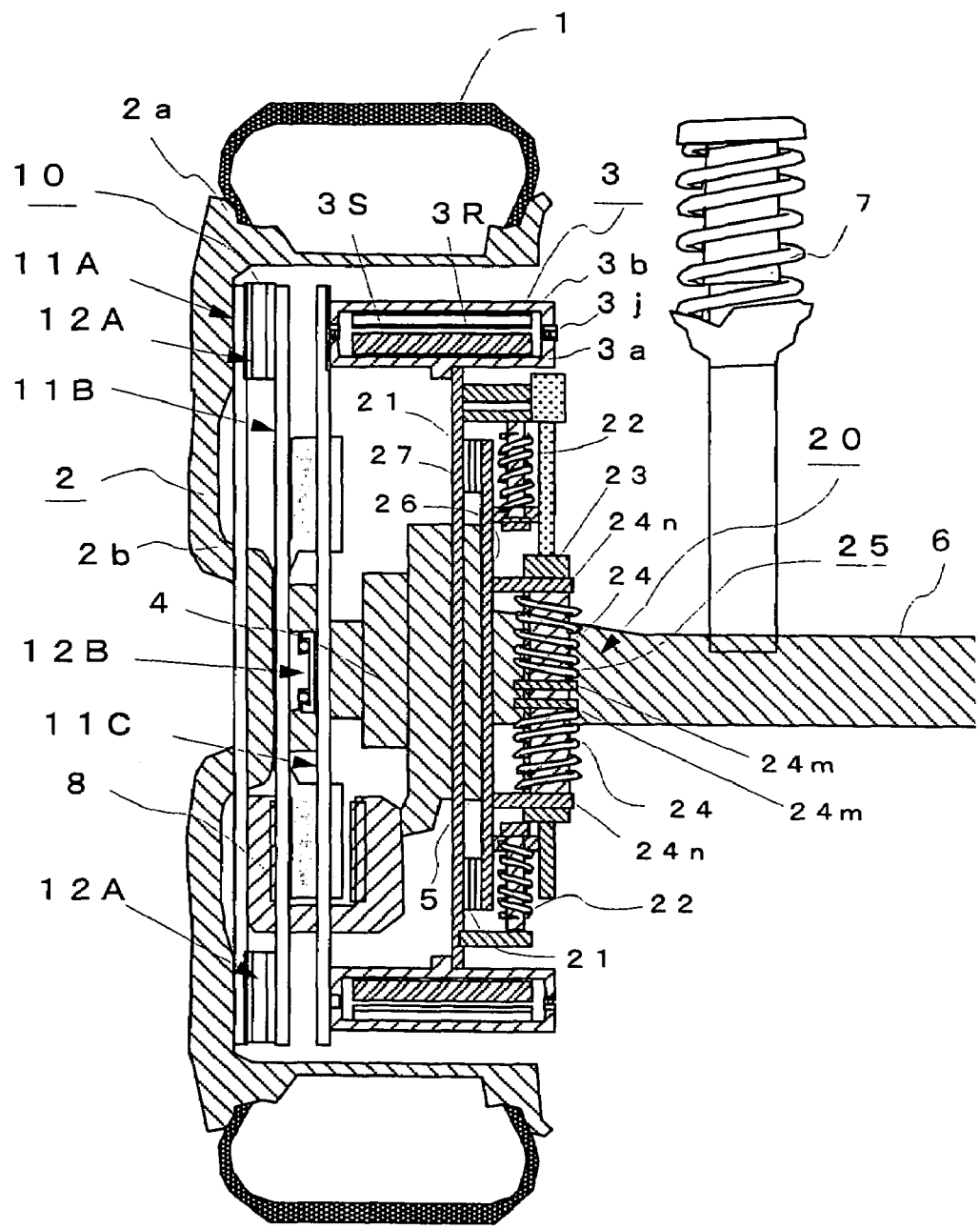
FIG. 1 is a longitudinal sectional view showing the constitution of an in-wheel motor system according to Embodiment 1 of the present invention.

FIG. 1 is a diagram showing the constitution of an in-wheel motor system according to Embodiment 1. In FIG. 1, reference numeral 1 denotes a tire, 2 a wheel composed of a rim 2a and a wheel disk 2b, and 3 an outer rotor type in-wheel motor comprising a motor stator (to be referred to as "stator" hereinafter) 3S fixed to a non-rotating side case 3a installed on an inner side in the radial direction and a motor rotor (to be referred to as "rotor" hereinafter) 3R fixed to a rotating side case 3b rotatably connected to the above non-rotating side case 3a by a bearing 3j and installed on an outer side in the radial direction.

Numeral 4 denotes a hub portion connected to the rotary shaft of the wheel 2, 5 a knuckle connected to an axle 6, 7 a suspension member composed of a shock absorber or the like, 8 a brake unit mounted to the above hub portion 4, 10 a flexible coupling comprising a plurality of hollow disk-like plates 11A to 11C and direct-acting guides 12A and 12B for interconnecting the adjacent plates 11A and 11B and the adjacent plates 11B and 11C and guiding the above adjacent plates 11A and 11B and the adjacent plates 11B and 11C in the radial direction of the disk, and 20 a damping mechanism for connecting the non-rotating side case 3a of the motor 3 to the knuckle 5 which is a frame dress-up part of the vehicle, comprising two plates 26 and 27 whose moving directions are limited to the vertical direction of the vehicle by direct-acting guides 21 and which are interconnected by first spring elements 22 movable in the vertical direction of the vehicle and dampers 25 with a spring element, each comprising a damper 23 and a second spring element 24 connected to the damper 23 in series and arranged parallel to the first spring elements 22.

Figure 2:
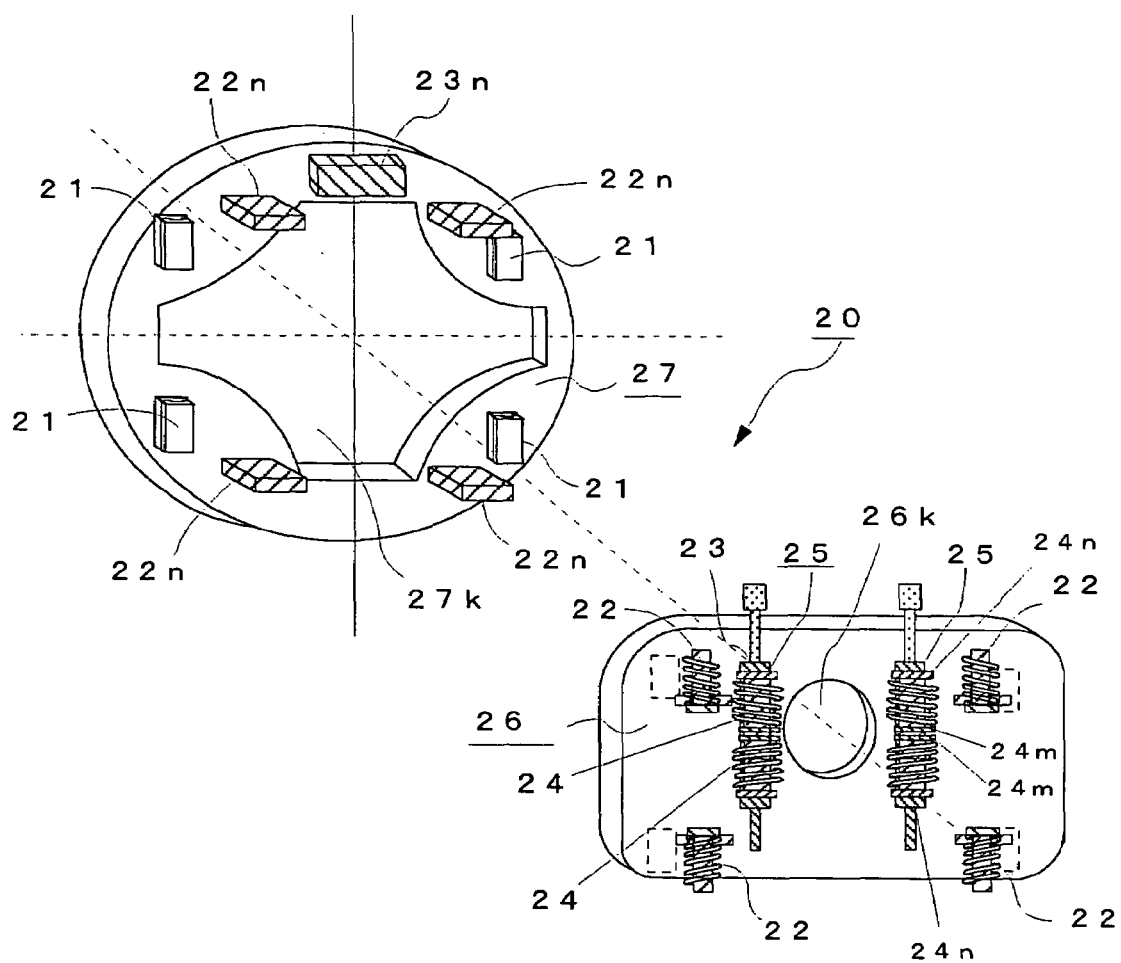
FIG. 2 is a diagram showing the constitution of a damping mechanism according to Embodiment 1.
Figure 3:
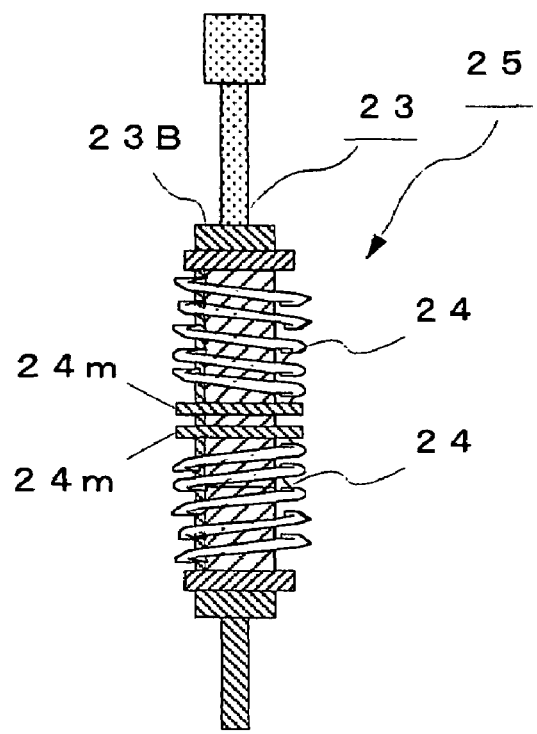
FIG. 3 is a diagram showing the constitution of a damper with a spring element according to Embodiment 1.

As shown in FIG. 2, the above damping mechanism 20 is linked to the axle 6 connected to the knuckle 5, the first spring elements 22 which expand and contract in the vertical direction of the vehicle are installed in the four corners of the first plate (to be referred to as "knuckle attachment plate" hereinafter) 26 positioned on the suspension member 7 side, the dampers 25 with a spring element for connecting the damper 23 which expand and contract in the vertical direction of the vehicle and the second spring element 24 in series are installed on both sides of a connection hole 26k for the axle 6 formed in the center of the first plate 26, spring receivers 22n are set at positions above or below the first spring elements 22 of the plate 27 (to be referred to as "motor attachment plate" hereinafter) on the motor 3 side, a damper attachment portion 23n is installed at a position above the dampers 25, that is, a position above a connection hole 27k for the axle 6, and the above plates 26 and 27 are interconnected by the four direct-acting guides 21 arranged symmetrical to the center of the plate.

Figure 73:
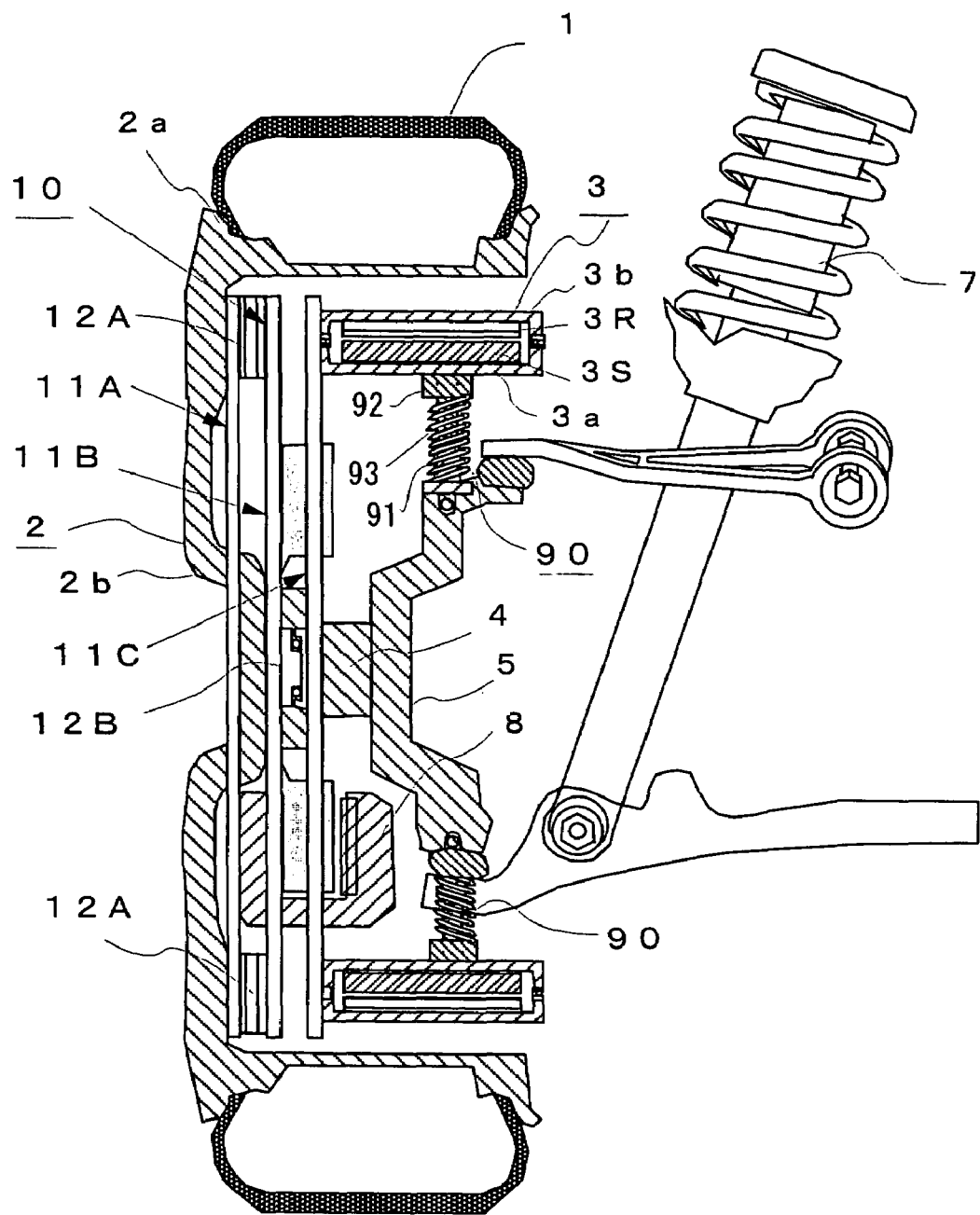
FIG. 73 is a diagram showing the constitution of a dynamic damper type in-wheel motor of the prior art.

In the in-wheel motor system of the prior art shown in FIG. 73, the non-rotating side case 3a for supporting the stator 3S is supported to the knuckle 5 or in the vertical direction by the damper 92 and the spring member 93 arranged parallel to each other. In this embodiment, as described above, the above non-rotating side case 3a is supported to the knuckle 5 in the vertical direction by the first spring elements 22 and the dampers 25 with a spring element, each comprising the damper 23 and the second spring element 24 connected to the damper 23 in series, thereby changing the timing of generating damping force. Therefore, variations in ground-contact load at a frequency near the unsprung resonance frequency can be further reduced as compared with the above prior art and therefore, the road holding properties of the vehicle can be further improved.

The above second spring element 24 is specifically a metal spring, one end thereof is attached to a spring attachment portion 24m formed almost at the center of the cylinder body (damper body) 23B of the damper 23, and the other end thereof is attached to a spring receiving portions 24n installed on the above knuckle attachment plate 26. In the above in-wheel motor system of the prior art, as the relatively heavy cylinder of the damper 92 for supporting the motor 3 is fixed to an unsprung portion (knuckle 5), the unsprung mass slightly increases. In this embodiment, as the above cylinder body 23B is interposed between the above damper 23 and the above second spring element 24 in series, the above heavy cylinder body 23B can be separated from the unsprung mass by the above second spring element 24. Therefore, the unsprung mass can be further reduced and the road holding properties of the vehicle can be further improved.

In this Embodiment 1, the rotating side case 3b of the motor 3 is connected by the flexible coupling 10 comprising the plurality of hollow disk-like plates 11A to 11C and the direct-acting guides 12A and 12B for guiding the adjacent plates 11A and 11B and the adjacent plates 11B and 11C in the radical direction of the disk, and the non-rotating side case 3a of the motor 3 is connected by the damping mechanism 20 for connecting the non-rotating side case 3a of the motor 3 to the knuckle 5 which is a frame dress-up part of the vehicle, comprising two plates 26 and 27 whose moving directions are limited to the vertical direction of the vehicle by the direct-acting guides 21 and which are interconnected by the first spring elements 22 movable in the vertical direction of the vehicle and the dampers 25 with a spring element, each comprising the damper 23 and the second spring element 24 connected to the damper 23 in series and arranged parallel to the first spring elements 22. Therefore, the drive force of the motor 3 can be transmitted to the wheel 2 without fail and the road holding properties of the vehicle can be further improved by significantly reducing variations in the ground-contact load of the tire without increasing the unsprung mass.

Figure 4:
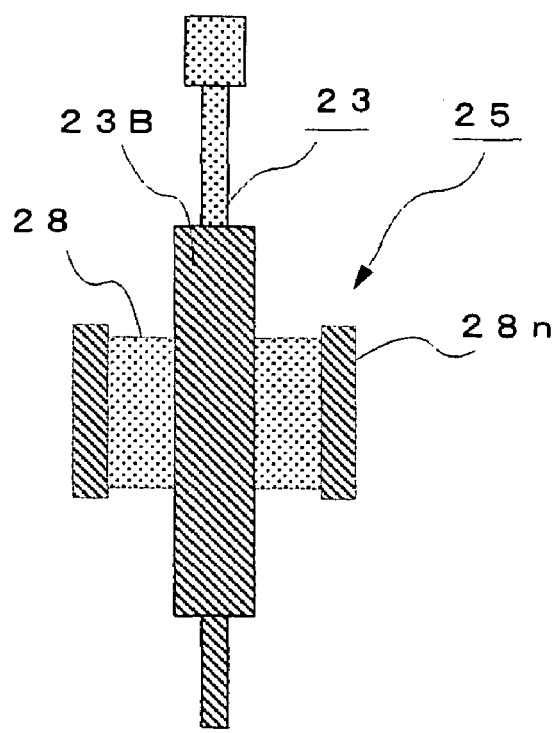
FIG. 4 is a diagram showing another example of the damper with a spring element.

In the above Embodiment 1, the above second spring element 24 is a metal spring. It is not limited to the metal spring and may be an air spring or bush-like object (rubber bush 28 in FIG. 4) made of rubber as shown in FIG. 4 which is attached to a bush attachment portion 28n to support the above cylinder body 23B.

The same effect can be obtained when the above second spring element 24 is interposed between the damper 23 and the non-rotating side case 3a of the motor 3 or between the damper 23 and an unsprung portion, or installed on the unshown piston side attachment portion or cylinder side attachment portion of the damper 23.

Figure 5A:
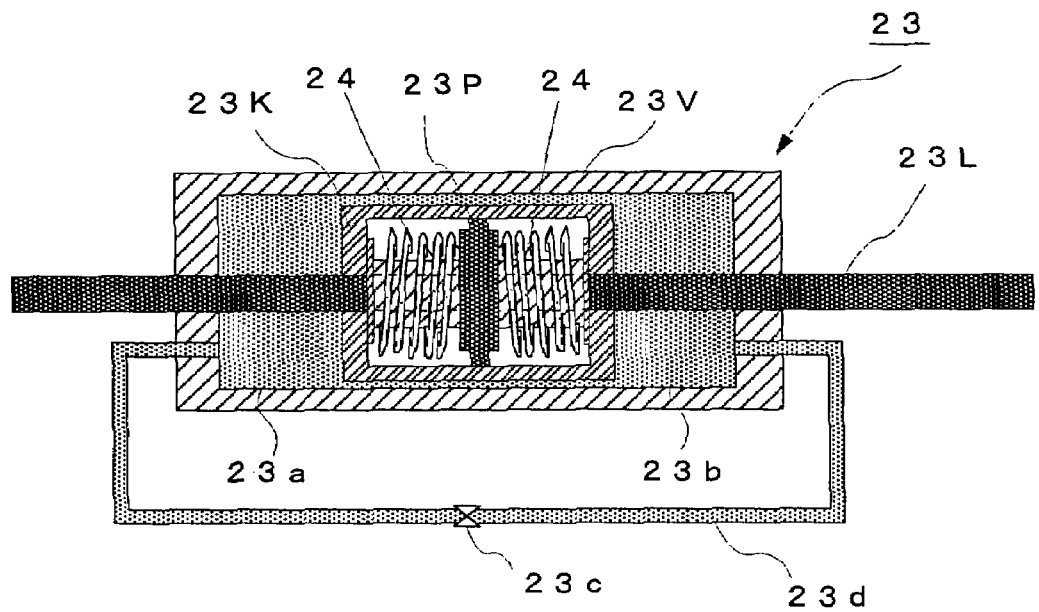
FIGS. 5(a) and 5(b) are diagrams showing still other examples of the damper with a spring element.

Alternatively, as shown in FIG. 5(a), the second spring element 24 may be mounted on a piston 23P in the damper 23. More specifically, a free piston 23K is installed in a hydraulic cylinder 23V, the piston 23P connected to a damper rod 23L is stored in this free piston 23K, the second spring element 24 are arranged before and after the piston 23P in the axial direction to support the damper rod 23L in such a manner that it can slide in the axial direction, whereby the above second spring element 24 is connected to the above damper 23 in series. In FIG. 5(a), 23a and 23b denote the first and second chambers of the hydraulic cylinder 23V interconnected by an orifice 23c and an oil line 23d.

Figure 5B:
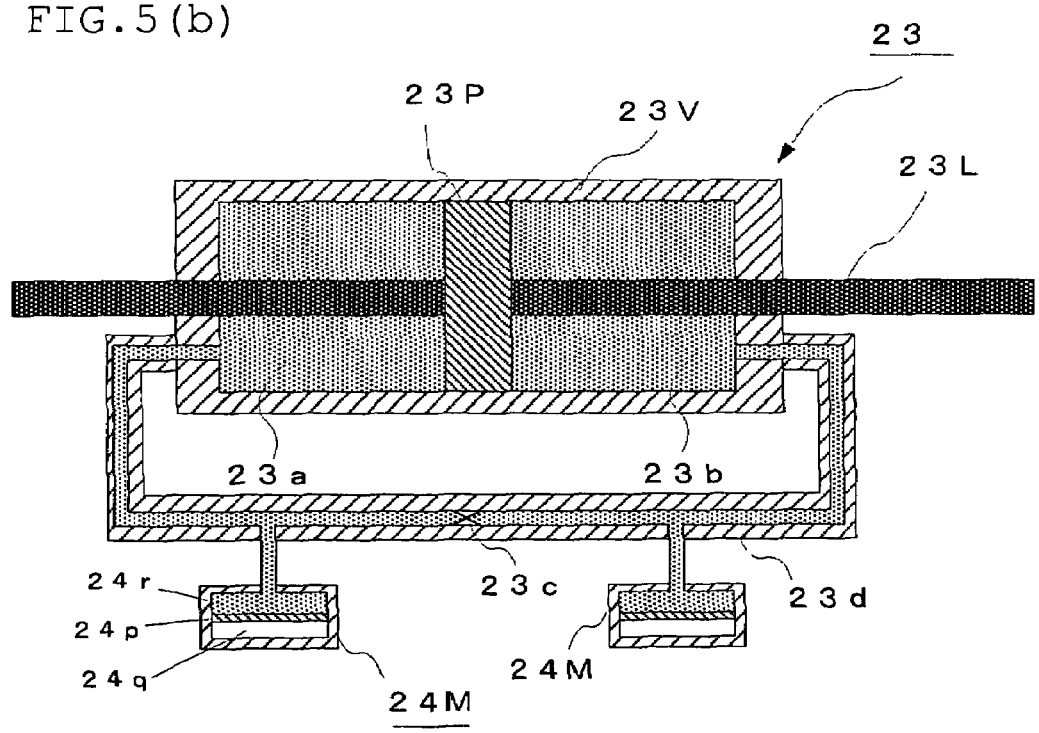

The same effect is obtained even when the second spring element 24 are provided as working oil passage air springs in the damper 23. More specifically, as shown in FIG. 5(b), chambers 24M and 24M in which a compressed air chamber 24q and a working oil chamber 24r are separated by a piston 24p are formed in the oil line 23d which is the working oil passage of the damper 23 to provide a spring effect, thereby making it possible to delay the timing of generating the damping force of the damper 25 with a spring element as a shock absorber from the timing of generating damping force in the case of the above damper 23 alone. The number of the above chambers 24M is suitably determined by the characteristic properties of the above damper 23 and the size of the motor 3 and may be 1 or 3 or more.

Figure 6:
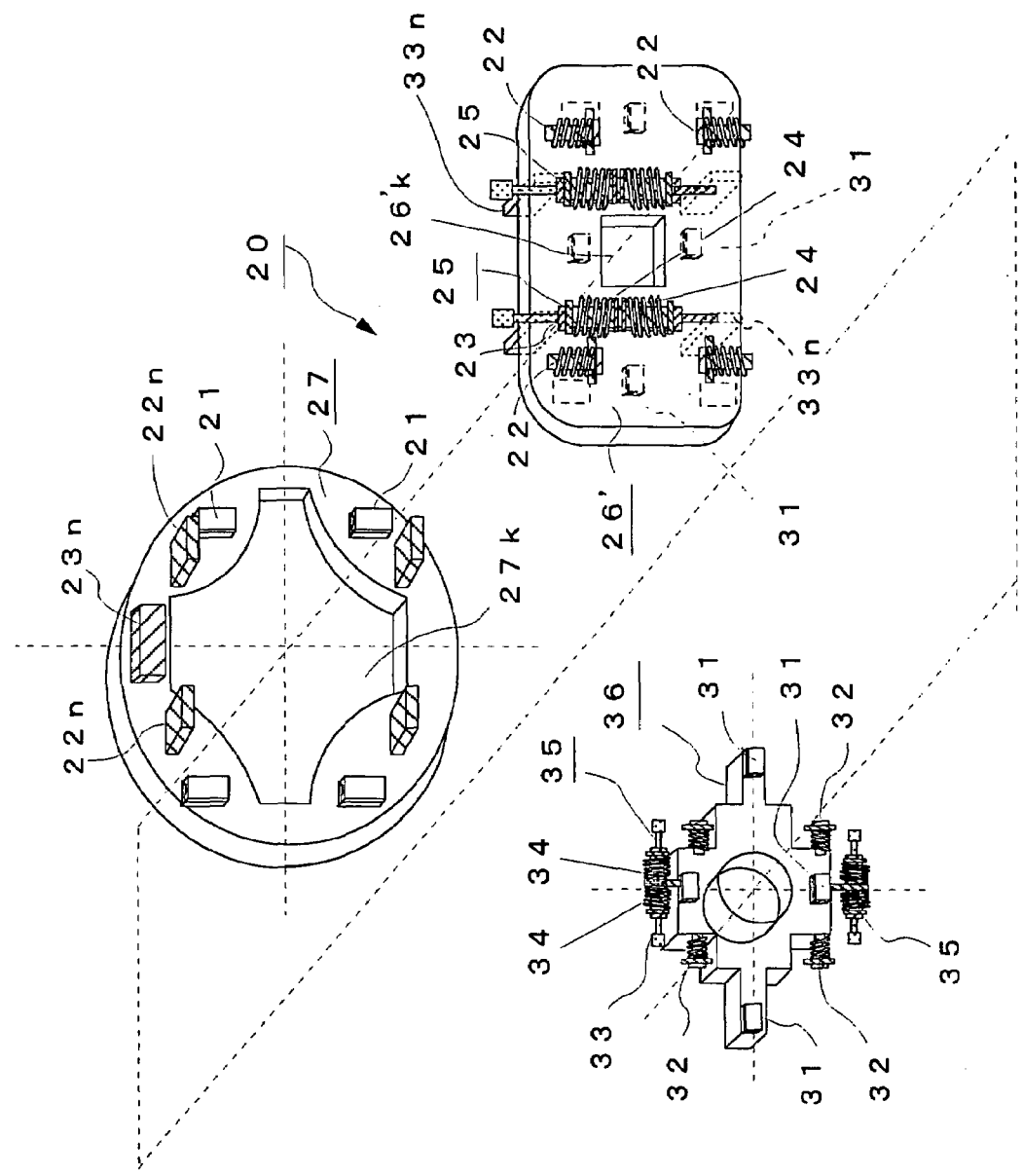
FIG. 6 is a diagram of an in-wheel motor which is supported by springs and dampers with a spring element in a horizontal direction in addition to a vertical direction.

In the above embodiment, the reduction of vertical vibration of the vehicle has been explained. The motor 3 can be supported by springs and dampers with a spring element in the horizontal direction in addition to the vertical direction. More specifically, as shown in FIG. 6, an intermediate plate 26' which is almost the same in constitution as the knuckle attachment plate 26 of the above Embodiment 1 and has a larger hole 26'k than the diameter of the axle 6 in place of the connection hole 26k for the axle 6 is prepared, a plate 36 comprising third spring elements 32 which move in the horizontal direction of the vehicle and dampers 35 with a spring element, each comprising a damper 33 and fourth spring elements 34 and 34 connected to the damper 33 in series and arranged parallel to the above third spring elements 32, is installed on the motor attachment plate 27 side of the intermediate plate 26' the plate 36 and the above intermediate plate 26' are interconnected by four direct-acting guides 31 for guiding in the horizontal direction, arranged symmetric to the center of the plate, and the plate 36 is mounted to the axle 6 connected to the knuckle 5. The above intermediate plate 26' is provided with damper attachment portions 33n for attaching the above dampers 33.

In general, when the unsprung portion is heavy, the horizontal vibration of the unsprung portion becomes large. Therefore, when a dynamic damper effect is provided in the horizontal direction in addition to the vertical direction of the vehicle as described, the vibration of the unsprung portion can be significantly reduced.

Embodiment 1-1

Figure 10:
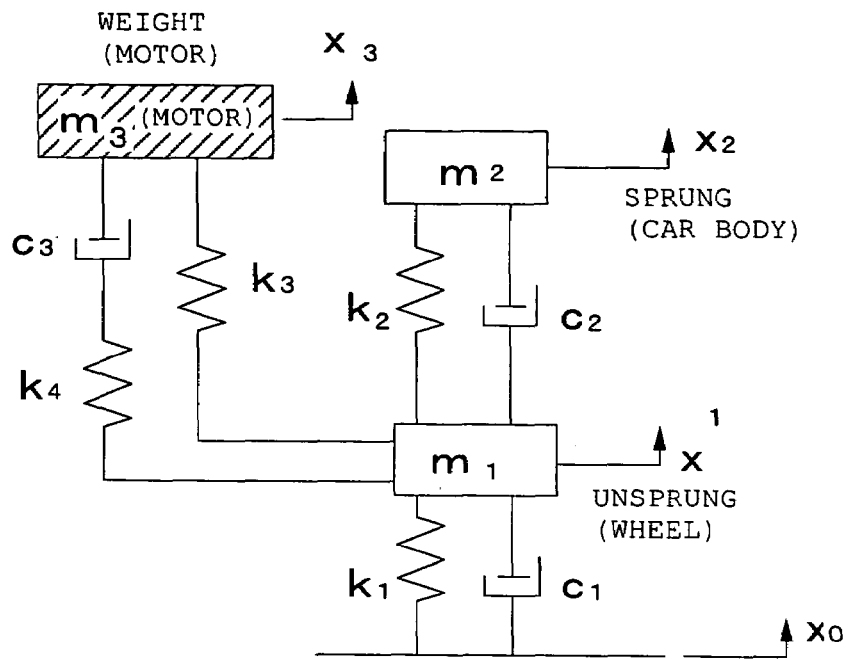
FIG. 10 is a diagram showing a vehicle vibration model (variations in ground-contact load) in the in-wheel motor system of the present invention.
Figure 11:
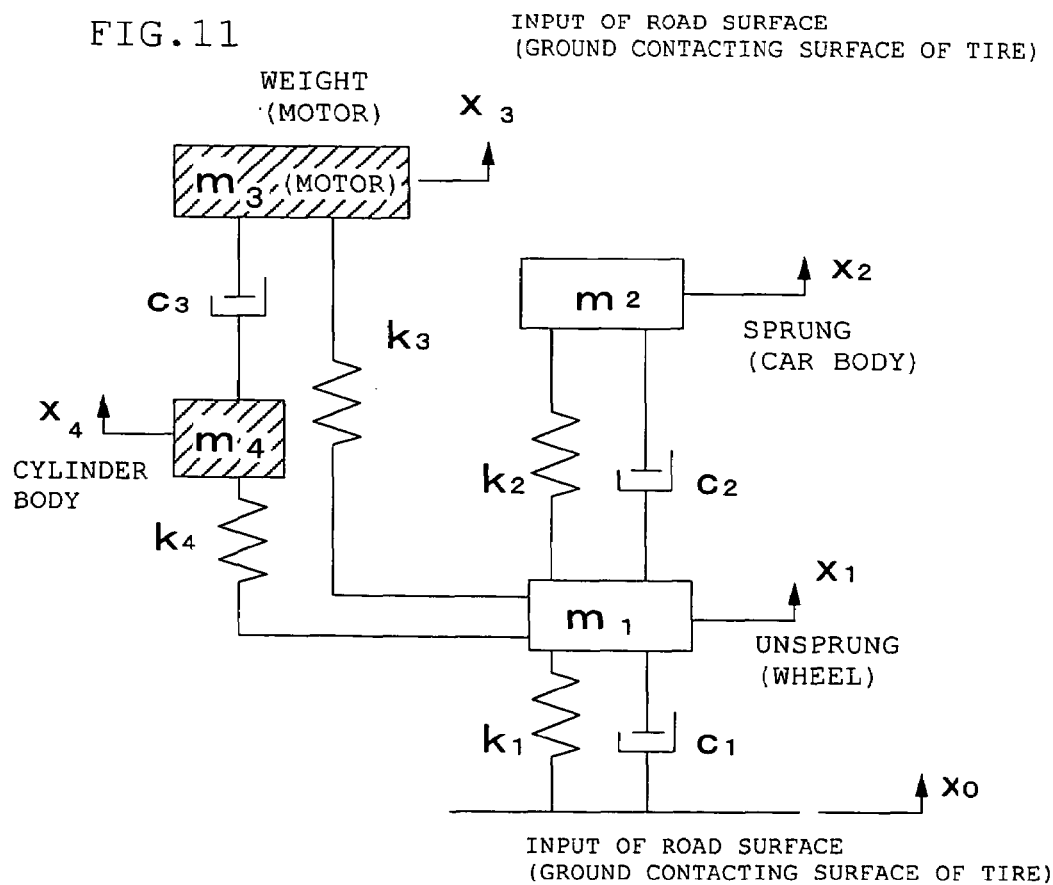
FIG. 11 is a diagram showing a vehicle vibration model (variations in ground-contact load) in the in-wheel motor system of the present invention.
Figure 12:
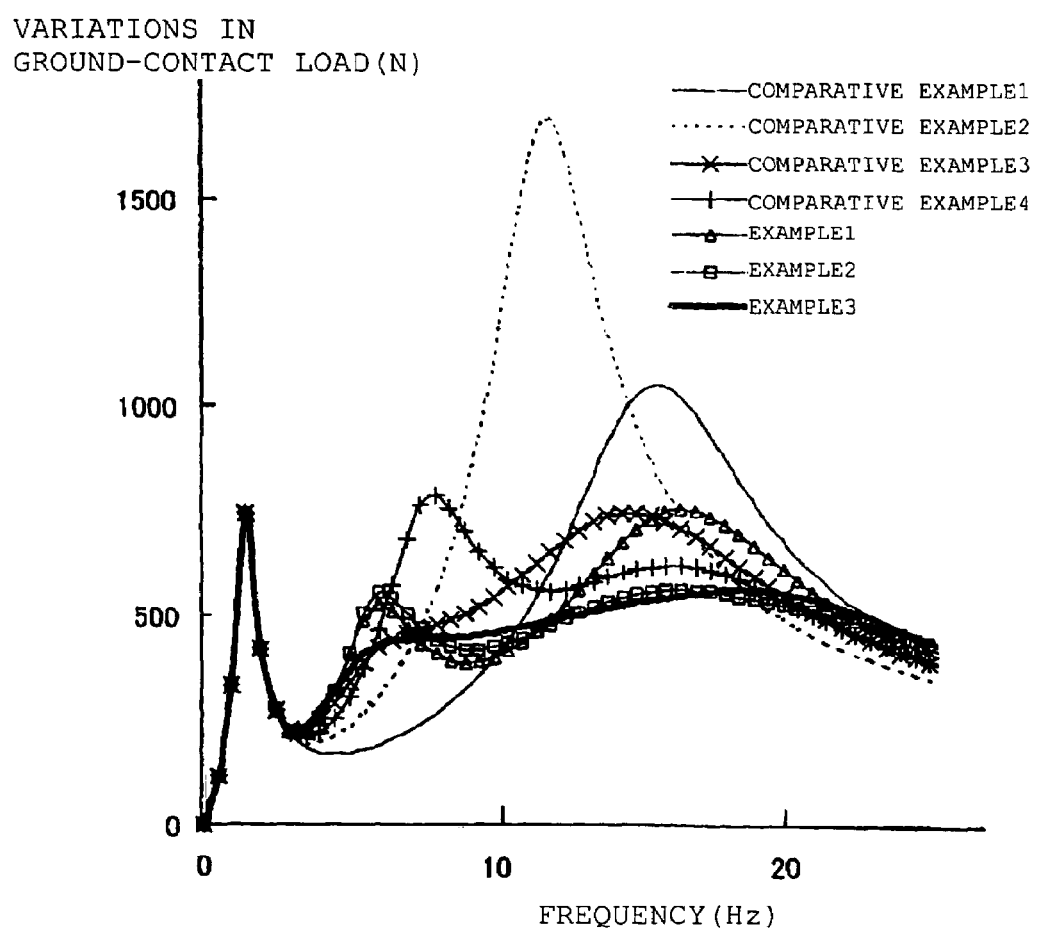
FIG. 12 is a graph showing the analytical results of vehicle vibration models (variations in ground-contact load)

The table of FIG. 7 shows parameters indicative of the characteristic properties in the vertical direction of the vehicle for analyzing variations in ground-contact load which occur in the tire when the vehicle runs on a bad road, FIGS. 8(a), 8(b) and 9 to 11 show vibration models thereof, and FIG. 12 is a graph showing analytical results obtained from the vibration models.

Comparative Example 1 is an electric car which does not employ an ordinary in-wheel motor system and is represented by the vibration model of FIG. 8(a). In FIG. 8(a), as the motor is mounted on the car body side, the mass of the motor corresponds to the sprung mass $m_2$.

Figure 72:
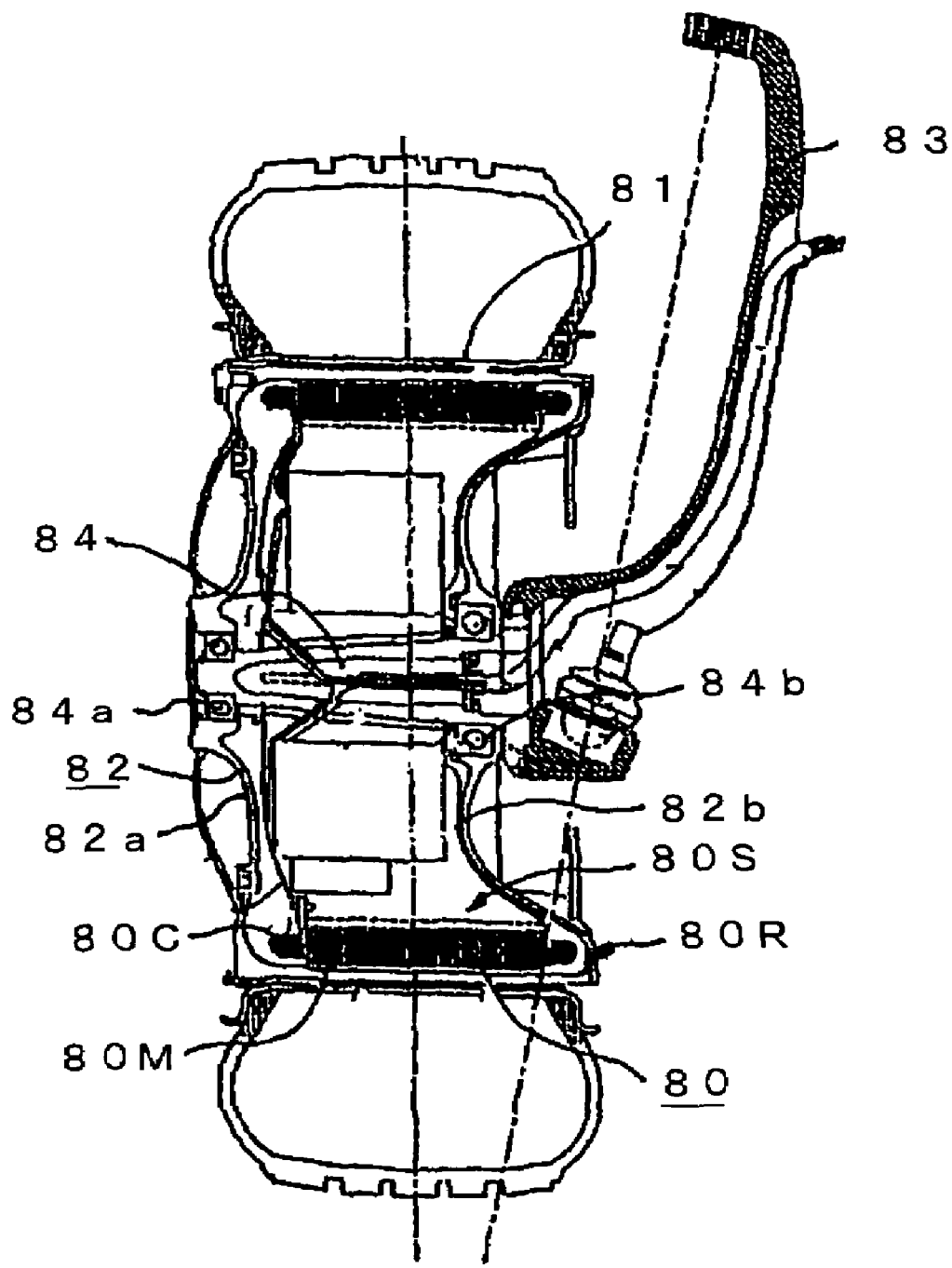
FIG. 72 is a diagram showing the constitution of an in-wheel motor of the prior art.

Comparative Example 2 is an in-wheel motor car comprising an unsprung motor of the prior art which is represented by the vibration model of FIG. 8(b). This corresponds to FIG. 72.

Comparative Example 3 is a dynamic damper type in-wheel motor car in which a motor serves as a dynamic damper and which is represented by the vibration model of FIG. 9. Comparative Example 4 is obtained by increasing the spring constant $k_3$ of a spring supporting the motor in the vertical direction of Comparative Example 3. Comparative Examples 3 and 4 correspond to FIG. 73 and FIG. 74, respectively.

Example 1 is an in-wheel motor car comprising a damper with a spring element according to the present invention which is represented by the vibration model (basic model) of FIG. 10.

Example 2 is an in-wheel motor car comprising a damper with a spring element according to the present invention which is represented by the vibration model of FIG. 11 and differs from the basic model of FIG. 10 in that the cylinder body $m_4$ of the damper is made separate. This Example 2 corresponds to FIG. 1 and FIG. 2.

Example 3 is obtained by reducing the spring constant $k_3$ of the spring for supporting the motor in the vertical direction of the above Example 2 and increasing the damping force $c_3$ of the damper.

When the motor is mounted to an unsprung mass corresponding portion such as a wheel or knuckle as in Comparative Example 2, the unsprung mass increases. Therefore, as shown in FIG. 12, variations in the ground-contact load of the tire increase and the road holding properties deteriorate as compared with Comparative Example 1 in which the unsprung mass is small.

Since the mass of the motor is removed from the unsprung mass when the motor is mounted as a dynamic damper as in Comparative Example 3, the unsprung mass can be reduced to a value equal to that of the above Comparative Example 1 and unsprung vibration is suppressed by the function of the dynamic damper. Consequently, as shown in FIG. 12, variations in the ground-contact load of the tire can be greatly reduced as compared with the electric car which does not employ an ordinary in-wheel motor system shown in the above Comparative Example 1. When the spring constant $k_3$ of the spring for supporting the motor in the vertical direction is made large as in Comparative Example 4, as shown in FIG. 12, variations in the ground-contact load of the tire at a relatively low frequency become slightly large but variations in the ground-contact load of the tire at a frequency band near the unsprung resonance frequency can be greatly reduced, thereby making it possible to further improve the road holding properties.

In the in-wheel motor car (Example 1) comprising a damper with a spring element according to the present invention, since a spring element $k_4$ is interposed between the damper connected to the motor of Comparative Example 3 or 4 and an unsprung part or between the damper and the motor, variations in the ground-contact load of the tire at a frequency around 7 Hz which is the resonance frequency of the dynamic damper are slightly large as shown in FIG. 12 but variations in the ground-contact load of the tire at a frequency from 7 Hz to 16 Hz which is the unsprung resonance frequency can be made small.

Since the cylinder body $m_4$ of the damper is mounted under the spring in the above Example 1, the unsprung weight slightly increases. When the cylinder body $m_4$ is raised by the spring element $k_4$ corresponding to the second spring element, the unsprung weight can be reduced as in Example 2 and therefore, variations in the ground-contact load of the tire at a frequency near the unsprung resonance frequency can be further reduced as shown in FIG. 12.

Further, when the spring constant $k_3$ of the spring supporting the motor in the vertical direction corresponding to the first spring element is made smaller and the damping force $c_3$ of the damper is made larger than those of the above Example 2 as in Example 3, variations in the ground-contact load of the tire at a frequency from 7 Hz to the unsprung resonance frequency can be greatly reduced as compared with Comparative Example 1.

EXAMPLE 1-2

Figure 16:
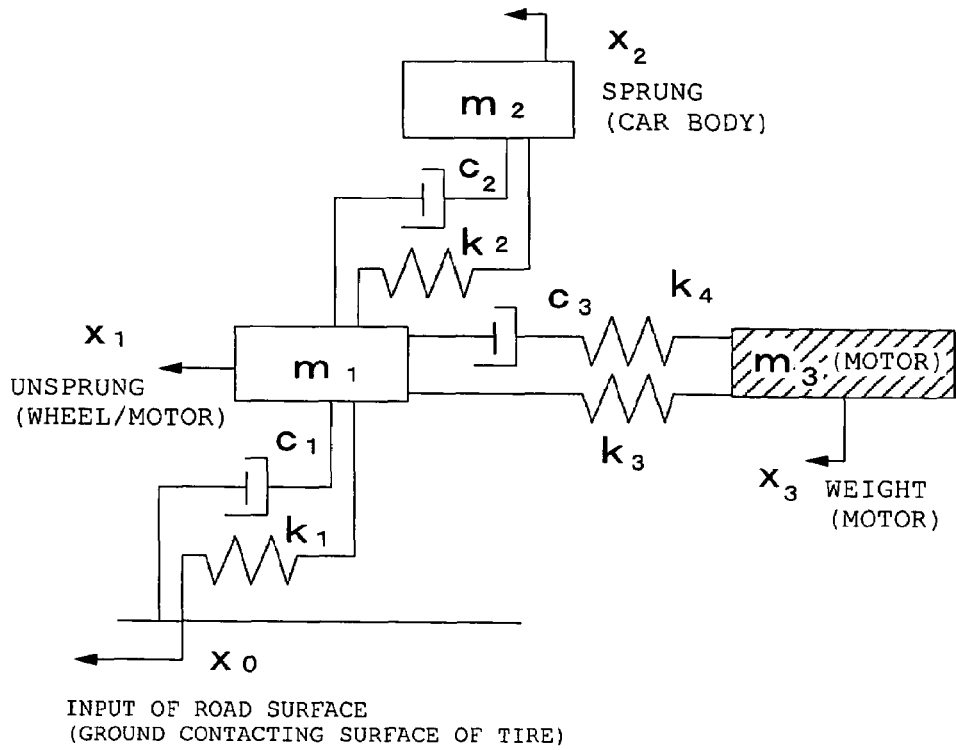
FIG. 16 is a diagram showing a vehicle vibration model (variations in longitudinal force) in the in-wheel motor system of the present invention.
Figure 17:
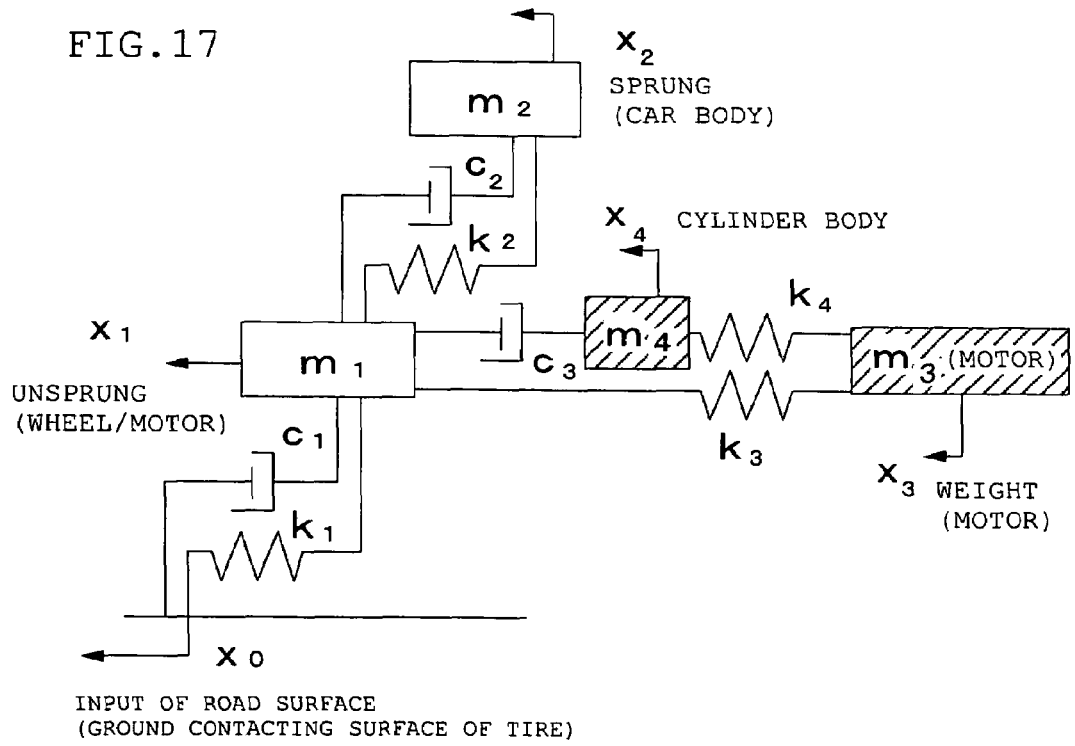
FIG. 17 is a diagram showing a vehicle vibration model (variations in longitudinal force) in the in-wheel motor system of the present invention.
Figure 18:
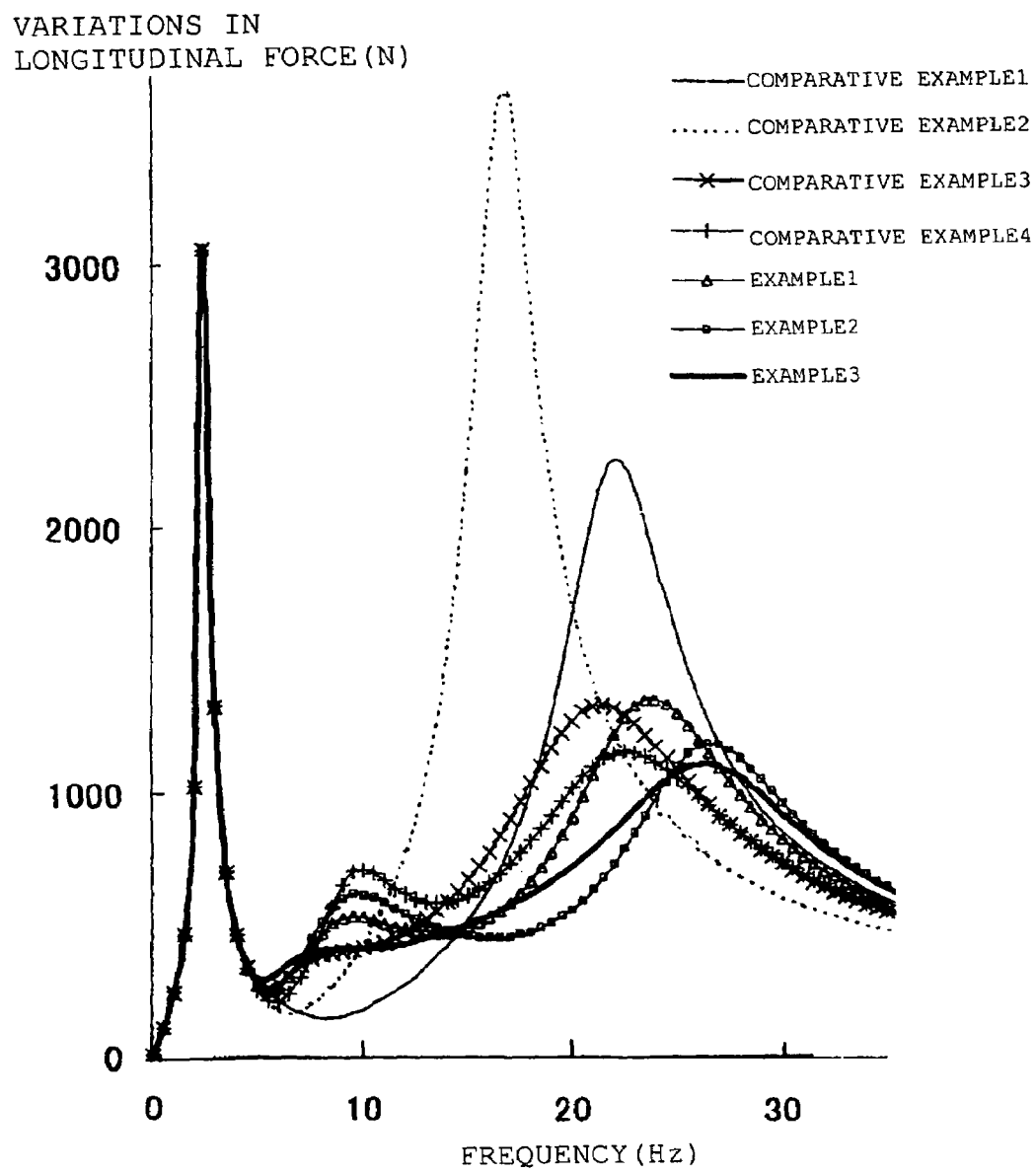
FIG. 18 is a graph showing the analytical results of the vehicle vibration models (variations in longitudinal force)

The table of FIG. 13 shows parameters indicative of the characteristic properties in the horizontal direction of the vehicle for analyzing variations in longitudinal force which occur in the tire when the vehicle runs on a bad road, FIGS. 14(a) and 14(b) and FIGS. 15 to 17 show vibration models thereof, and FIG. 18 is a graph showing analytical results obtained from the above vibration models.

Figure 14A:
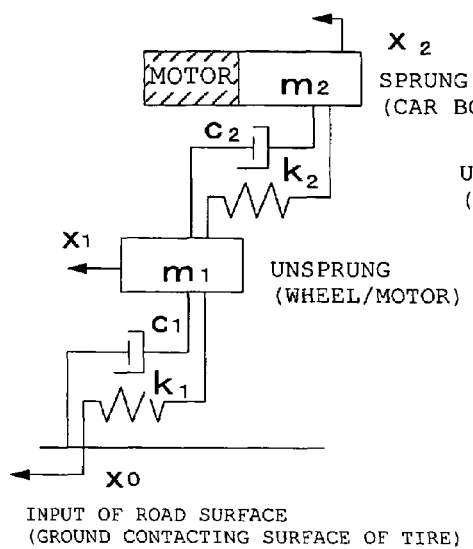
FIGS. 14(a) and 14(b) are diagrams showing vehicle vibration models (variations in longitudinal force) in the in-wheel motor systems of the prior art.

Comparative Example 1 is an electric car which does not employ an ordinary in-wheel motor system and is represented by the vibration model of FIG. 14(a). In FIG. 14(a), as the motor is mounted on the car body side, the mass of the motor corresponds to the sprung mass $m_2$.

Figure 14B:
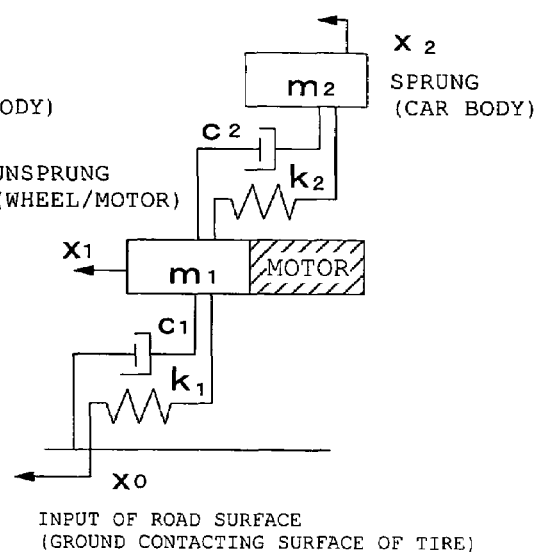

Comparative Example 2 is an in-wheel motor car comprising an unsprung motor of the prior art which is represented by the vibration model of FIG. 14(b). This corresponds to FIG. 47.

Figure 15:
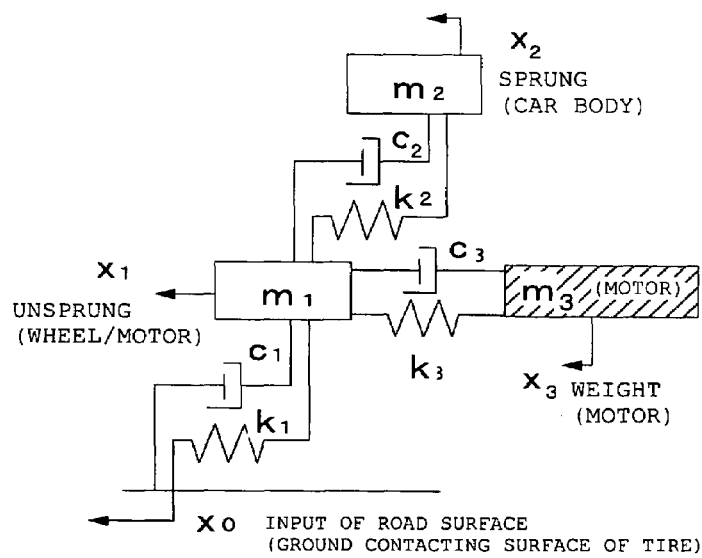
FIG. 15 is a diagram showing a vehicle vibration model (variations in longitudinal force) in the dynamic damper type in-wheel motor system of the prior art.

Comparative Example 3 is a dynamic damper type in-wheel motor car in which a motor serves as a dynamic damper and which is represented by the vibration model of FIG. 15. Comparative Example 4 is obtained by increasing the spring constant $k_3$ of the spring supporting the motor in the horizontal direction of Comparative Example 3.

Example 1 is an in-wheel motor car comprising a damper with a spring element according to the present invention which is represented by the vibration model (basic model) of FIG. 16.

Example 2 is an in-wheel motor car comprising a damper with a spring element according to the present invention which is represented by the vibration model of FIG. 17 and differs from the above basic model in that the cylinder body $m_4$ of the damper is made separate. This Example 2 corresponds to FIG. 6.

Example 3 is obtained by reducing the spring constant $k_3$ of the spring for supporting the motor in the horizontal direction of the above Example 2 and increasing the damping force $c_3$ of the damper.

When the motor is mounted to an unsprung mass corresponding portion such as a wheel or knuckle as in Comparative Example 2, the unsprung mass increases. Therefore, as shown in FIG. 18, variations in the longitudinal force of the tire increase and the gripping properties in the horizontal direction deteriorate as compared with Comparative Example 1 in which the unsprung mass is small.

Since the mass of the motor is removed from the unsprung mass when the motor is mounted as a dynamic damper as in Comparative Example 3, the unsprung mass can be reduced to a value equal to that of the above Comparative Example 1 and unsprung vibration is suppressed by the function of the dynamic damper. Consequently, as shown in FIG. 18, variations in the longitudinal force of the tire can be greatly reduced as compared with the electric car which does not employ an ordinary in-wheel motor system shown in the above Comparative Example 1. When the spring constant $k_3$ of the spring for supporting the motor in the horizontal direction is made large as in Comparative Example 4, as shown in FIG. 18, variations in the longitudinal force of the tire at a relatively low frequency become slightly large but variations in the longitudinal force of the tire at a frequency band near the unsprung resonance frequency can be greatly reduced, thereby making it possible to further improve the gripping properties in the horizontal direction.

In the in-wheel motor car (Example 1) comprising a damper with a spring element according to the present invention, since the spring element $k_4$ is interposed between the damper connected to the motor of Comparative Example 3 or 4 and an unsprung part or between the damper and the motor, variations in the longitudinal force of the tire at a frequency around 10 Hz which is the resonance frequency of the dynamic damper are slightly large as shown in FIG. 18 but variations in the longitudinal force of the tire at a frequency from 10 Hz to 20~25 Hz which is the unsprung resonance frequency can be made small.

Since the cylinder body $m_4$ of the damper is mounted under the spring in the above Example 1, the unsprung weight slightly increases. When the cylinder body $m_4$ is raised by the spring element $k_4$ corresponding to the second spring element, the unsprung weight can be reduced as in Example 2 and therefore, variations in the longitudinal force of the tire at a frequency near the unsprung resonance frequency can be further reduced as shown in FIG. 18.

Further, when the spring constant $k_3$ of the spring supporting the motor in the horizontal direction corresponding to the first spring element is made smaller and the damping force $c_3$ of the damper is made larger than those of the above Example 2 as in Example 3, variations in the longitudinal force of the tire at a frequency from 10 Hz to the unsprung resonance frequency can be greatly reduced as compared with Comparative Example 1.

Embodiment 2

Figure 19:
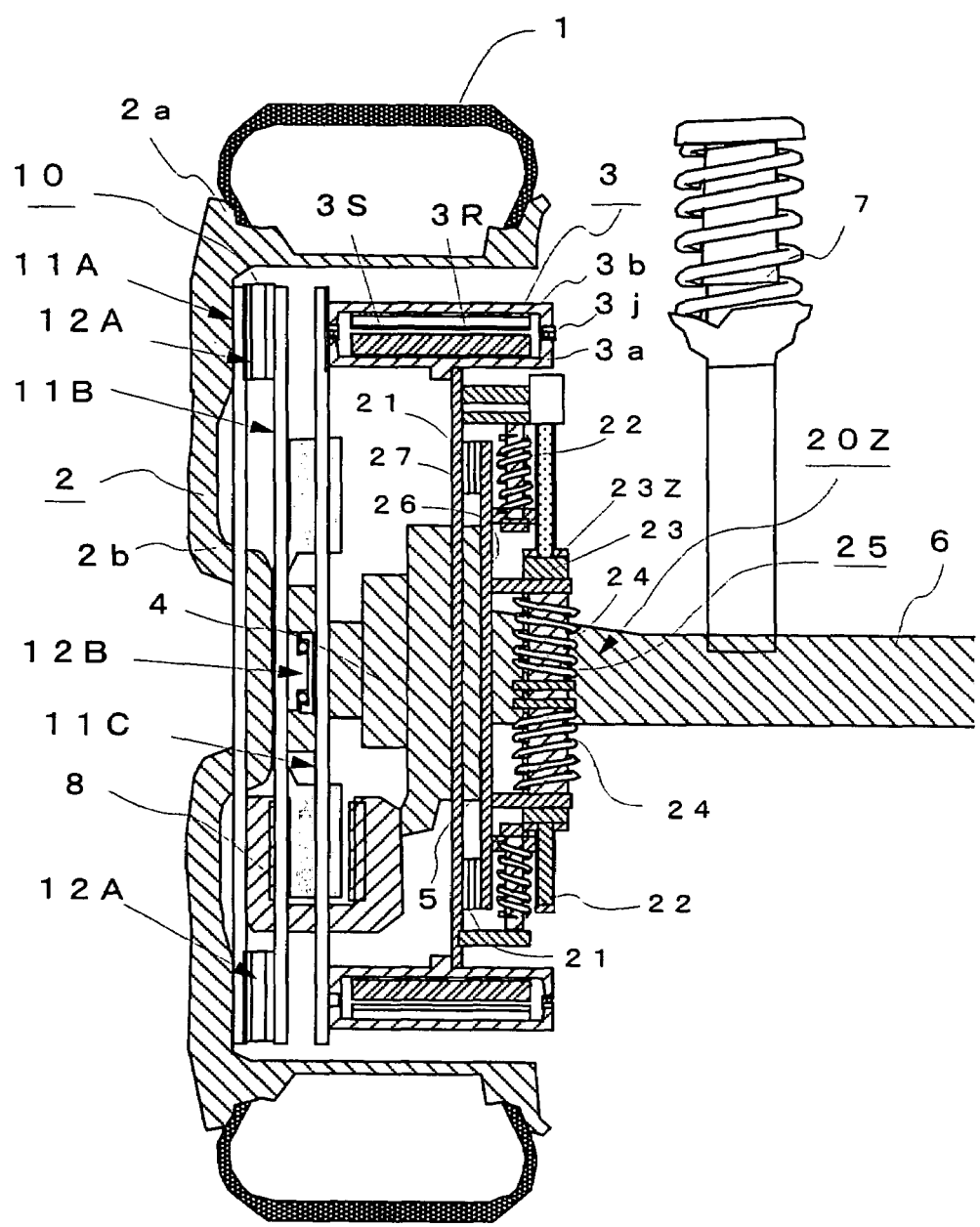
FIG. 19 is a longitudinal sectional view showing the constitution of an in-wheel motor system according to Embodiment 2 of the present invention.
Figure 20:
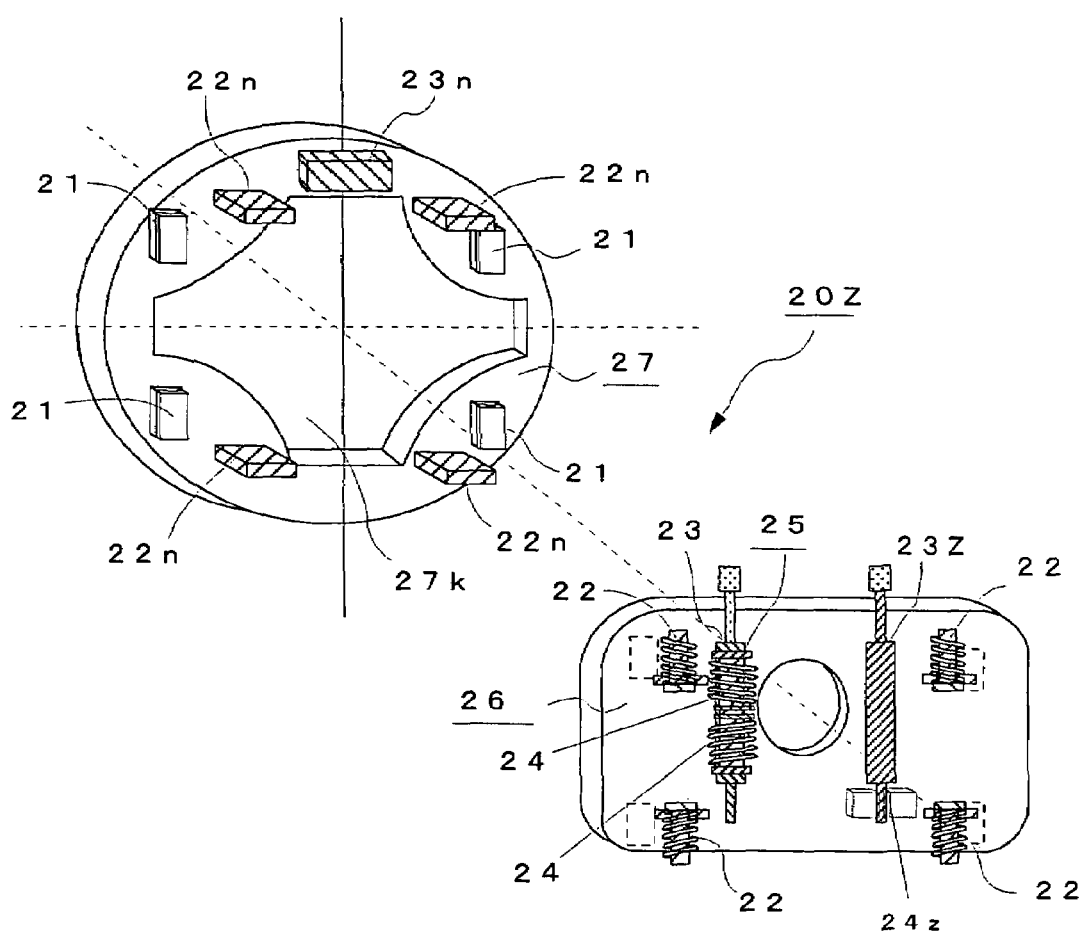
FIG. 20 is a diagram showing the constitution of a damping mechanism according to Embodiment 2.
Figure 21:
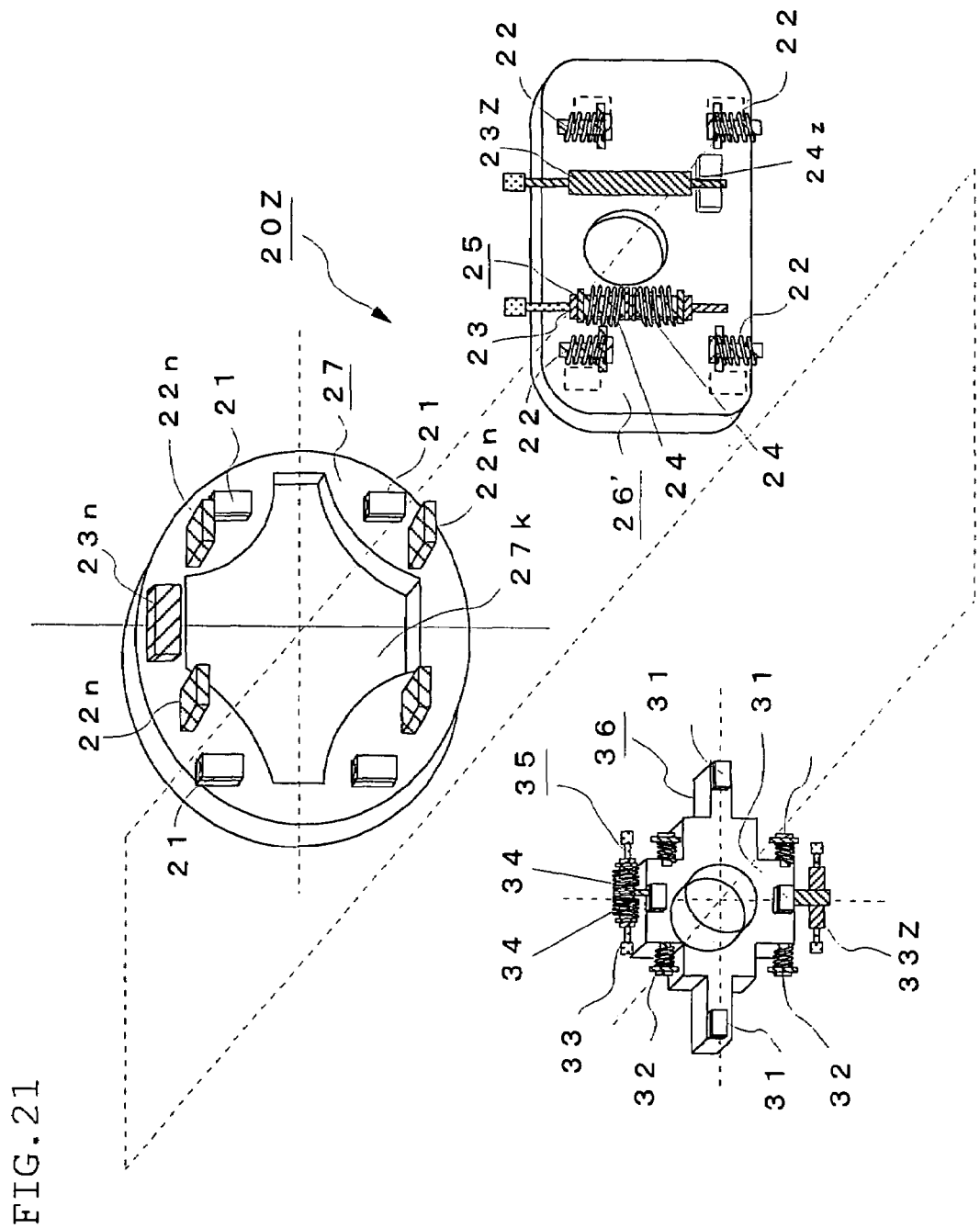
FIG. 21 is a diagram of an in-wheel motor supported by springs, dampers and dampers with a spring element in the horizontal direction in addition to the vertical direction.

In the above Embodiment 1, the non-rotating side case 3a of the in-wheel motor 3 is supported to the knuckle 5 in the vertical direction by dampers 25 with a spring element, each comprising a damper 23 and a second spring element 24 connected to this damper 23 in series, in place of the damper 92 of the in-wheel motor system of the prior art shown in FIG. 73 to change the timing of generating damping force. As shown in FIG. 19 and FIG. 20, when the non-rotating side case 3a of the in-wheel motor 3 is linked to the knuckle 5 by a damping mechanism 20Z for supporting the non-rotating side case 3a of the in-wheel motor 3 to the knuckle 5 with first spring elements 22 and a first damper 23Z in the vertical direction and further supporting the non-rotating side case 3a of the in-wheel motor 3 to the knuckle 5 in the vertical direction with the above damper 25 with a spring element in the vertical direction, it is possible to further reduce variations in the ground-contact load at a frequency near the unsprung resonance frequency and to further improve the road holding properties of the vehicle. In FIG. 21, 24z denotes a damper attachment portion for attaching the above damper 23Z.

In the in-wheel motor system of the prior art shown in FIG. 73, the motor 3 is supported to the unsprung portion of the vehicle by the spring member 93 and the damper 92 arranged parallel to each other. In the damping mechanism 20Z of this Embodiment 2, the damper 25 with a spring element which comprises the damper 23 and the second spring element 24 connected to the damper 23 in series as the second damper element and is arranged parallel to the first spring elements 22 and the damper 23Z is added to the first spring elements 22 corresponding to the above spring member 93 and the damper 23Z which is the first damper element corresponding to the above damper 92.

When the motor 3 vibrates in the wheel 2 by the input of vibration from the road when the vehicle runs on a bad road, the operation speed of the above damping mechanism 20Z for connecting the motor 3 to the knuckle 5 becomes faster as its vibration frequency becomes higher. That is, only the damper 23Z which is the second damper element functions as a damper at any frequency. The damper 25 with a spring element functions as a damper at a low frequency band at which its operation speed is slow and rather functions as a spring because the damping force of the damper 23 which is the second damper element grows at a high frequency band at which its operation speed is fast to move the second spring element 24. In contrast to this, when the first spring elements 22 and the above damper 23Z are arranged parallel to the damper 25 having a spring element as in this Embodiment 2, vibration having a frequency near the unsprung resonance frequency which is a relatively high frequency can be suppressed more effectively.

In the above embodiment, the vertical vibration of the vehicle is reduced. The motor 3 can be supported by the springs, damper and damper with a spring element in the horizontal direction in addition to the vertical direction. More specifically, as shown in FIG. 21, one of the dampers 25 with a spring element mounted to the intermediate plate. 26' is the damper 23Z which is the first damper element and one of dampers 35 with a spring element mounted to the plate. 36 is a damper 33Z which is the same as the damper 23Z in constitution to provide a dynamic damper effect in the horizontal direction in addition to the vertical direction of the vehicle. Therefore, variations in the ground-contact load of the tire can be further reduced and variations in the longitudinal force of the tire can be further suppressed.

In the above Embodiments 1 and 2, a hollow outer rotor type in-wheel motor 3 is used as the motor to be mounted to an unsprung portion of the vehicle by the damping mechanism 20 or the damping mechanism 20Z. The present invention is not limited to this and can be applied to a hollow inner rotor type in-wheel motor and a geared motor which is a combination of a hollow inner rotor type in-wheel motor and a speed reducing gear. In the case of the above geared motor, the non-rotating side case or the motor case to which the above non-rotating side case is mounted is connected to the knuckle which is a frame dress-up part of the vehicle by the above damping mechanism 20 or 20Z.

EXAMPLE 2-1

Figure 25:
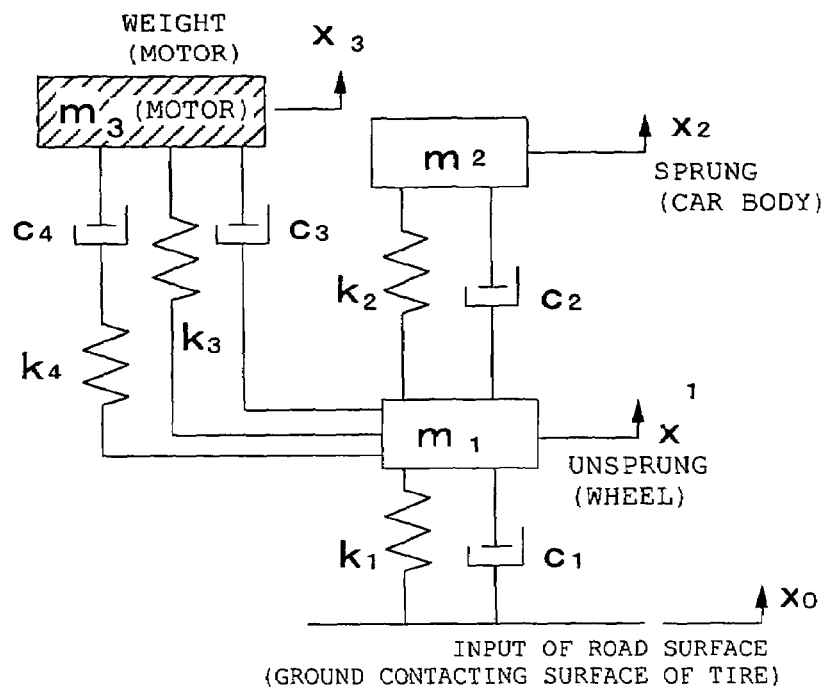
FIG. 25 is a diagram showing a vehicle vibration model (variations in ground-contact load) in the in-wheel motor system of the present invention.
Figure 26:
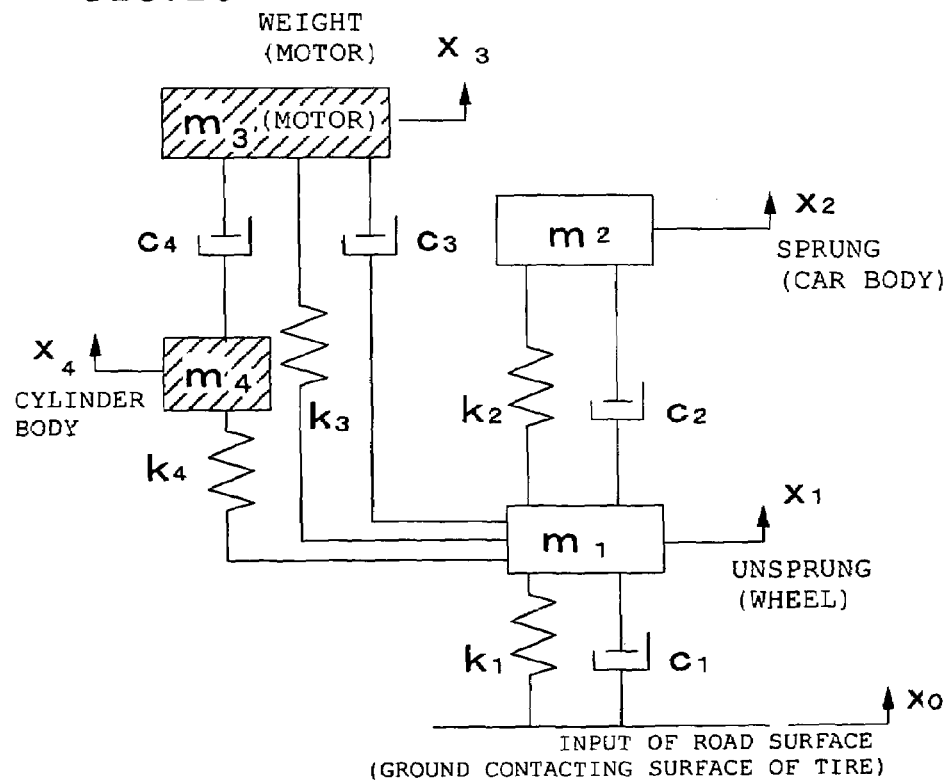
FIG. 26 is a diagram showing a vehicle vibration model (variations in ground-contact load) in the in-wheel motor system of the present invention.
Figure 27:
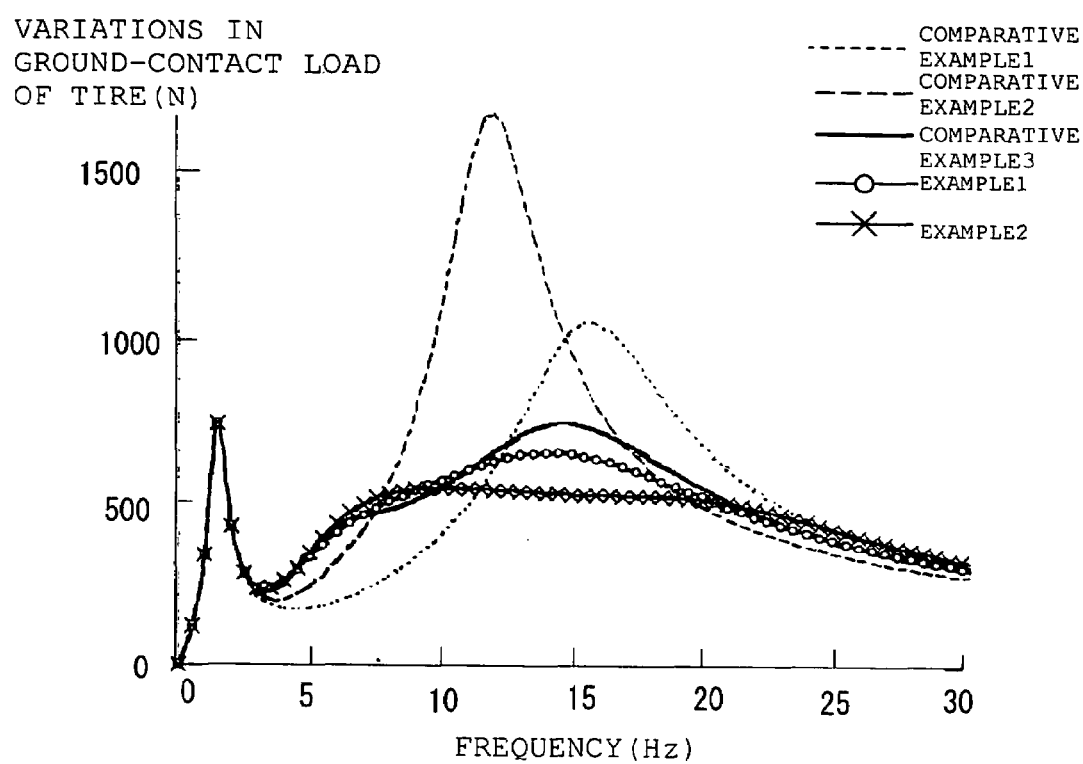
FIG. 27 is a graph showing the analytical results of the vehicle vibration models (variations in ground-contact load)

The table of FIG. 22 shows parameters indicative of the characteristic properties in the vertical direction of the vehicle for analyzing variations in the ground-contact load which occur in the tire when the vehicle runs on a bad road, FIGS. 23(a) and 23(b) and FIGS. 24 to 26 show vibration models thereof, and FIG. 27 is a graph showing analytical results obtained from the above vibration models.

Comparative Example 1 is an electric car which does not employ an ordinary in-wheel motor system and is represented by the vibration model of FIG. 23(a). In FIG. 23(a), as the motor is mounted on the car body side, the mass of the motor corresponds to the sprung mass $m_2$.

Comparative Example 2 is an in-wheel motor car comprising an unsprung motor of the prior art which is represented by the vibration model of FIG. 23(b). This corresponds to FIG. 72.

Comparative Example 3 is a dynamic damper type in-wheel motor car in which a motor serves as a dynamic damper and which is represented by the vibration model of FIG. 24. Comparative Example 3 corresponds to FIG. 73 and FIG. 74.

Example 1 is an in-wheel motor car in which a motor serves as a dynamic damper by means of a damping unit comprising springs, damper and damper with a spring element arranged parallel to one another according to the present invention and which is represented by the vibration model of FIG. 25.

Example 2 is an in-wheel motor car comprising a damper with a spring element according to the present invention which is represented by the vibration model of FIG. 26 and differs from the vibration model of FIG. 25 in that the cylinder body $m_4$ of the damper is made separate.

When the motor is mounted to an unsprung mass corresponding portion such as a wheel or knuckle as in Comparative Example 2, the unsprung mass increases. Therefore, as shown in FIG. 27, variations in the ground-contact load of the tire increase and the road holding properties deteriorate as compared with Comparative Example 1 in which the unsprung mass is small.

Since the mass of the motor is removed from the unsprung mass when the motor is mounted as a dynamic damper as in Comparative Example 3, the unsprung mass can be reduced to a value equal to that of the above Comparative Example 1 and unsprung vibration is suppressed by the function of the dynamic damper. Consequently, as shown in FIG. 27, variations in the ground-contact load of the tire can be greatly reduced as compared with the electric car which does not employ an ordinary in-wheel motor system shown in the above Comparative Example 1. In the in-wheel motor car (Example 1) comprising springs, damper and damper with a spring element according to the present invention, since the damper with a spring element comprising a damper element $c_4$ and a spring element $k_4$ connected to the damper element $c_4$ in series is arranged parallel to the damper element $c_3$ and the spring element $k_3$ of the above Comparative Example 3, variations in the ground-contact load of the tire at a frequency around 7Hz which is the resonance frequency of the dynamic damper are slightly large as shown in FIG. 27 but variations in the ground-contact load of the tire at a frequency from 7 Hz to 16 Hz which is the unsprung resonance frequency can be made smaller than that of the above Comparative Example 3.

Since the cylinder body $m_4$ of the damper is mounted under the spring in the above Example 1, the unsprung weight slightly increases. When the cylinder body $m_4$ is raised by the spring element $k_4$ corresponding to the second spring element, the unsprung weight can be reduced as in Example 2 and therefore, variations in the ground-contact load of the tire at a frequency near the unsprung resonance frequency can be further reduced to a value smaller than that of the above Example 1 as shown in FIG. 27.

Figure 28A:
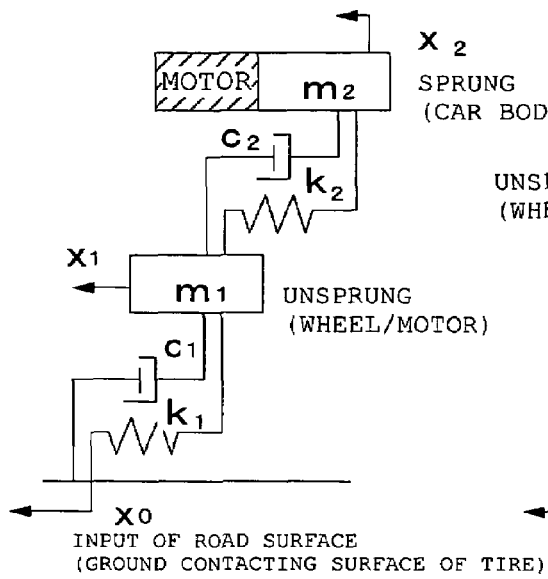
FIGS. 28(a) and 28(b) are diagrams showing vehicle vibration models (variations in longitudinal force) in the in-wheel motor systems of the prior art.
Figure 28B:
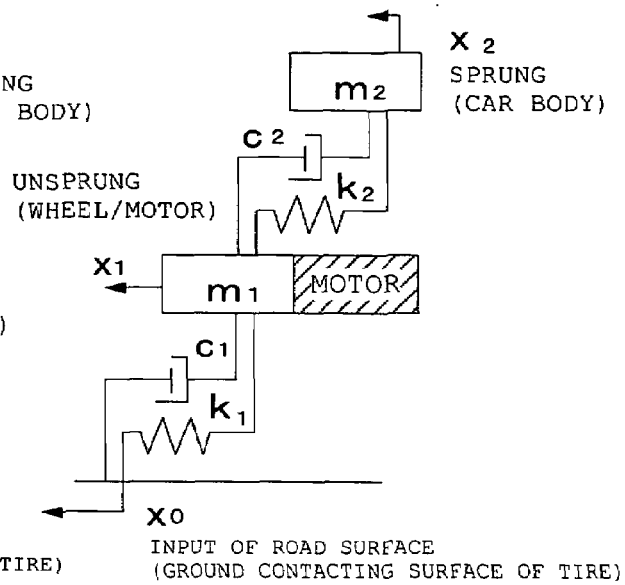

Since the suspension of an ordinary vehicle vibrates under the spring in the horizontal direction as represented by the vibration model of FIG. 28(a), when the vehicle runs on a bad road, the longitudinal force of the tire fluctuates. In the in-wheel motor car of the prior art, as represented by the vibration model of FIG. 28(b), since the motor is mounted to an unsprung portion, the unsprung mass increments, variations in the longitudinal force of the tire increase when the vehicle runs on a bad road grow, and the generation force (driving force) of the tire diminishes.

Figure 29:
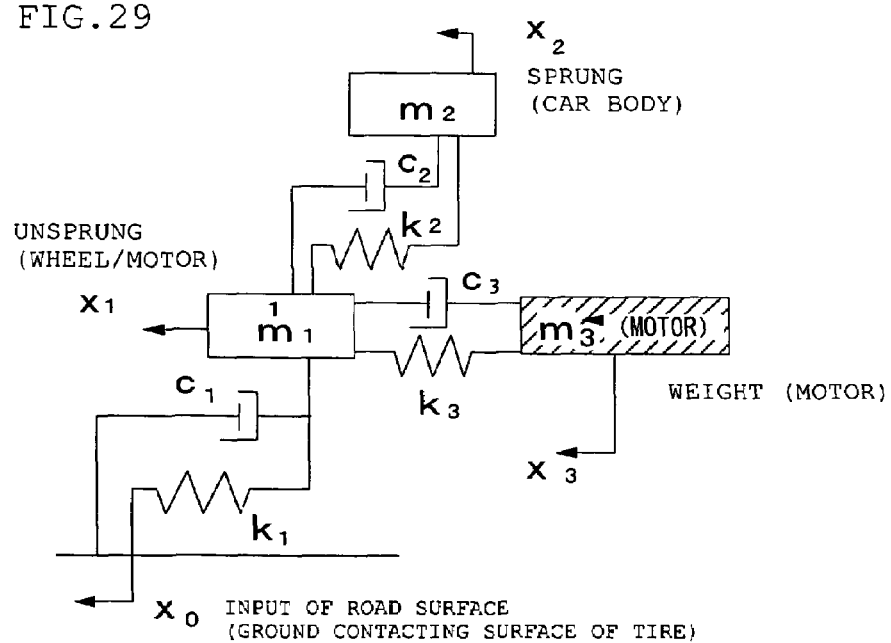
FIG. 29 is a diagram of a vehicle vibration model in an in-wheel motor system in which a motor acts as a dynamic damper in the horizontal direction.
Figure 30:
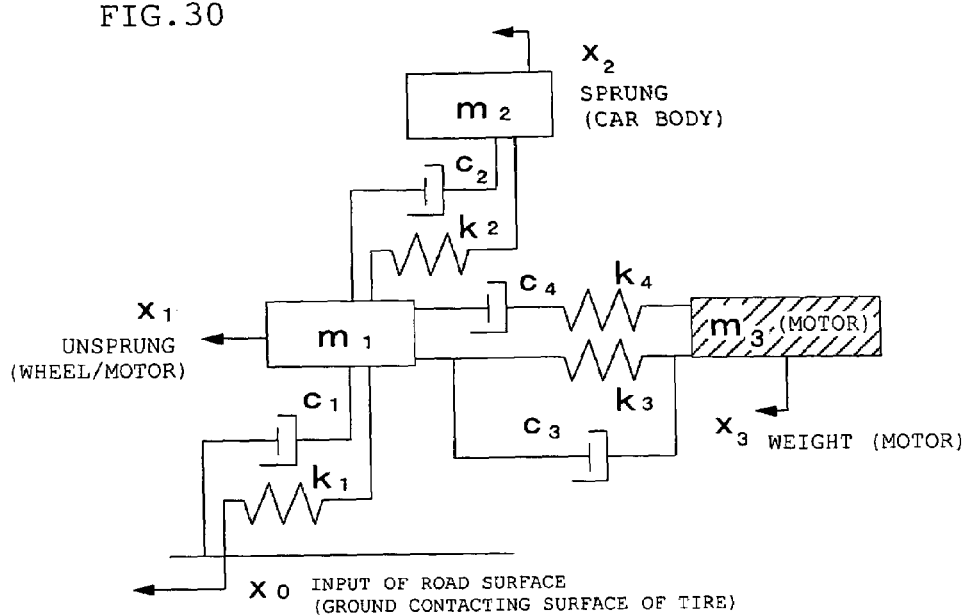
FIG. 30 is a diagram showing a vehicle vibration model (variations in longitudinal force) in the in-wheel motor system of the present invention.
Figure 31:
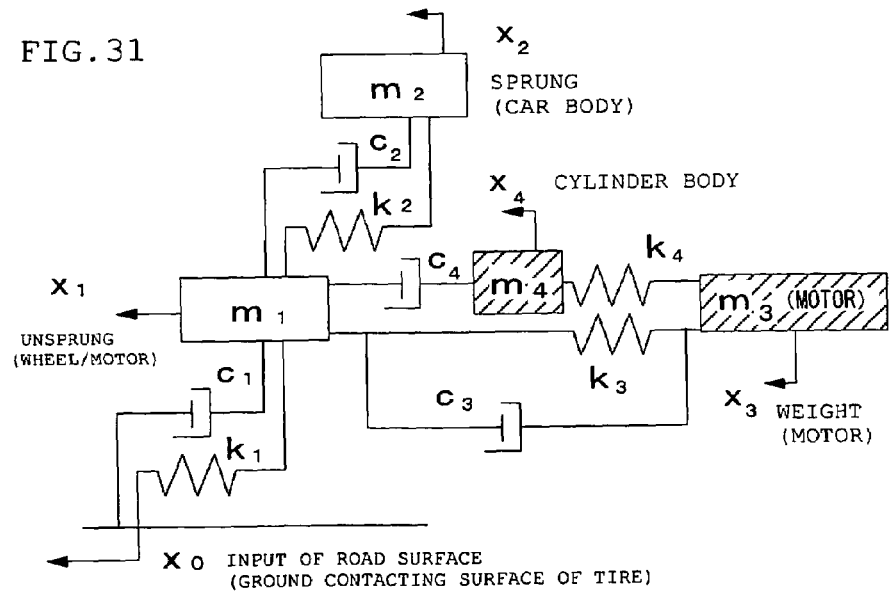
FIG. 31 is a diagram showing a vehicle vibration model (variations in longitudinal force) in the in-wheel motor system of the present invention.

As for this problem, as shown by the vibration model of FIG. 29, when the motor serves as a dynamic damper in the horizontal direction, the unsprung vibration is reduced to suppress variations in the longitudinal force of the tire. By applying the structure for the vertical direction of the Embodiment 2 as shown in FIG. 21 to the horizontal direction, the vibration model shown in FIG. 30 is obtained, thereby making it possible to further suppress variations in the longitudinal force of the tire like the above Embodiment 1-2. As shown in FIG. 31, by raising the cylinder body $m_4$ of the damper by the spring element $k_4$ corresponding to the second spring element, variations in the longitudinal force of the tire at a frequency near the unsprung resonance frequency can be further reduced.

Embodiment 3

Figure 32:
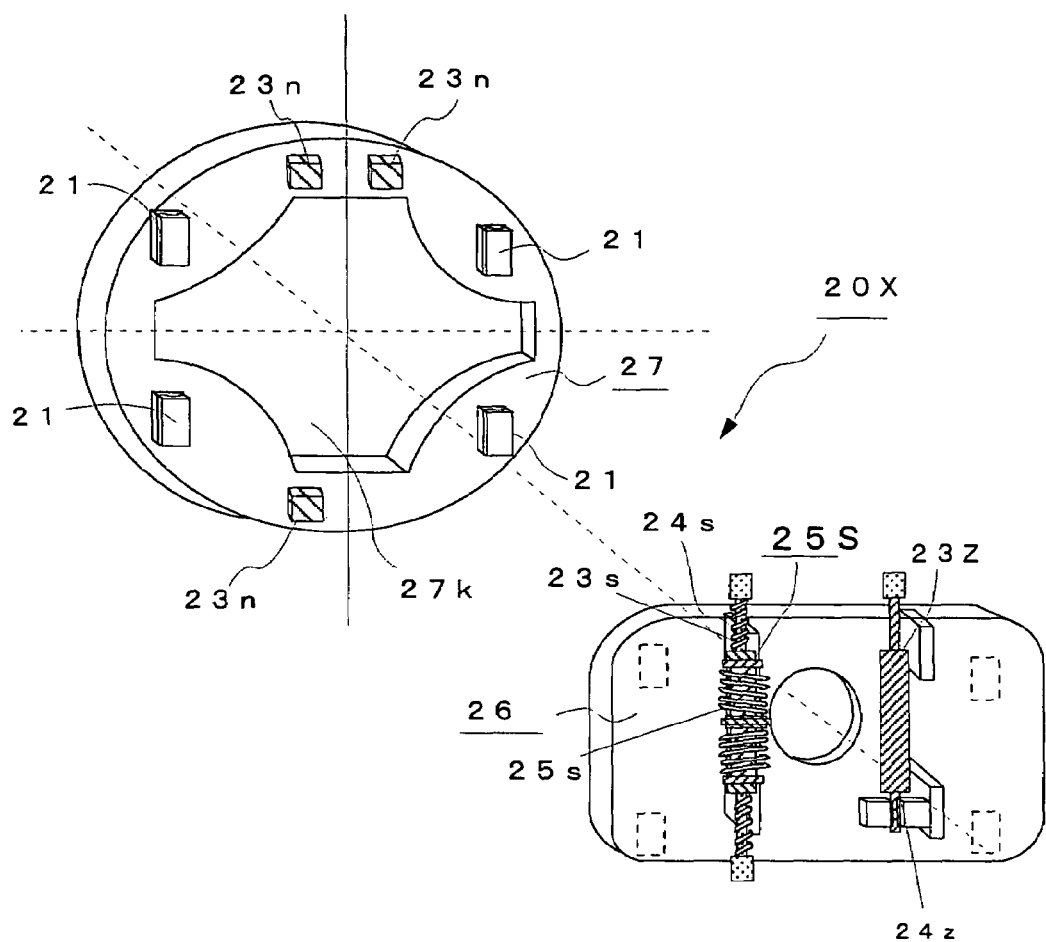
FIG. 32 is a diagram showing the constitution of a damping mechanism comprising a composite connection damper according to Embodiment 3.

In the above Embodiments 1 and 2, the non-rotating side case 3a of the in-wheel motor 3 is supported to the knuckle 5 in the vertical direction by the damper 25 with a spring element which comprises the damper 23 and the second spring element 24 connected to the damper 23 in series. Even when the non-rotating side case 3a of the in-wheel motor 3 is connected to the knuckle 5 by a damping mechanism 20X for supporting the non-rotating side case 3a of the in-wheel motor 3 to the knuckle 5 in the vertical direction by means of a composite connection damper 25S whose spring element 23s and damper element 24s connected in parallel are connected to a spring element 25s in series and a damper element 23Z arranged parallel to this composite connection damper 25S as shown in FIG. 32, variations in the ground-contact load at a frequency near the unsprung resonance frequency can be reduced.

Figure 33:
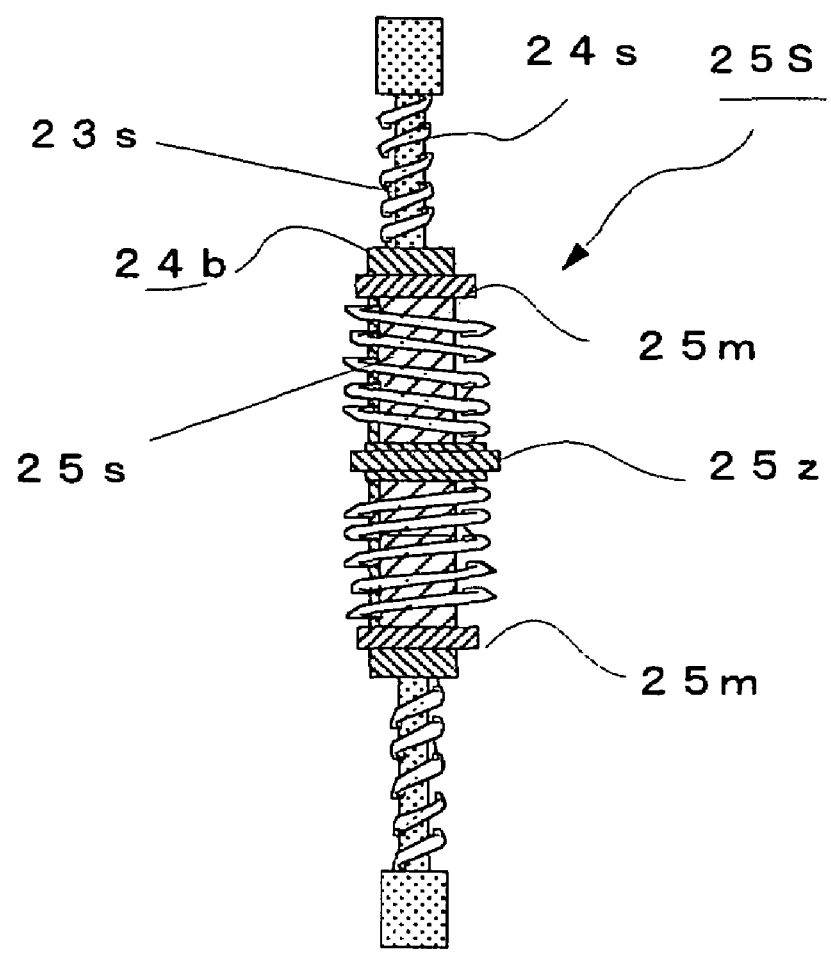
FIG. 33 is a diagram showing an example of the composite connection damper.

FIG. 33 shows an example of the above composite connection damper 25S. The cylinder body 24b of the above damper element 24s is mounted to the other end of the spring element 23s which is a metal spring connected to the motor 3 or the knuckle 5 in order to arrange the above spring element 23s and the above damper element 24s in parallel, and the spring element 25s which is a metal spring is interposed between this cylinder body 24b and the knuckle 5 to connect the above spring element 25s to the above spring element 23s and the above damper element 24s in series. In FIG. 33, 25m denotes an attachment portion for attaching the above spring element 25s to the knuckle side plate 26, and 25z denotes an attachment portion for attaching the above spring element 25s to the cylinder body 24b.

Since the relatively heavy cylinder portion of the damper element 24s for supporting the motor 3 can be interposed between the spring element 23s and the spring element 25s due to the above constitution, it is possible to reduce the unsprung mass and improve the road holding properties of the vehicle.

In the damping mechanism 20X of this embodiment, when the motor 3 vibrates in the wheel 2 by the input of vibration from the road when the vehicle runs on a bad road, the operation speed of the composite connection damper 25S for connecting the motor 3 and the knuckle 5 increases as its vibration frequency becomes higher. That is, while the first spring element 22 functions as a damper having a fixed spring constant at any frequency in the in-wheel motor system of the prior art shown in FIG. 74, as the spring element 25s is connected in series to the spring element 23s and the damper element 24s connected to the spring element 23s in parallel in the above composite connection damper 25S, the damping force of the damper element 24s is low at a low frequency band at which the operation speed is slow and the above composite connection damper 25S functions as a weak spring in which the spring element 23s and the spring element 25s are connected in series. The damping force of the above damper element 24s increases at a high frequency band at which the operation speed is fast to fix the above spring element 23s connected to the above damper element 24s in parallel, whereby the composite connection damper 25S functions as a hard spring consisting of only the spring element 25s. By arranging the above composite connection damper 25S parallel to the damper element 23Z, vibration having a frequency near the relatively high unsprung resonance frequency can be more effectively suppressed. Therefore, variations in the ground-contact load of the tire at a frequency near the unsprung resonance frequency can be reduced and the road holding properties of the vehicle can be further improved.

Figure 34:
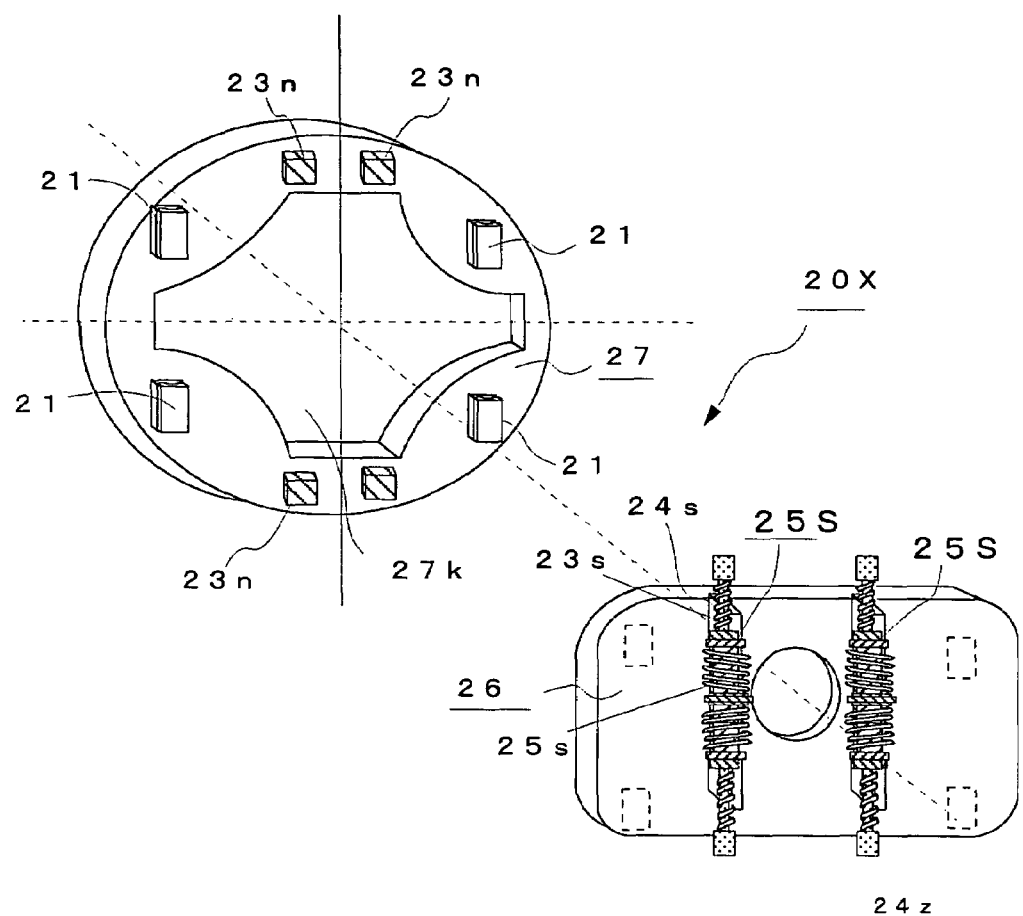
FIG. 34 is a diagram showing another example of the damping mechanism comprising composite connection dampers according to the present invention.

Since most of the damping force is generated by the damper element 24s of the composite connection damper 25S due to the above constitution, the damping force of the damper element 23Z may be small. Therefore, as shown in FIG. 34, it is possible to eliminate the above damper element 23Z and use only the composite connection damper 25S.

Figure 35:
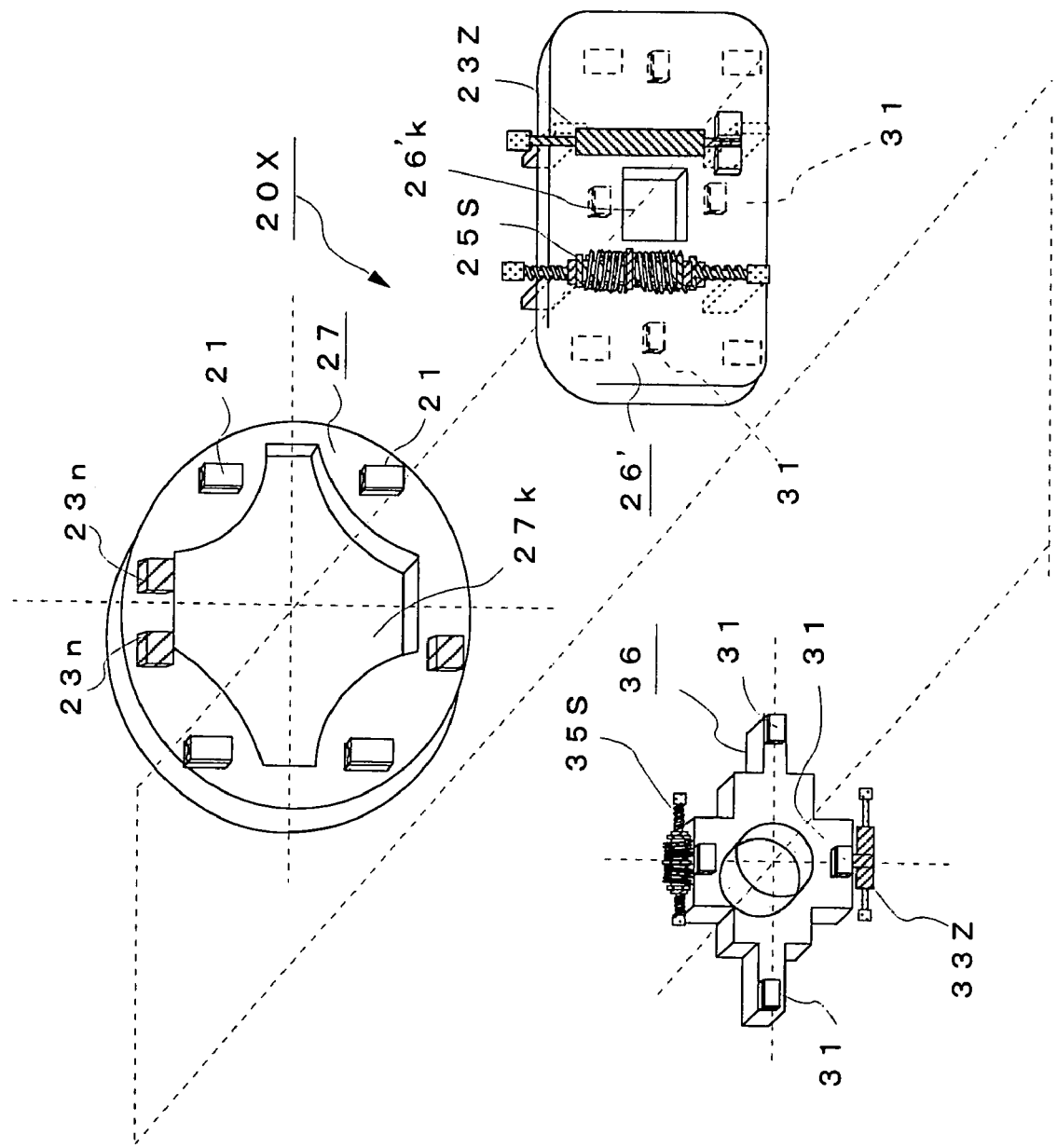
FIG. 35 is a diagram of an in-wheel motor supported by a composite connection damper in the horizontal direction in addition to the vertical direction.

In the above embodiment, the vertical vibration of the vehicle is reduced. As shown in FIG. 35, an intermediate plate 26' is prepared, a plate 36 having the above connection damper 35S and the damper element 33Z arranged parallel to each other is mounted to the motor attachment plate 27 side of the intermediate plate 26', this plate 36 and the intermediate plate 26' are assembled together by four direct-acting guides 31 for guiding in the horizontal direction, arranged symmetrical to the center of the plate, and this plate 36 is fitted onto the axle 6 connected to the knuckle 5 to provide a dynamic damper effect in the horizontal direction in addition to the vertical direction of the vehicle. Therefore, variations in the ground-contact load of the tire can be further reduced, and variations in the longitudinal force of the tire can be further suppressed.

Figure 36:
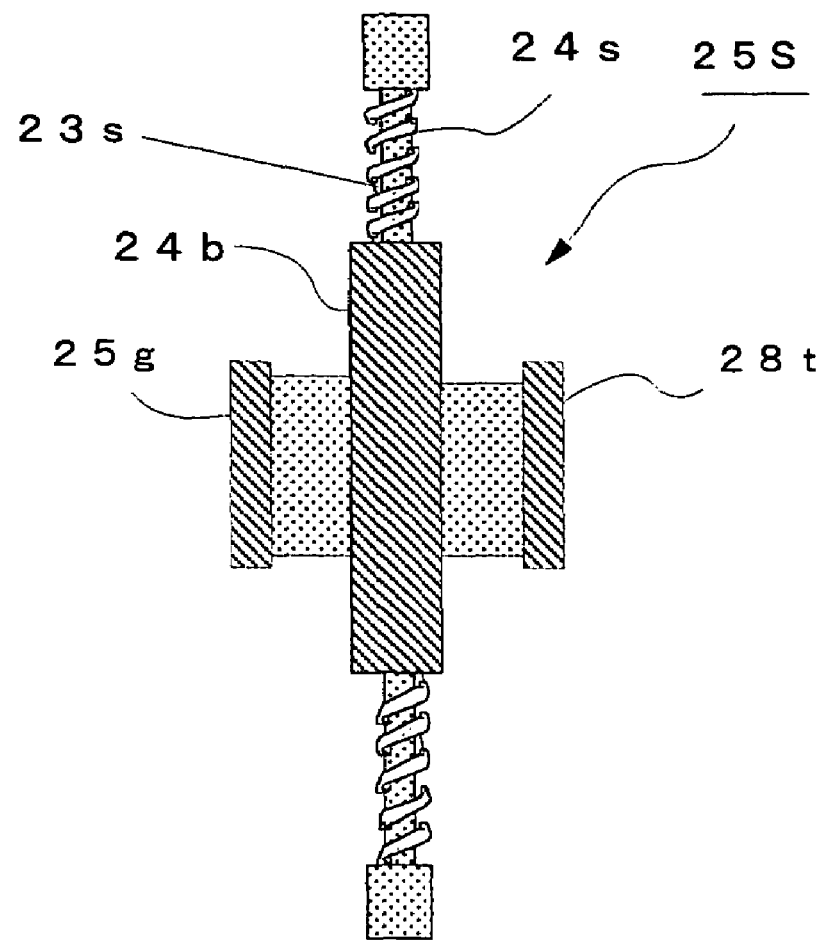
FIG. 36 is a diagram of another example of the composite connection damper of the present invention.

In the above Embodiment 3, the above spring element 25s is a metal spring. It is not limited to this and may be an air spring or bush-like object made of rubber (rubber bush 25g in the figure) as shown in FIG. 36 which is attached to the intermediate plate 26' by a bush attachment portion 28t to support the above cylinder body 24b.

Figure 37:
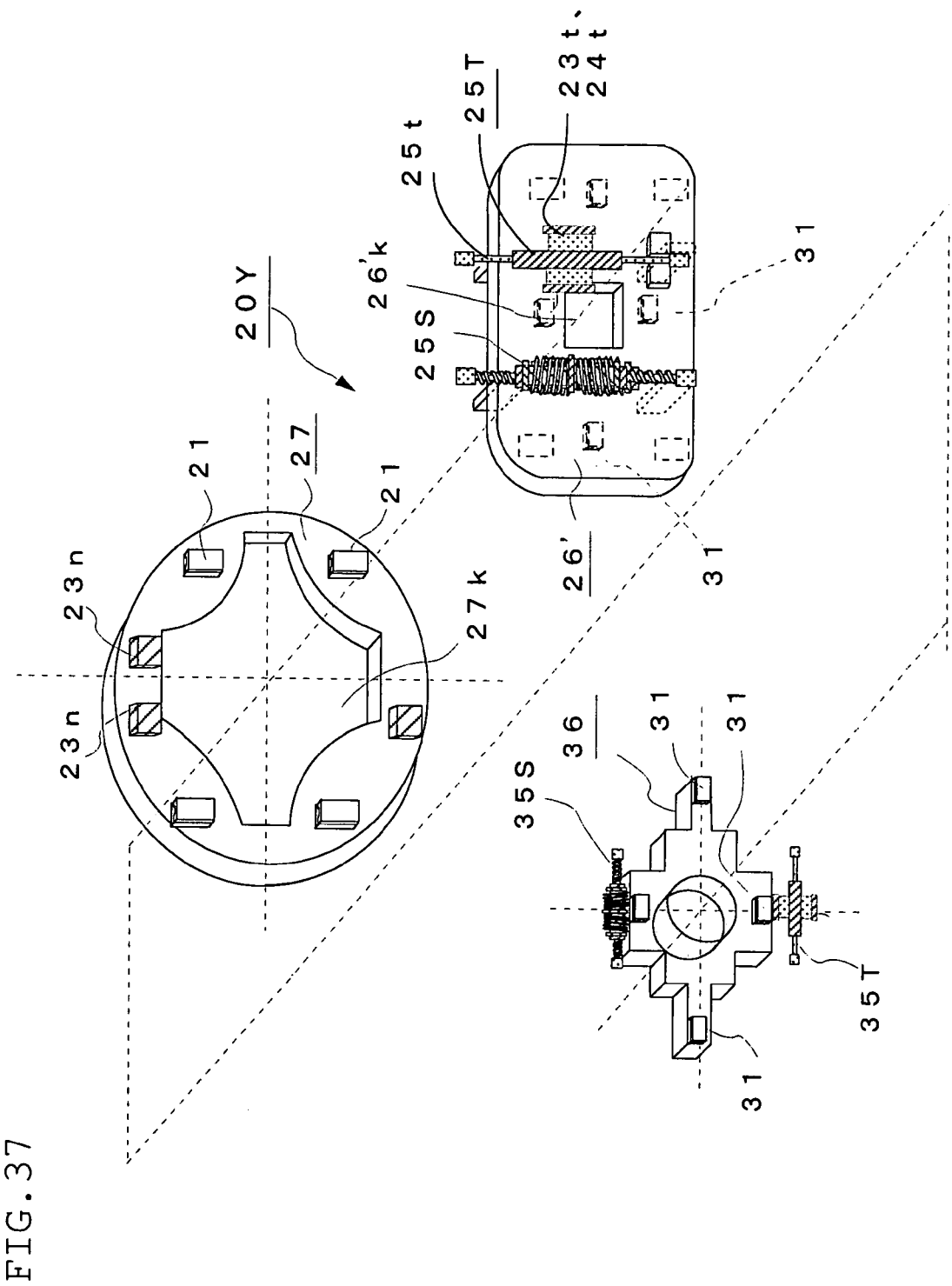
FIG. 37 is a diagram showing the constitution of a damping mechanism comprising the composite connection damper of the present invention and a second composite connection damper.
Figure 38:
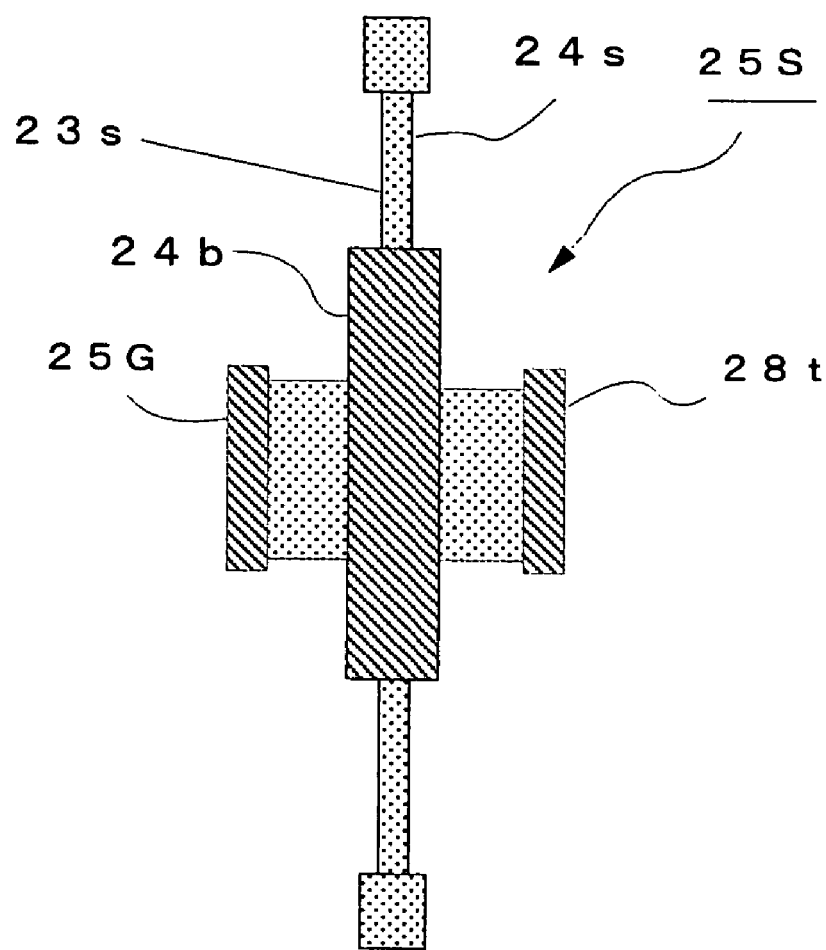
FIG. 38 is a diagram of another example of the second composite connection damper.

In the above embodiment, the in-wheel motor 3 is supported to the knuckle 5 in the vertical direction by the composite connection damper 25S and the damper element 23Z arranged parallel to the composite connection damper 25S. As shown in FIG. 37, even when a second composite connection damper 25T in which a spring element 23t and a damper element 24t connected in parallel are connected to a damper element 25t in series is prepared and the non-rotating side case 3a of the motor 3 is connected to the knuckle 5 by a damping mechanism 20Y comprising the above composite connection damper 25S and the above second composite connection damper 25T arranged parallel to the composite connection damper 25S, variations in ground-contact load at a frequency near the unsprung resonance frequency can be reduced. FIG. 38 shows an example of the second composite connection damper 25T. In this second composite connection damper 25T, a rubber bush 25G is attached to the cylinder body 24b of the damper element 25t and mounted to the intermediate plate 26'. Since the rubber bush 25G composed of a rubber elastic body is a spring/damper element, a member for connecting the spring element 23t and the damper element 24t in parallel can be constructed. Since the cylinder portion of the damper element 25t can be interposed between the spring element 23t and the damper element 24t due to the above constitution, the unsprung mass can be reduced and the road holding properties of the vehicle can be improved.

At a low frequency band, damping force is low as the operation speed of the above damper element 25t is slow and the above second composite connection damper 25T serves as a damper. At a high frequency band, the damping force of the above damper element 24t is high, and the above spring element 23t moves, whereby the above second composite connection damper 25T serves as a spring as the timing of generating damping is delayed. That is, the above second composite connection damper 25T can change a whole spring constant by frequency like the above composite connection damper 25S. Therefore, as shown in FIG. 36, when the in-wheel motor 3 is supported by using the above second composite connection damper 25T and the above composite connection damper 25S, variations in the ground-contact load of the tire at a frequency near the unsprung resonance frequency can be further reduced.

The damping mechanisms 20X and 20Y of this Embodiment can be applied not only to the hollow outer rotor type in-wheel motor 3 but also to a geared motor which is a combination of a hollow inner rotor type motor and a speed reducing gear.

EXAMPLE 3-1

Figure 44:
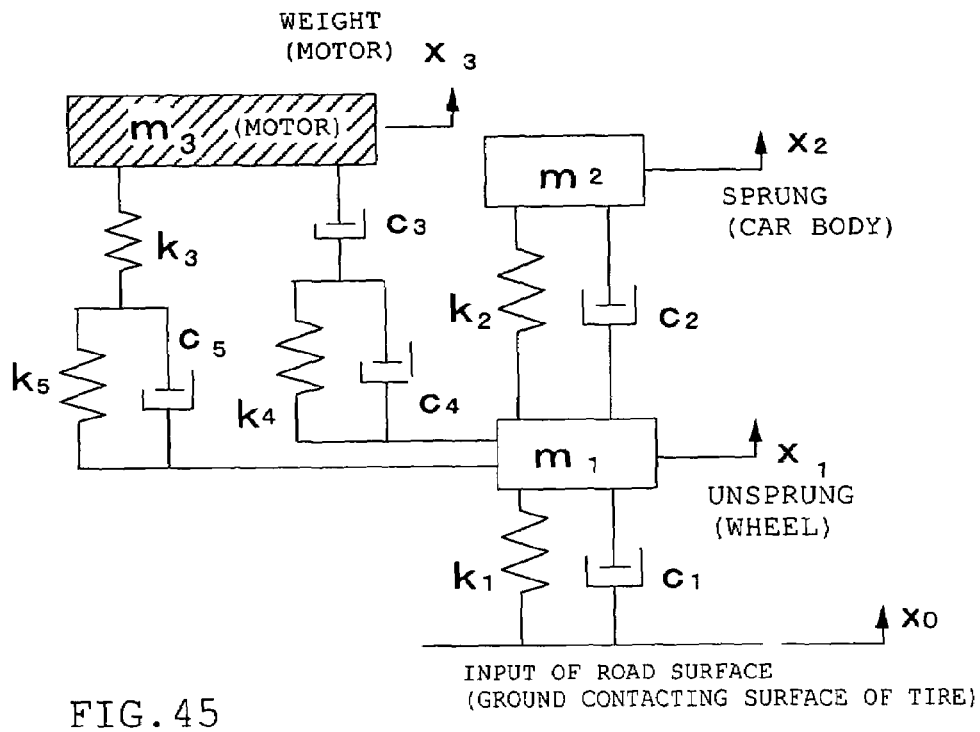
FIG. 44 is a diagram showing a vehicle vibration model (variations in ground-contact load) in the in-wheel motor system of the present invention.
Figure 45:
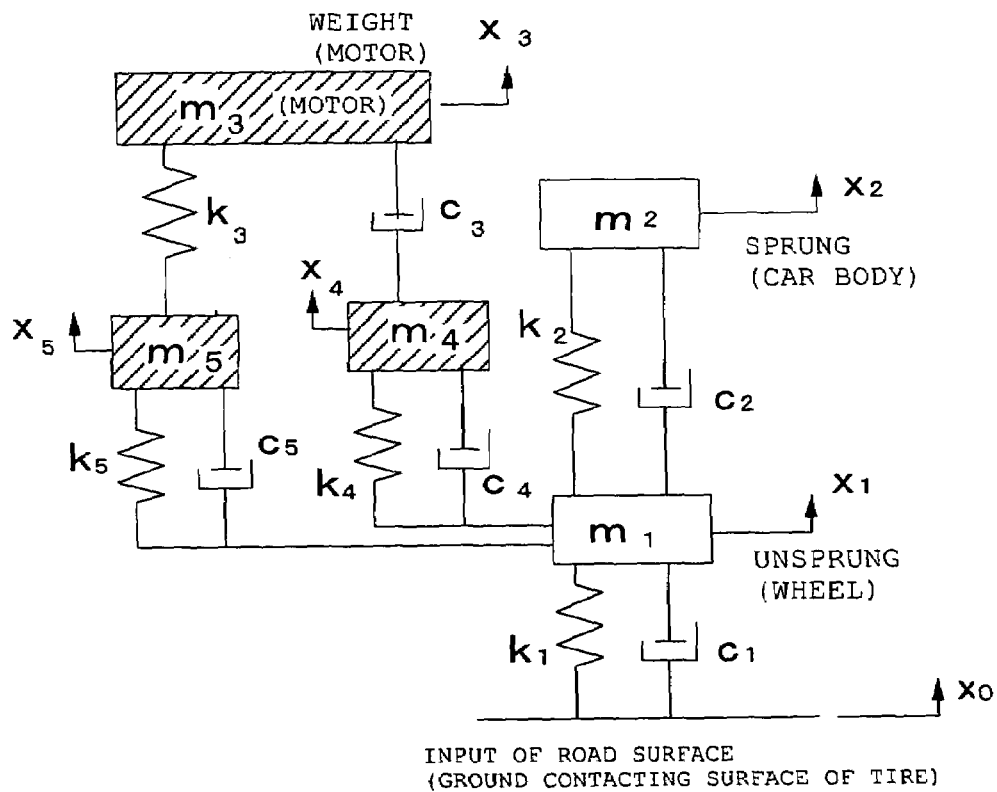
FIG. 45 is a diagram showing a vehicle vibration model (variations in ground-contact load) in the in-wheel motor system of the present invention.
Figure 46:
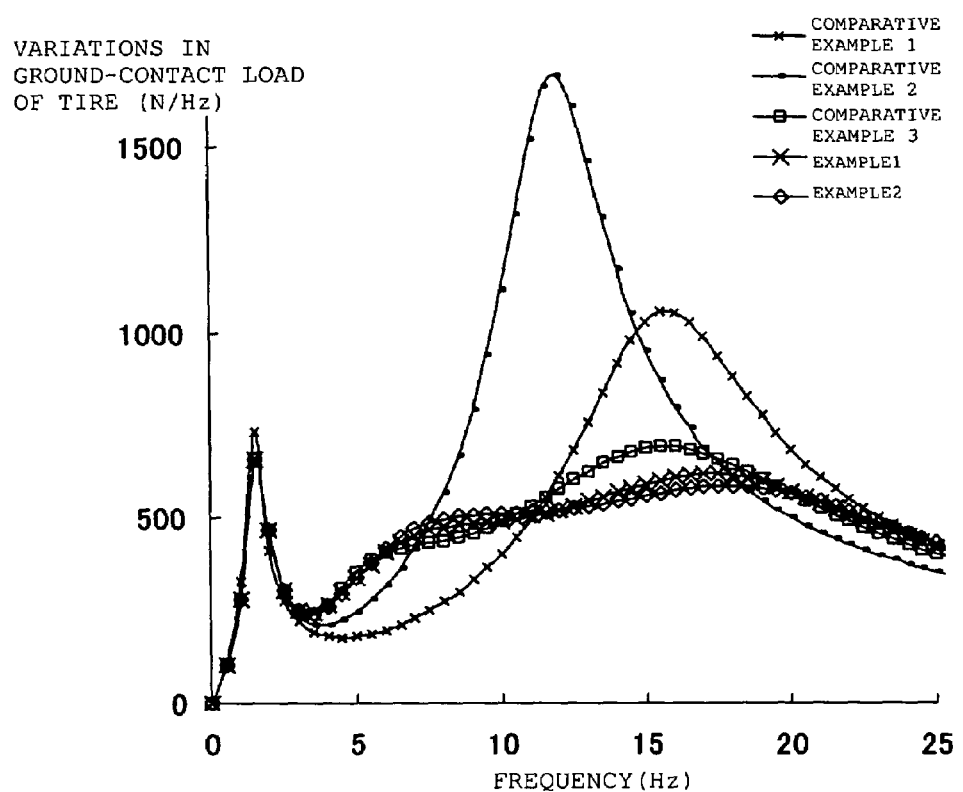
FIG. 46 is a graph showing the analytical results of the vehicle vibration models (variations in ground-contact load)
Figure 47:
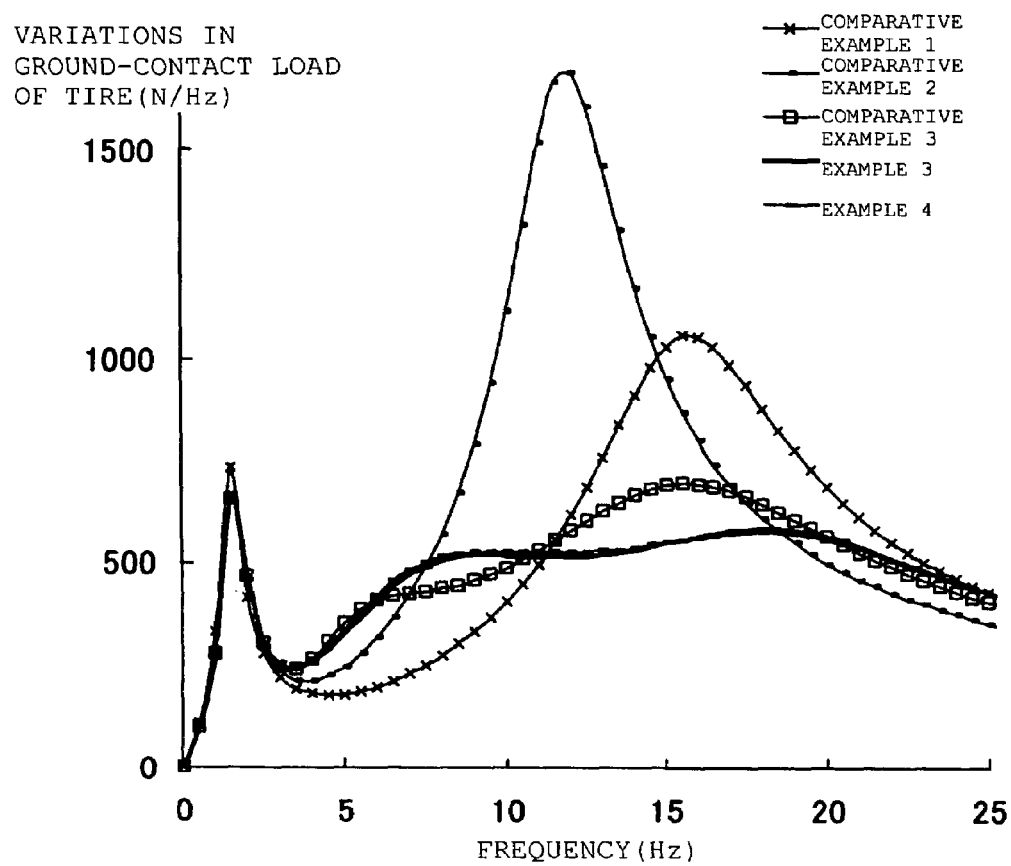
FIG. 47 is a graph showing the analytical results of the vehicle vibration models (variations in ground-contact load)

The table of FIG. 39 shows parameters indicative of the characteristic properties in the vertical direction of the vehicle for analyzing variations in the ground-contact load which occur in the tire when the vehicle runs on a bad road, FIGS. 40($a$) and 40($b$) and FIGS. 41 to 45 show vibration models thereof, and FIG. 46 and FIG. 47 are graphs showing analytical results obtained from the above vibration models.

In the above table, $m_1$ is the unsprung mass of a wheel or the like, $m_2$ is the sprung mass of a body or the like, $m_3$ is the mass of a motor as a dynamic damper, $m_4$ is the mass of a cylinder as a dynamic damper (second composite connection damper), $m_5$ is the mass of a cylinder as a dynamic damper (composite connection damper), $k_1$ is the constant of the longitudinal spring of the tire, $k_2$ is the constant of a spring in the vertical direction of the suspension, $k_3$ is the constant of a motor supporting spring, $k_4$ is the constant of a damper supporting spring, $k_5$ is the constant of a spring constituting a damper+spring parallel unit connected to the motor supporting spring in series, $c_1$ is the coefficient of damping in the vertical direction of the tire, $c_2$ is the coefficient of damping in the vertical direction of the suspension, $c_3$ is the coefficient of damping in the vertical direction of the motor supporting damper, $c_4$ is the coefficient of damping in the vertical support direction of the damper connected to the motor supporting damper in series, and $c_5$ is the coefficient of damping in the vertical support direction of the damper constituting the damper+spring parallel unit connected to the motor supporting spring in series.

Comparative Example 1 is an electric car which does not employ an ordinary in-wheel motor system and is represented by the vibration model of FIG. 40($a$). In FIG. 40($a$), as the motor is mounted on the car body side, the mass of the motor corresponds to the sprung mass $m_2$.

Comparative Example 2 is an in-wheel motor car comprising an unsprung motor of the prior art which is represented by the vibration model of FIG. 40($b$). This corresponds to FIG. 72.

Comparative. Example 3 is a dynamic damper type in-wheel motor car of the prior art in which a motor serves as a dynamic damper and which is represented by the vibration model of FIG. 41. Comparative Example 3 corresponds to FIG. 73.

Figure 42:
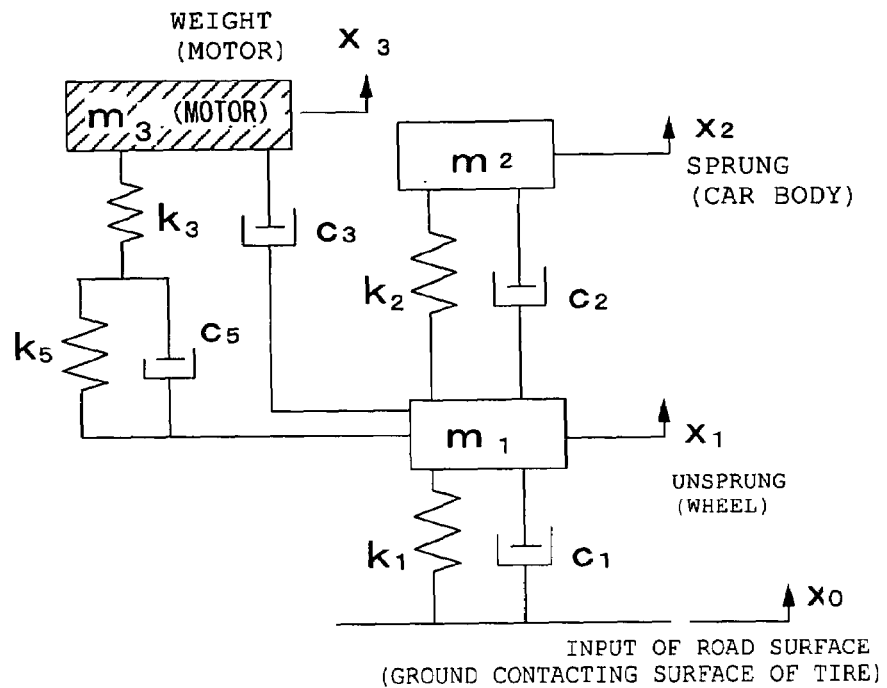
FIG. 42 is a diagram showing a vehicle vibration model (variations in ground-contact load) in the in-wheel motor system of the present invention.

Example 1 is an in-wheel motor car in which a motor serves as a dynamic damper by means of a damping unit comprising a spring element and a composite connection damper arranged parallel to each other according to the present invention and which is represented by the vibration model of FIG. 42.

Figure 43:
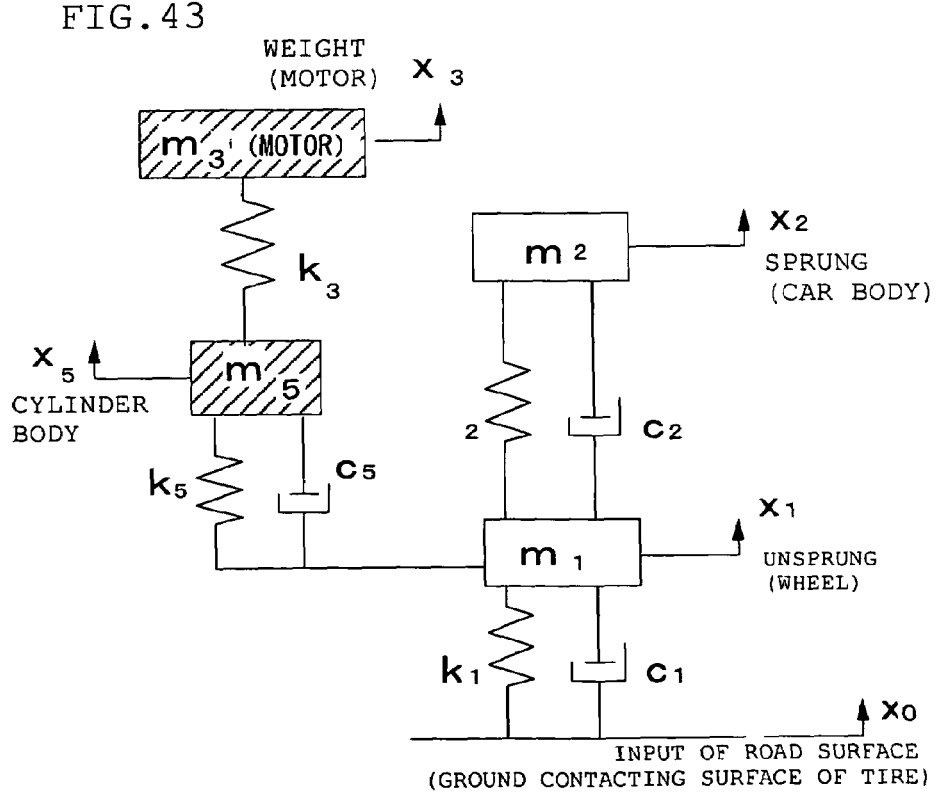
FIG. 43 is a diagram showing a vehicle vibration model (variations in ground-contact load) in the in-wheel motor system of the present invention.

Example 2 is an in-wheel motor car in which a motor serves as a dynamic damper by means of a damping unit comprising two composite connection dampers arranged parallel to each other according to the present invention and which is represented by the vibration model of FIG. 43.

Example 3 is an in-wheel motor car in which a motor serves as a dynamic damper by means of a damping unit comprising a composite connection damper and a second composite connection damper arranged parallel to each other according to the present invention and which is represented by the vibration model of FIG. 44.

Example 4 is an in-wheel motor car in which a motor serves as a dynamic damper by means of a damping unit comprising a composite connection damper and a second composite connection damper arranged parallel to each other according to the present invention and which is represented by the vibration model of FIG. 45.

When the motor is mounted to an unsprung mass corresponding portion such as a wheel or knuckle as in Comparative Example 2, the unsprung mass increases, whereby variations in the ground-contact load of the tire increase and the road holding properties deteriorate as compared with Comparative Example 1 in which the unsprung mass is small as shown in FIG. 46.

Since the mass of the motor is removed from the unsprung mass when the motor is mounted as a dynamic damper as in Comparative Example 3, the unsprung mass can be reduced to a value equal to that of the above Comparative Example 1 and unsprung vibration is suppressed by the function of the dynamic damper. Consequently, as shown in FIG. 46, variations in the ground-contact load of the tire can be greatly reduced as compared with the electric car which does not employ an ordinary in-wheel motor system shown in the above Comparative Example 1. When the vibration model shown in FIG. 42 is constructed as in Example 1, variations in the ground-contact load of the tire at a frequency around 7 Hz which is the resonance frequency of the dynamic damper are slightly large as shown in FIG. 46 but variations in the ground-contact load of the tire at a frequency from 7 Hz to 16 Hz which is the unsprung resonance frequency can be made smaller than that of the above Comparative Example 3.

When the vibration model shown in FIG. 43 is constructed as in the above Example 2, variations in the ground-contact load of the tire at a frequency near the unsprung resonance can be further reduced as compared with the above Example 1 as shown in FIG. 46.

When the vibration model shown in FIG. 44 is constructed as in the above Example 3, variations in the ground-contact load of the tire at a frequency near the unsprung resonance frequency can be further reduced as shown in FIG. 47.

Since the vibration model shown in FIG. 45 is constructed as in Example 4 and the mass of the cylinder is raised from below the spring and the motor side, variations in the ground-contact load at a frequency near the unsprung resonance frequency are much smaller than those of the above Example 3 as shown in FIG. 47.

EXAMPLE 3-2

Figure 55:
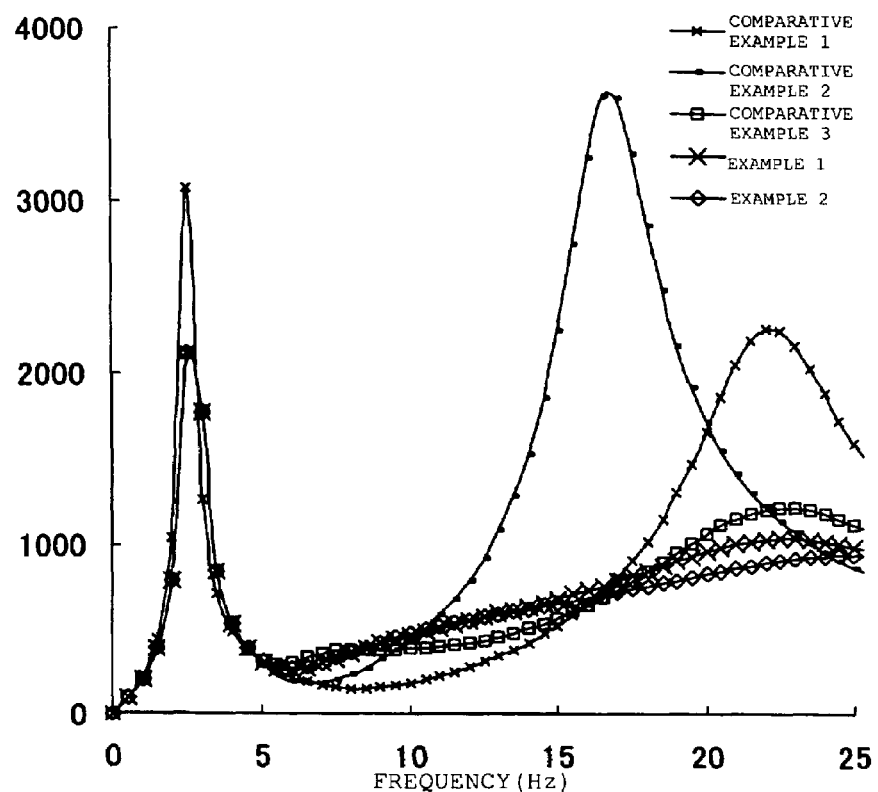
FIG. 55 is a graph showing the analytical results of the vehicle vibration models (variations in longitudinal force)
Figure 56:
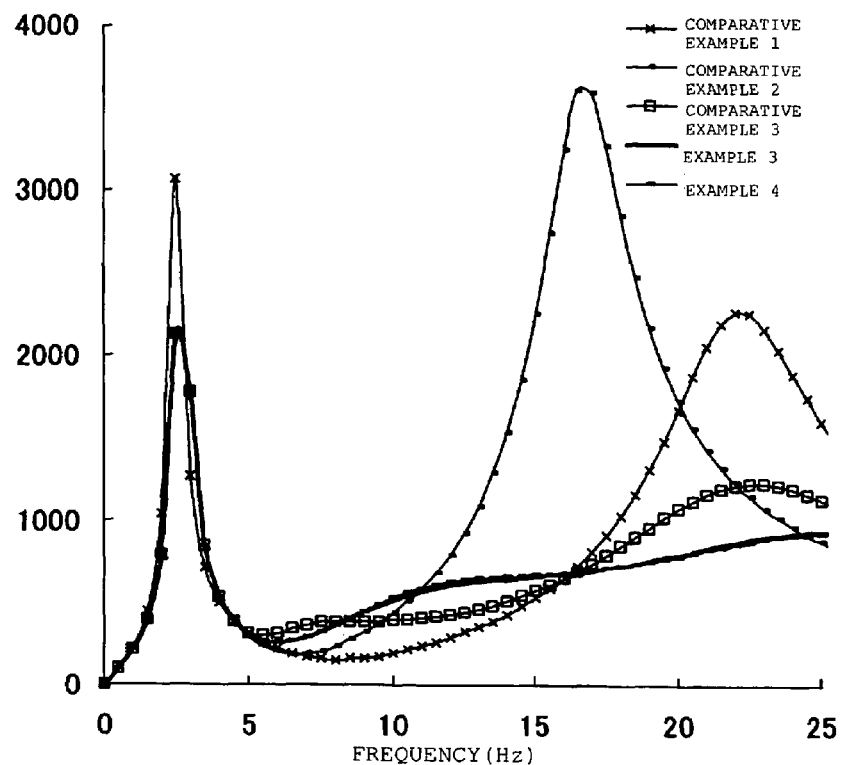
FIG. 56 is a graph showing the analytical results of the vehicle vibration models (variations in longitudinal force)

The table of FIG. 48 shows parameters indicative of the characteristic properties in the horizontal direction of the vehicle for analyzing variations in longitudinal force which occur in the tire when the vehicle runs on a bad road. FIGS. 49($a$) and 49($b$) and FIGS. 50 to 54 show vibration models thereof, and FIG. 55 and FIG. 56 are graphs showing analytical results obtained from the above vibration models.

In the above table, $m_1$ is the unsprung mass of a wheel or the like, $m_2$ is the sprung mass of a body or the like, $m_3$ is the mass of a motor as a dynamic damper, $m_4$ is the mass of a cylinder as a dynamic damper (second composite connection damper), $m_5$ is the mass of a cylinder as a dynamic damper (composite connection damper), $k_1$ is the constant of the longitudinal spring of the tire, $k_2$ is the constant of a spring in the horizontal direction of the suspension, $k_3$ is the constant of a motor supporting spring, $k_4$ is the constant of a damper supporting spring, $k_5$ is the constant of a spring constituting a damper+spring parallel unit connected to the motor supporting spring in series, $c_1$ is the coefficient of damping in the horizontal direction of the tire, $c_2$ is the coefficient of damping in the horizontal direction of the suspension, $c_3$ is the coefficient of damping in the horizontal direction of the motor supporting damper, $c_4$ is the coefficient of damping in the horizontal support direction of the damper connected to the motor supporting damper in series, and $c_5$ is the coefficient of damping in the vertical support direction of the damper constituting the damper+spring parallel unit connected to the motor supporting spring in series.

Figure 49A:
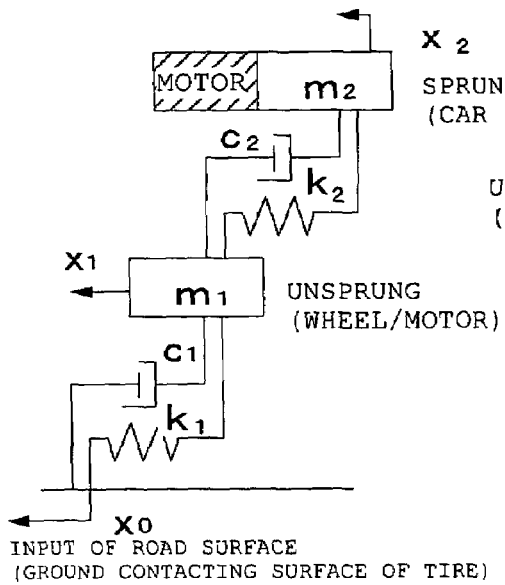
FIGS. 49(a) and 49(b) are diagrams showing vehicle vibration models (variations in longitudinal force) in the in-wheel motor systems of the prior art.

Comparative Example 1 is an electric car which does not employ an ordinary in-wheel motor system and is represented by the vibration model of FIG. 49(a).

Figure 49B:
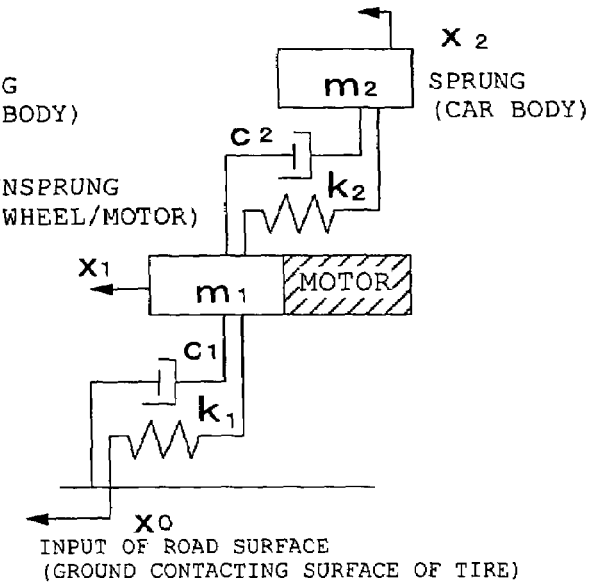

Comparative Example 2 is an in-wheel motor car comprising an unsprung motor of the prior art which is represented by the vibration model of FIG. 49(b).

Figure 50:
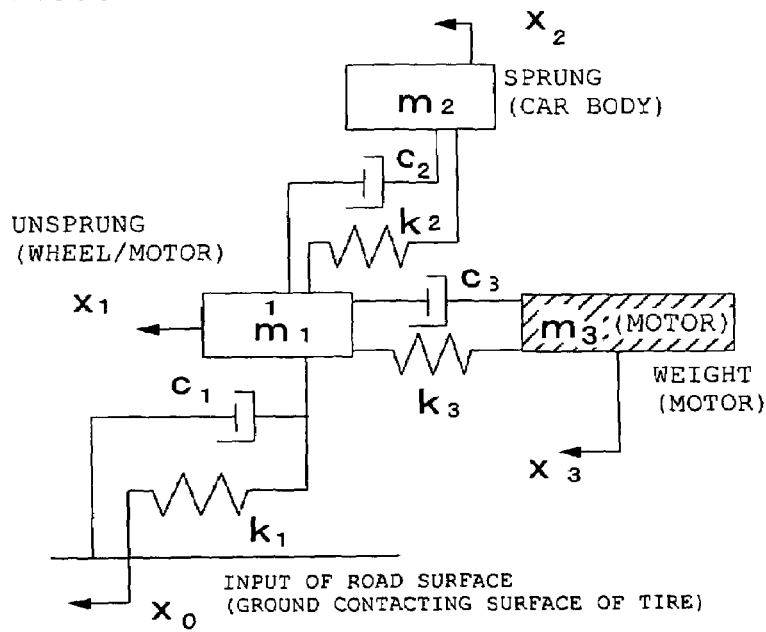
FIG. 50 is a diagram showing a vehicle vibration model (variations in longitudinal force) in the dynamic damper type in-wheel motor system of the prior art.

Comparative Example 3 is a dynamic damper type in-wheel motor car of the prior art which is represented by the vibration model of FIG. 50.

Figure 51:
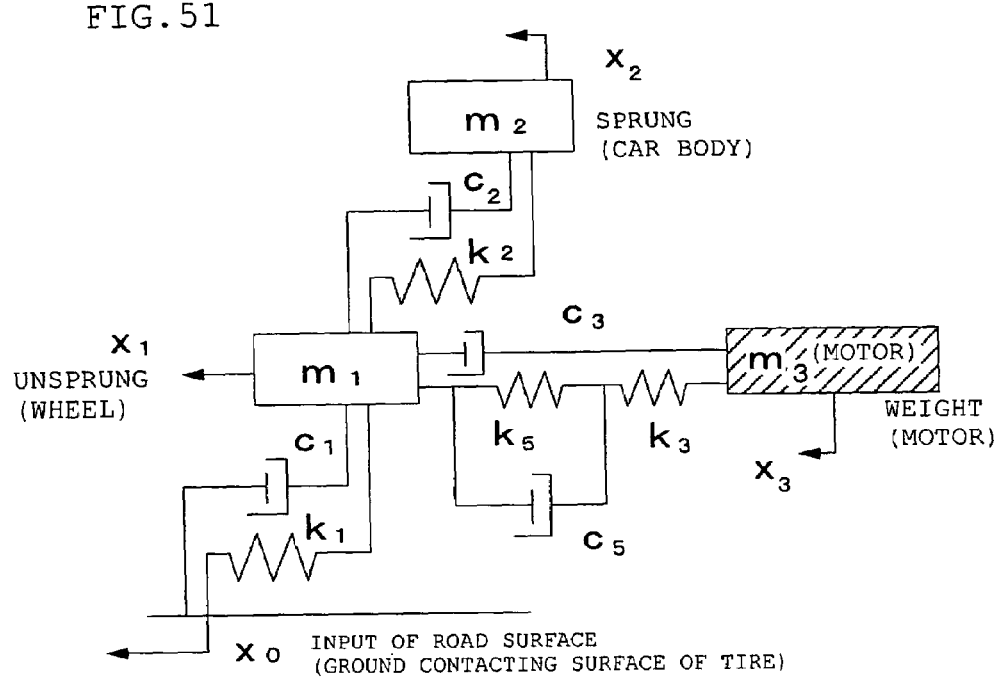
FIG. 51 is a diagram showing a vehicle vibration model (variations in longitudinal force) in the in-wheel motor system of the present invention.

Example 1 is a dynamic damper type in-wheel motor car according to the present invention which is represented by the vibration model of FIG. 51. This corresponds to FIG. 35.

Figure 52:
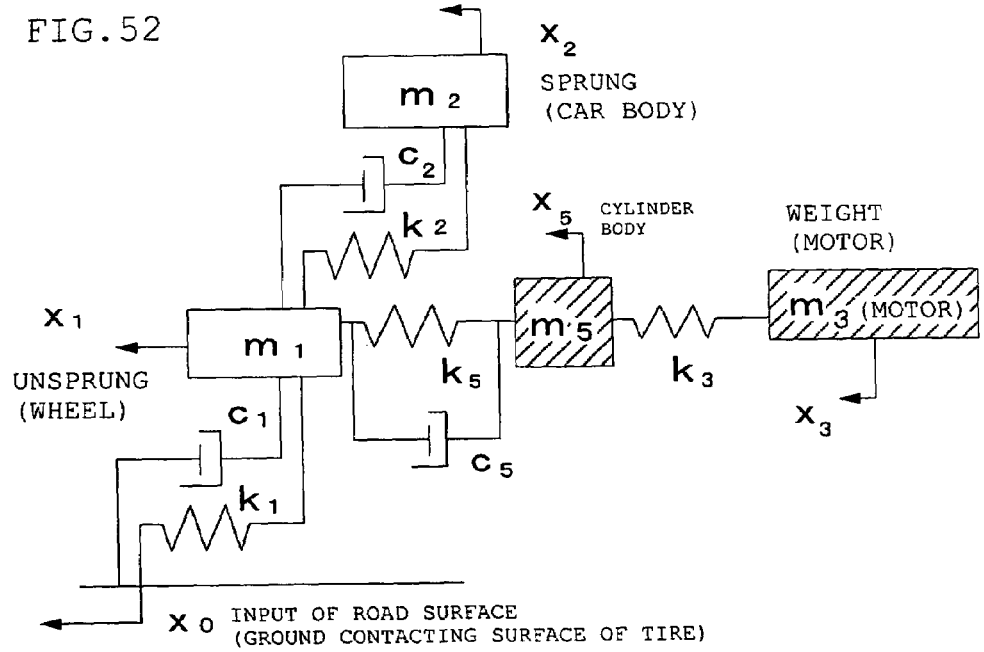
FIG. 52 is a diagram showing a vehicle vibration model (variations in longitudinal force) in the in-wheel motor system of the present invention.

Example 2 is a dynamic damper type in-wheel motor car according to the present invention which is represented by the vibration model of FIG. 52.

Figure 53:
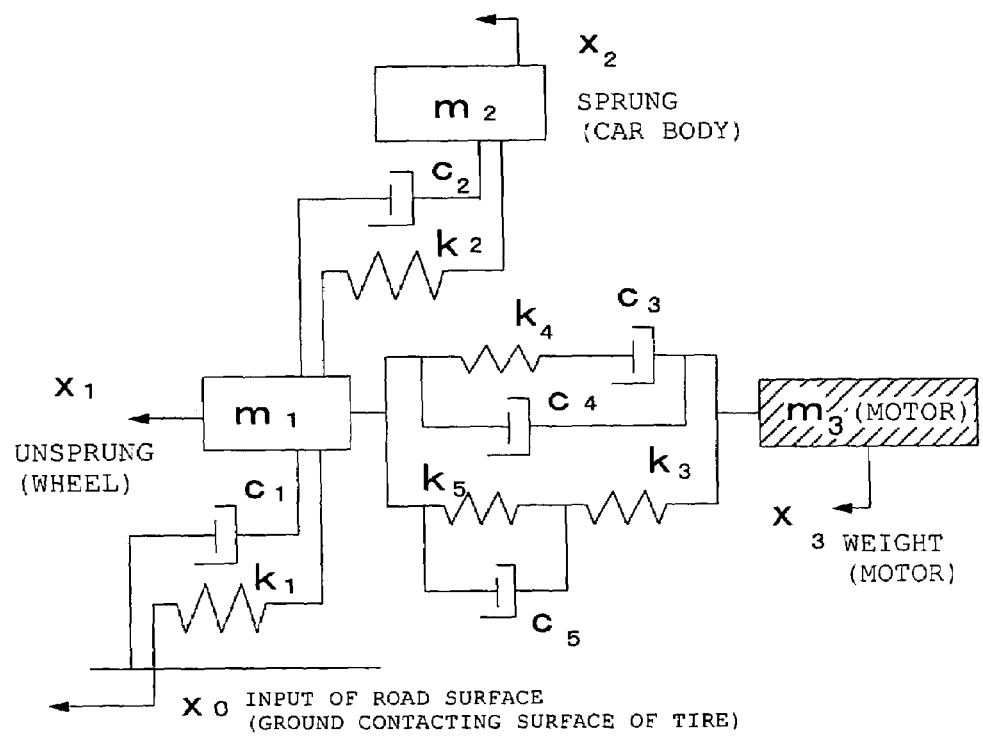
FIG. 53 is a diagram showing a vehicle vibration model (variations in longitudinal force) in the in-wheel motor system of the present invention.

Example 3 is a dynamic damper type in-wheel motor car according to the present invention which is represented by the vibration model of FIG. 53.

Figure 54:
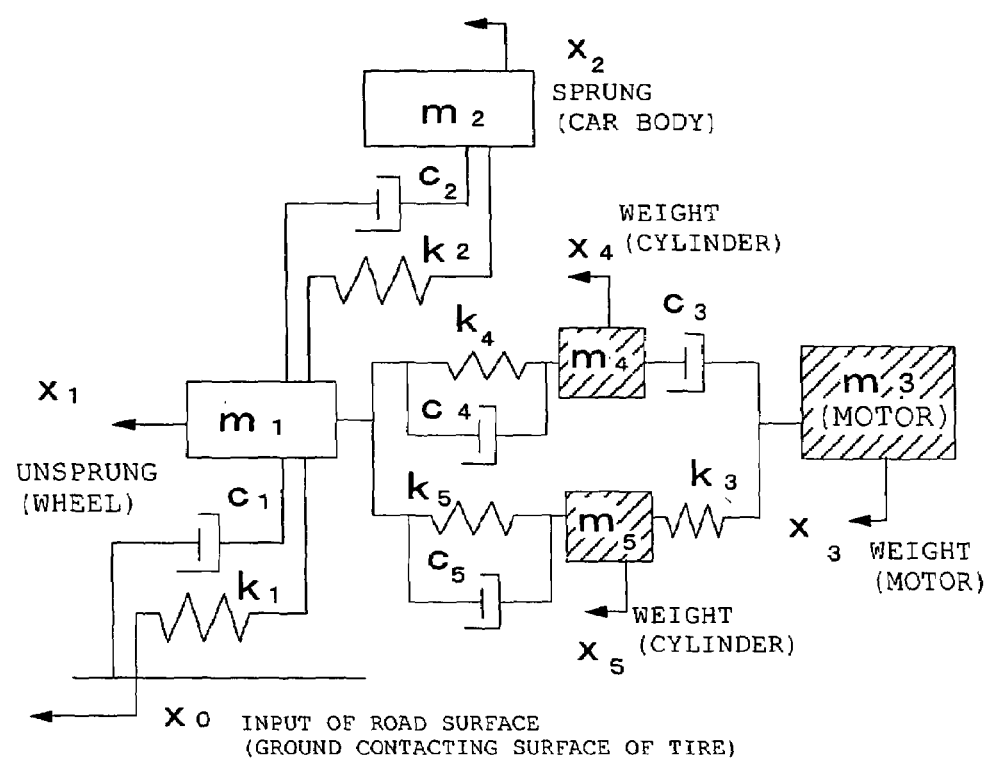
FIG. 54 is a diagram showing a vehicle vibration model (variations in longitudinal force) in the in-wheel motor system of the present invention.

Example 4 is a dynamic damper type in-wheel motor car according to the present invention which is represented by the vibration model of FIG. 54. This corresponds to FIG. 37.

When the motor is mounted to an unsprung mass corresponding portion such as a wheel or knuckle as in Comparative Example 2, variations in the longitudinal force of the tire increase and the road holding properties deteriorate as compared with Comparative Example 1 in which the unsprung mass is small as shown in FIG. 55.

Since the mass of the motor is removed from the unsprung mass when the motor is mounted as a dynamic damper as in Comparative Example 3, the unsprung mass can be reduced to a value equal to that of the above Comparative Example 1 and unsprung vibration is suppressed by the function of the dynamic damper. Consequently, as shown in FIG. 55, variations in the longitudinal force of the tire can be greatly reduced as compared with the electric car which does not employ an ordinary in-wheel motor system shown in the above Comparative Example 1.

However, when the vibration model shown in FIG. 51 is constructed as in Example 1, variations in the longitudinal force at a frequency around 10 Hz which is the resonance frequency of the dynamic damper are slightly large as shown in FIG. 55 but variations in the longitudinal force at a frequency from 10 Hz to 22 Hz which is the unsprung resonance frequency can be made smaller than that of the above Comparative Example 3.

When the vibration model shown in FIG. 52 is constructed as in the above Example 2, variations in the longitudinal force at a frequency near the unsprung resonance frequency can be further reduced as compared with the above Example 1 as shown in FIG. 55.

When the vibration model shown in FIG. 53 is constructed as in the above Example 3, variations in the longitudinal force at a frequency near the unsprung resonance frequency can be further reduced as shown in FIG. 56.

Since the vibration model shown in FIG. 55 is constructed as in Example 4 and the mass of the cylinder is raised from below the spring and the motor side, variations in the longitudinal force at a frequency near the unsprung resonance frequency are much smaller than those of the above Example 3 as show in FIG. 56.

Embodiment 4

Figure 57:
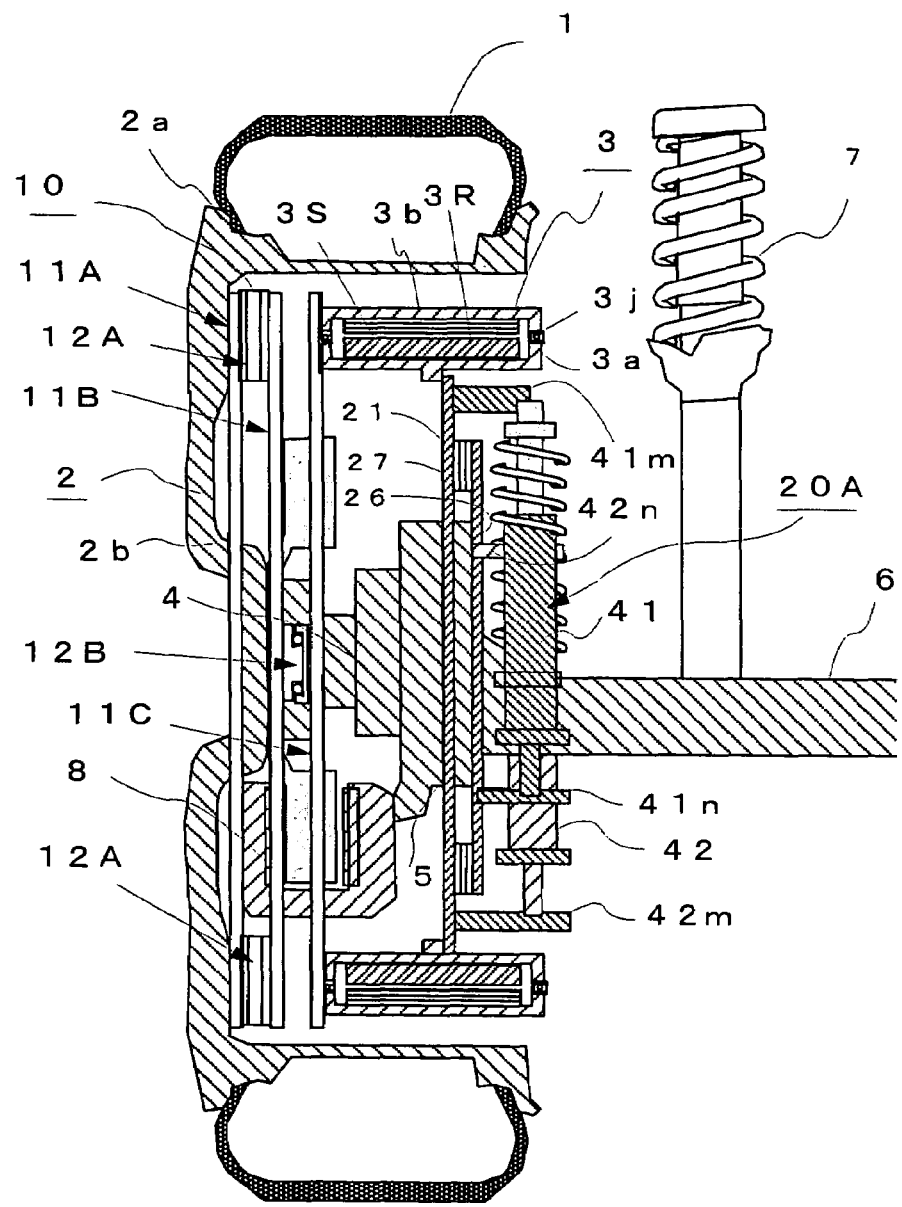
FIG. 57 is a longitudinal sectional view showing the constitution of an in-wheel motor system according to Embodiment 4 of the present invention.

FIG. 57 shows the constitution of an in-wheel motor system according to Embodiment 4. In FIG. 57, reference numeral 1 denotes a tire, 2 a wheel composed of a rim 2a and a wheel disk 2b, and 3 an outer rotor type in-wheel motor comprising a motor stator (to be referred to as "stator" hereinafter) 3S fixed to a non-rotating side case 3a installed on an inner side in the radial direction and a motor rotor (to be referred to as "rotor" hereinafter) 3R fixed to a rotating side case 3b rotatably connected to the above non-rotating side case 3a by a bearing 3j and installed on an outer side in the radial direction.

Numeral 4 denotes a hub portion connected to the rotary shaft of the wheel 2, 5 a knuckle as a frame dress-up part of the wheel, connected to an axle 6, 7 a suspension member composed of a shock absorber or the like, 8 a brake unit composed of a brake disk mounted to the above hub portion 4, 10 a flexible coupling for connecting the rotating side case 3b for supporting the rotor 3R of the above motor 3 and the wheel 2, and 20A a damping unit for elastically supporting the non-rotating side case 3a for supporting the stator 3S of the in-wheel motor 3 to the knuckle 5 in the vertical direction of the vehicle.

Figure 58:
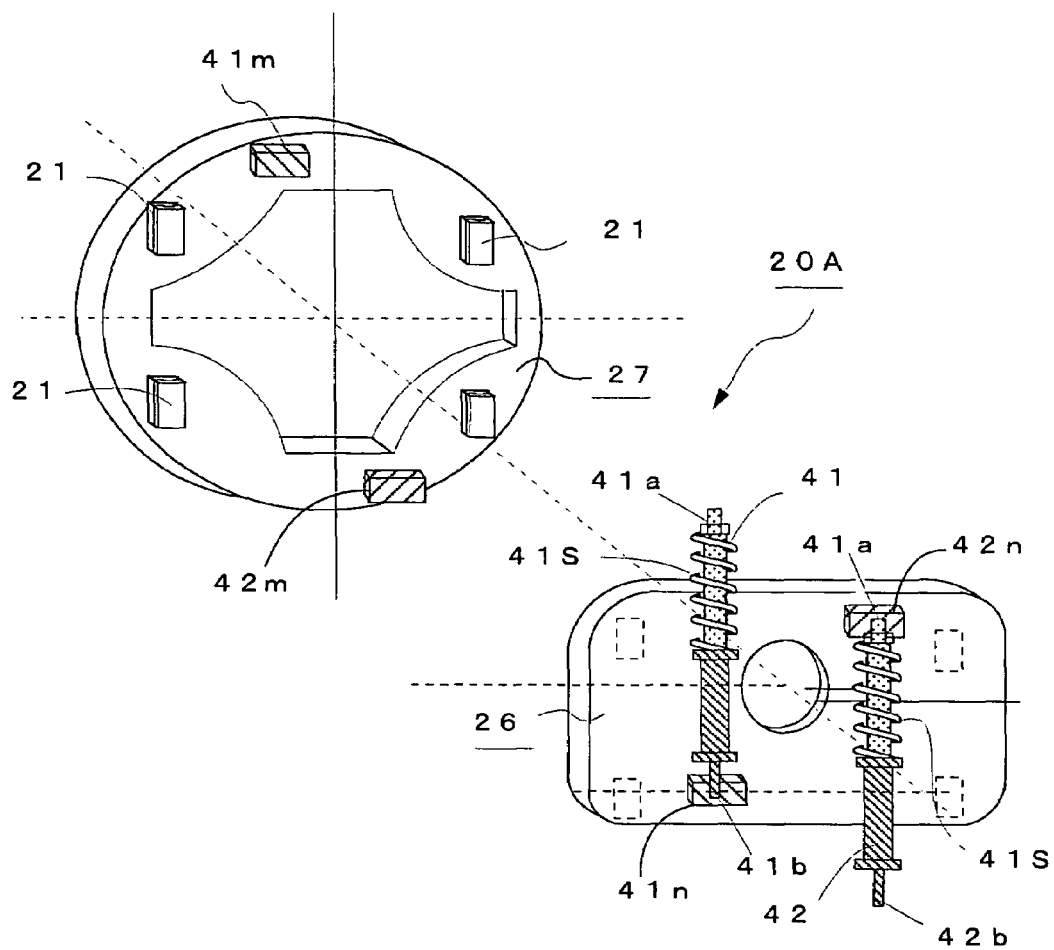
FIG. 58 is a diagram showing the constitution of a damping mechanism according to Embodiment 4.

As shown in FIG. 58, the above damping unit 20A uses a first shock absorber 41 which comprises a spring 41S and has a movable end 41a connected to a motor attachment plate 27 and a fixed end 41b connected to a knuckle attachment plate 26 which is the unsprung side of the vehicle and a second shock absorber 42 which comprises a spring 42S and has a movable end 42a connected to the knuckle attachment plate 26 and a fixed end 42b connected to the motor attachment plate 27 like the first shock absorber 41 to elastically support the in-wheel motor 3 below the spring, thereby making it possible to simplify and reduce the weight of the damping unit.

In FIG. 58, 41m is a damper attachment portion for accepting the movable end 41a of the first shock absorber 41, mounted to the motor attachment plate 27, and 42m is a damper attachment portion for accepting the fixed end 42b of the second shock absorber 42. 41n is a damper attachment portion for accepting the fixed end 41b of the first shock absorber 41, mounted on the knuckle attachment plate 26 and 42n is a damper attachment portion for accepting the movable end 42a of the second shock absorber 42.

Due to the above constitution, when the above motor 3 moves up in the wheel, the first shock absorber 41 moves in the expansion direction and the second shock absorber 42 moves in the contraction direction. When the above motor 3 moves down in the wheel 2, the first shock absorber 41 moves in the contraction direction and the second shock absorber 42 moves in the expansion direction. Therefore, even when the motor 3 moves in the vertical direction, the spring of either one of the shock absorbers is always compressed to exhibit elastic force.

Figure 74:
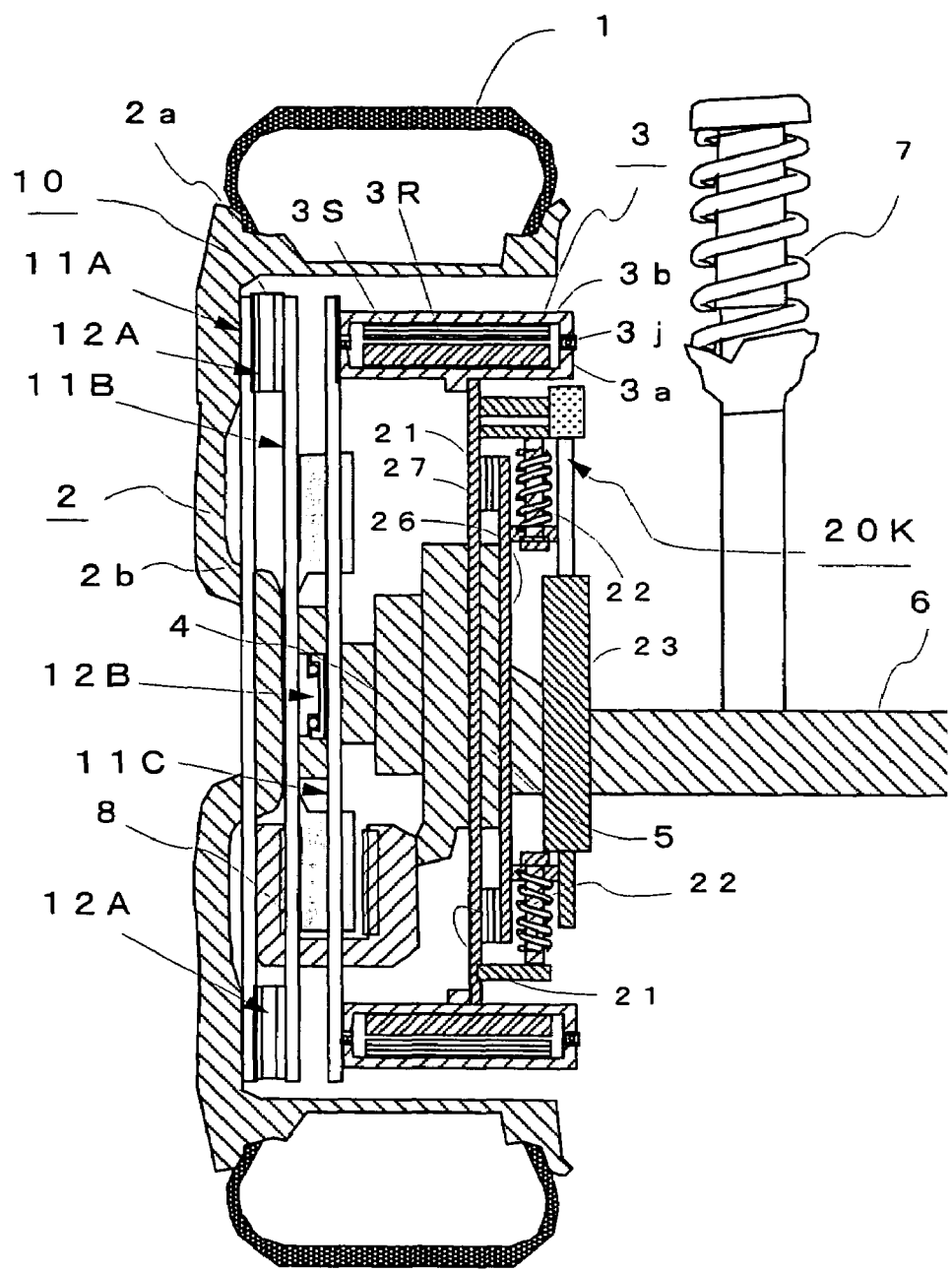
FIG. 74 is a diagram showing another example of the dynamic damper type in-wheel motor of the prior art.

Since the motor is elastically supported by the two shock absorbers 41 and 42, as compared with the in-wheel motor system of the prior art shown in FIG. 74, the number of elastic support parts can be greatly reduced and the damping unit can be made small in size and light in weight. Therefore, the unsprung mass of the vehicle can be reduced and variations in the ground-contact load of the tire can be further suppressed.

Figure 59:
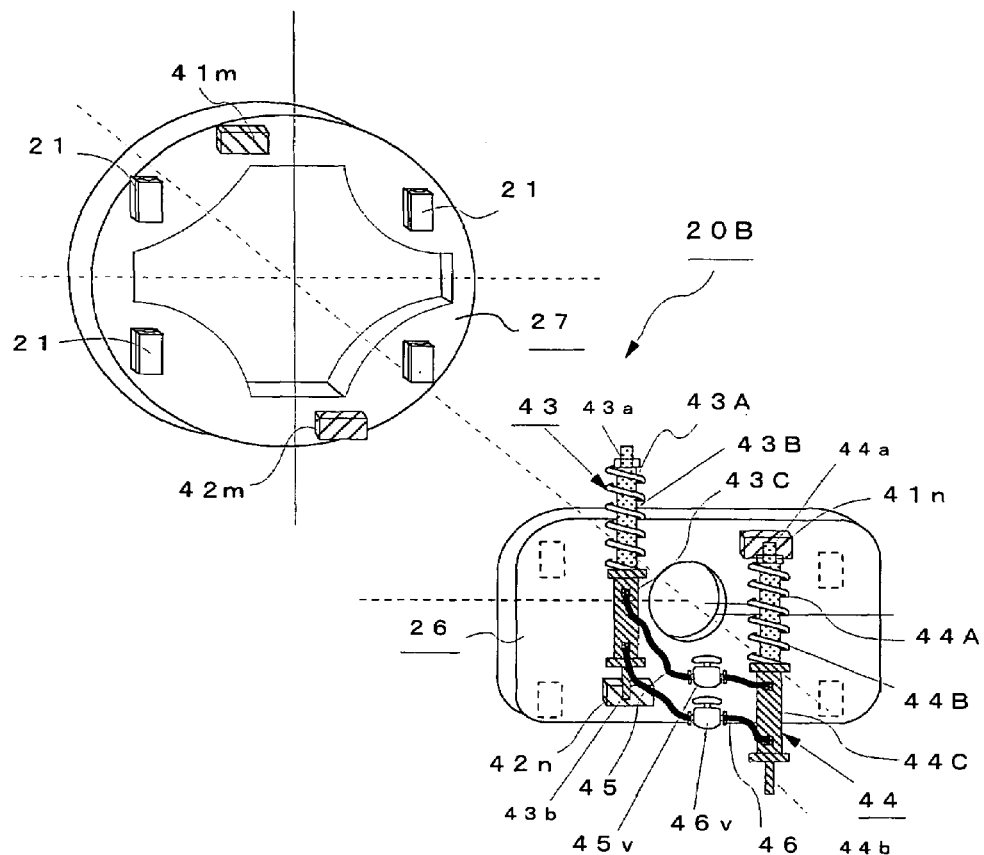
FIG. 59 is a diagram showing the constitution of a damping unit comprising hydraulic absorbers according to the present invention.

As shown in FIG. 59, the non-rotating side case 3a of the motor may be elastically supported to the knuckle 5 in the vertical direction of the vehicle by a damping unit 20B comprising a first hydraulic absorber 43 which comprises a spring 43A, piston 43B and hydraulic cylinder 43C and has a movable end 43a connected to the motor attachment plate 27 and a fixed end 43b connected to the knuckle attachment plate 26 and a second hydraulic absorber 44 which comprises a spring 44A, piston 44B and hydraulic cylinder 44C and has a movable end 44a connected to the knuckle attachment plate 26 and a fixed end 44b connected to the motor attachment plate 27 in place of the above shock absorbers 41 and 42.

Figure 60:
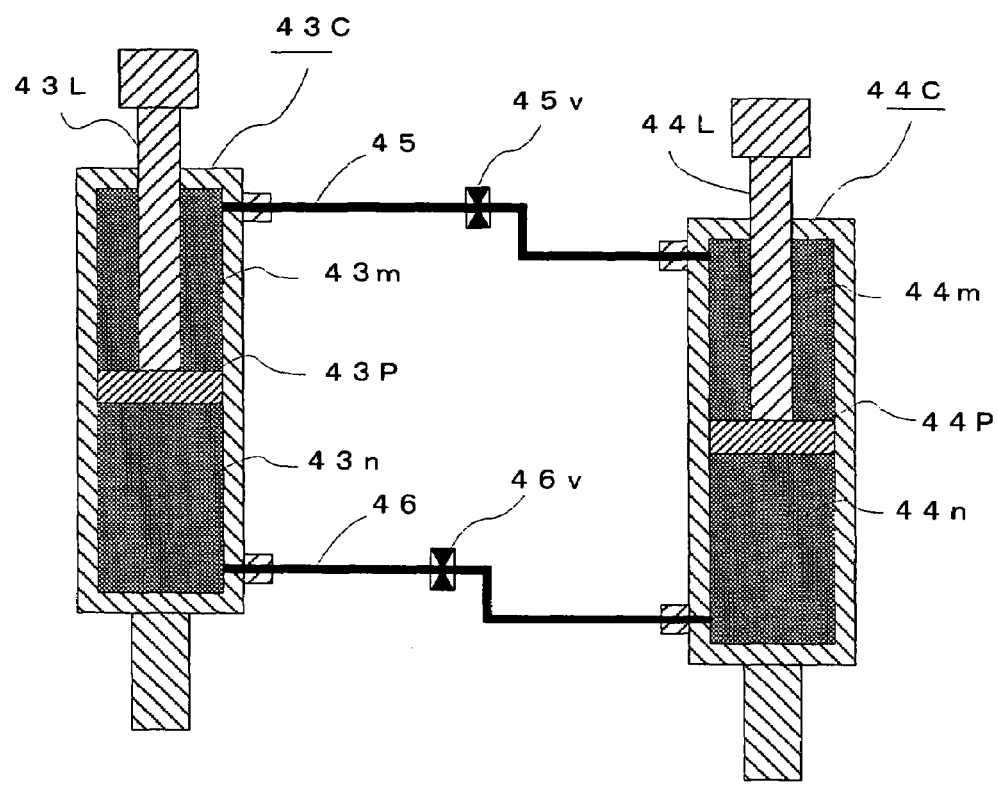
FIG. 60 is a diagram showing the constitution of the hydraulic cylinders of the hydraulic absorbers of the present invention.

As shown in FIG. 60, the piston upper chamber 43m and the piston lower chamber 43n of the hydraulic cylinder 43C constituting the first hydraulic absorber 43 having the above movable end 43a connected to the motor side are connected to the piston upper chamber 44m and the piston lower chamber 44n of the hydraulic cylinder 44C constituting the second hydraulic absorber 44 having the movable end 44a connected to the unsprung side of the vehicle by working oil passages 45 and 46 having independent valves (orifices) 45v and 46v, respectively.

Thereby, the amount of working oil flowing into the working oil passage 45 from the piston upper chamber 43m of the hydraulic cylinder 43C becomes the same as the amount of working oil flowing into the piston upper chamber 44m of the above hydraulic cylinder 44C, and the amount of working oil flowing into the working oil passage 46 from the piston lower chamber 44n of the above hydraulic cylinder 44C becomes the same as the amount of oil flowing into the piston lower chamber 43n of the hydraulic cylinder 43C. Therefore, when the piston rod 43L connected to the piston 43P of the above hydraulic cylinder 43C expands, the piston rod 44L connected to the piston 44P of the above hydraulic cylinder 44C contracts with the same stroke as the piston rod 43L of the above hydraulic cylinder 43C. The pistons 43B and 44B of the first and second hydraulic absorbers 43 and 44 onto which the springs 43A and 44A are fitted expand and contract according to the expansion and contraction of the above piston rods 43L and 44L. Therefore, even when the motor 3 moves in the vertical direction, elastic force can be always obtained by any one of the hydraulic absorbers.

As the hydraulic absorbers 43 and 44 are interconnected as described above in this embodiment, the piston upper chambers 43m and 44m and the piston lower chambers 43n and 44n of the hydraulic cylinders 43C and 44C should be connected to each other, thereby making it possible to eliminate a reservoir tank and reduce the size and weight of the apparatus.

Embodiment 5

In the above Embodiments 1 to 4, the flexible coupling 10 which comprises the plurality of hollow disk-like plates 11A to 11C and the direct-acting guides 12A and 12B for guiding the adjacent plates 11A and 11B and the adjacent plates 11B and 11C in the radial direction of the disk is used as the drive force transmission mechanism. By using a flexible coupling comprising a plurality of cross guides in place of the above flexible coupling 10, drive force can be transmitted without fail and the apparatus can be reduced in weight, thereby making it possible to reduce the unsprung mass and further reduce variations in the ground-contact load of the tire as compared with the above prior art.

Figure 61:
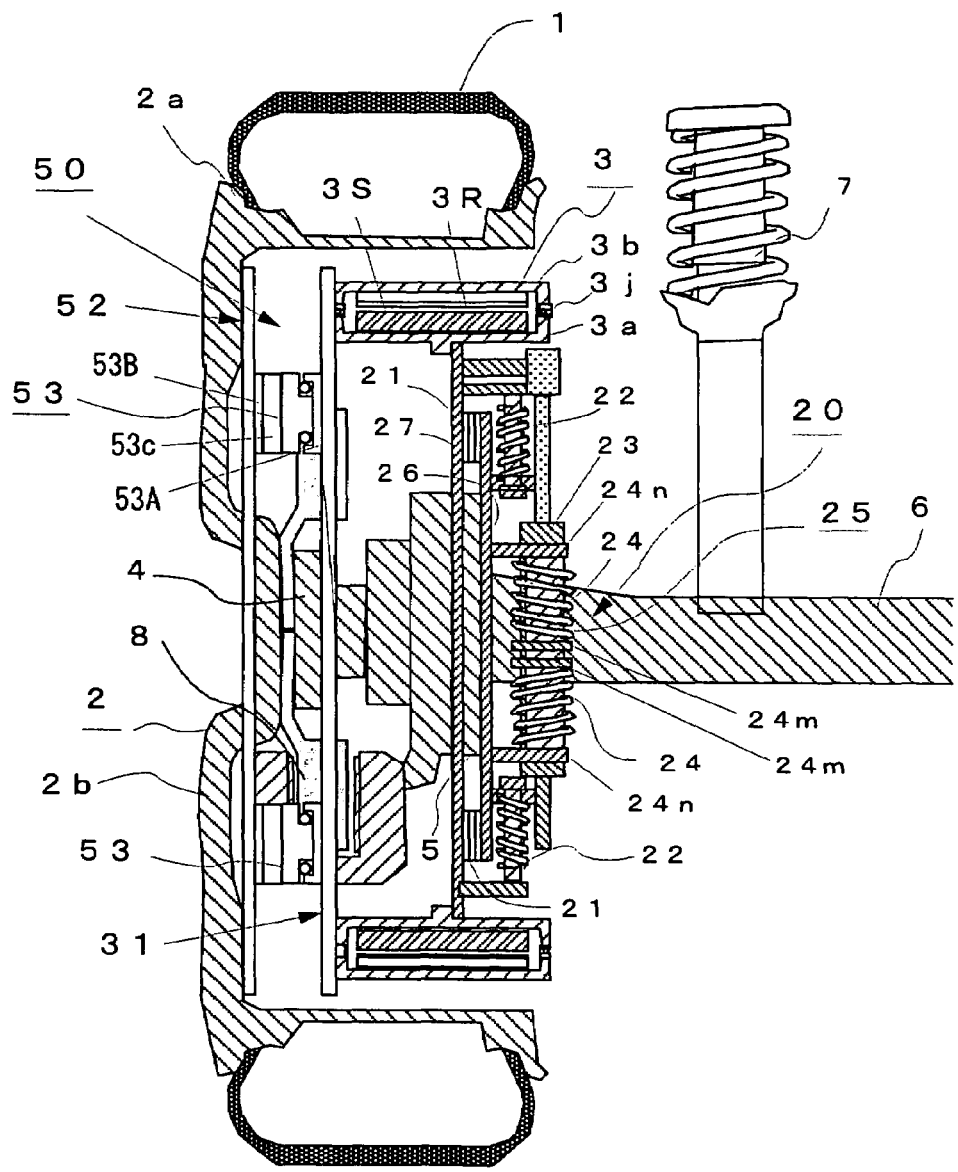
FIG. 61 is a longitudinal sectional view showing the constitution of an in-wheel motor system according to Embodiment 5 of the present invention.

FIG. 61 shows the constitution of an in-wheel motor system according to Embodiment 5. In FIG. 61, reference numeral 1 denotes a tire, 2 a wheel composed of a rim 2a and a wheel disk 2b, and 3 an outer rotor type in-wheel motor comprising a motor stator (to be referred to as "stator" hereinafter) 3S fixed to a non-rotating side case 3a installed on an inner side in the radial direction and a motor rotor (to be referred to as "rotor" hereinafter) 3R fixed to a rotating side case 3b rotatably connected to the above non-rotating side case 3a by a bearing 3j and installed on an outer side in the radial direction.

Numeral 4 denotes a hub portion connected to the rotary shaft of the wheel 2, 5 a knuckle as a frame dress-up part of the vehicle, connected to an axle 6, 7 a suspension member composed of a shock absorber or the like, 8 a brake unit mounted to the above hub portion 4, 20 a damping unit for connecting the non-rotating side case 3a of the motor to the knuckle 5 as a frame dress-up part of the vehicle, which comprises two plates 26 and 27 whose moving directions are limited to the vertical direction of the vehicle by the direct-acting guides 21 and which are interconnected by first spring elements 22 movable in the vertical direction of the vehicle and dampers 25 with a spring element, each comprising a damper 23 and a second spring element 24 connected to the damper 23 in series, arranged parallel to the first spring elements 22, and 50 a flexible coupling comprising a hollow-disk like motor side plate 51 mounted to the rotating side case 3b of the motor, a hollow disk-like wheel side plate 52 mounted to the wheel 2, and a plurality of cross guides 53 for connecting the plates 51 and 52.

Figure 62:
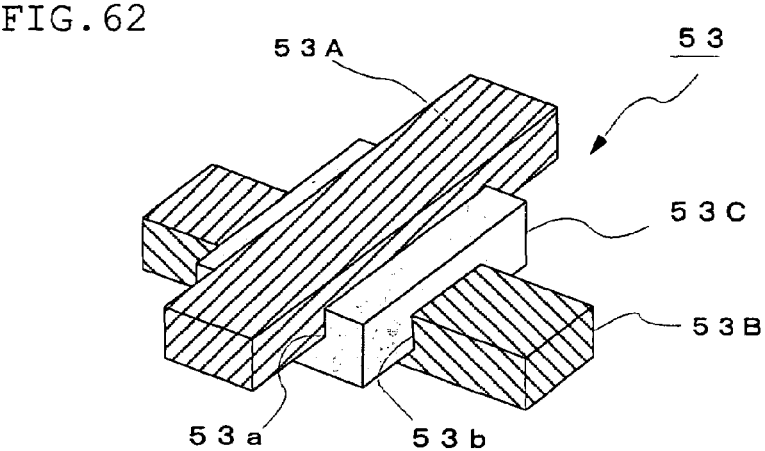
FIG. 62 is a diagram showing the constitution of a cross guide according to Embodiment 5.

The cross guides 53 which are each a combination of direct-acting guides whose axes cross each other as shown in FIG. 62 each consist of a motor side guide rail 53A and a wheel side guide rail 53B both of which are beam-like members and a cross guide body 53C having guide grooves 53a and 53b for guiding the above guide rails 53A and 53B, formed in the top surface and under surface of a rectangular member. Thereby, the motor side guide rail 53A and the wheel side guide rail 53B can move along the guide grooves 53a and 53b of the cross guide body 53C in crossing directions.

Figure 63:
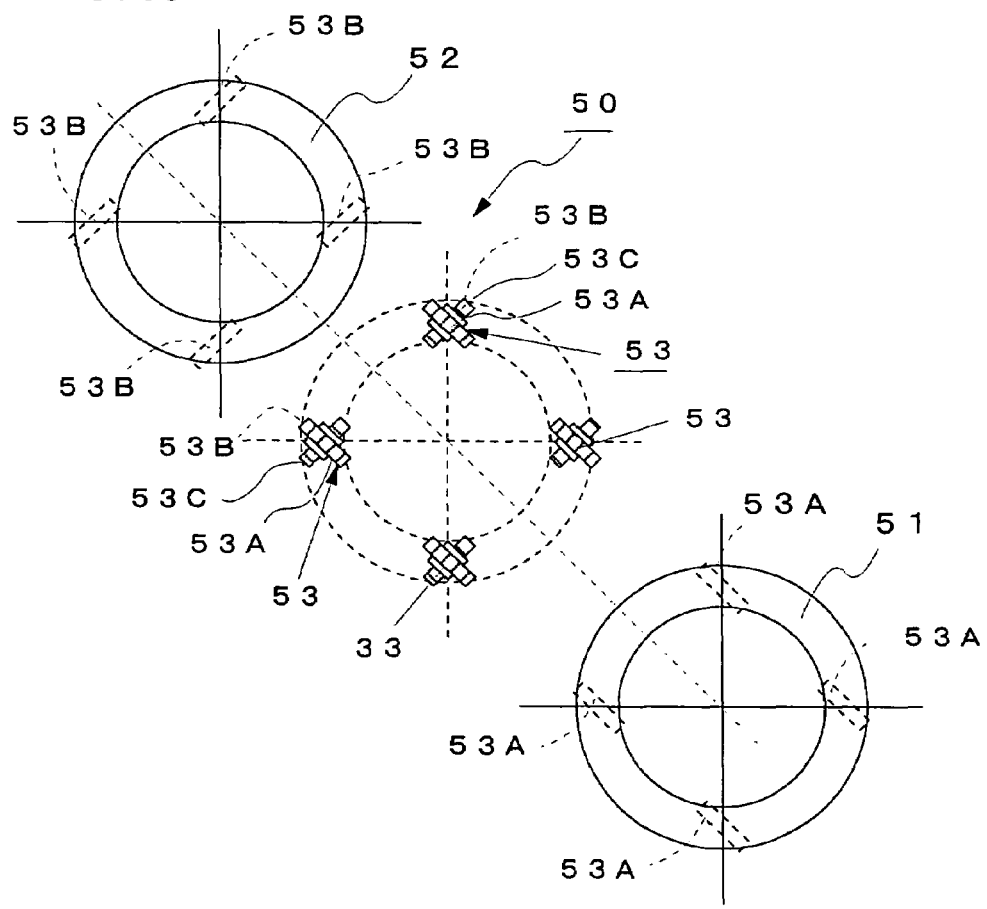
FIG. 63 is a diagram showing an example of a flexible coupling according to Embodiment 5.

In this embodiment, as shown in FIG. 63, four of the above cross guides 53 (interval of 90°) are interposed between the motor side plate 51 and the wheel side plate 52 at equal intervals (90°), and all the motor side guide rails 53A out of the cross guides 53 are arranged such that all of their moving directions become 45° from the radial direction of the rotor 3R. As a result, all the moving directions of the motor side guide rails 53A are the same (45° directions) and all the moving directions of the wheel side guide rails 53B become perpendicular to the moving directions of the motor side guide rails 53A.

In the above constitution, torque from the rotating side case 3b of the in-wheel motor 3 is first applied to the motor side guide rails 53A through the motor side plate 51. The circumferential-direction force applied to the motor side guide rails 53A is transmitted to the wheel side guide rails 53B through the cross guide bodies 53C to drive the wheel 2.

Figure 64:
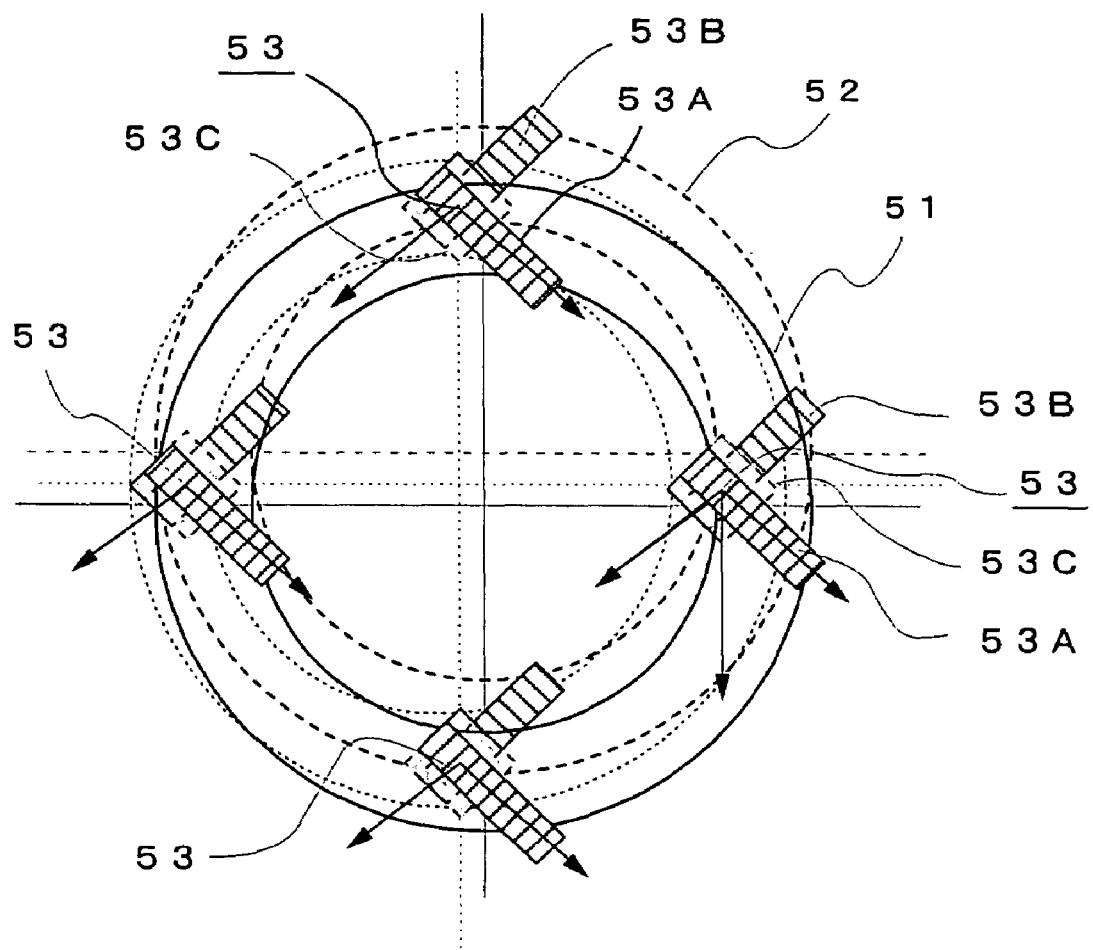
FIG. 64 is a diagram for explaining the operation of the flexible coupling.

At this point, force for turning in the circumferential direction and force for pushing outward in the radial direction are applied to the cross guide bodies 53C by input from the motor side guide rails 53A and reaction from the wheel side guide rails 53B as shown in FIG. 64.

However, although the motor side guide rails 53A and the wheel side guide rails 53B move in the turning direction, they always try to keep their crossing directions and therefore, force for pushing the cross guides 53 outward in the radial direction is balanced with the twist reaction of the cross guide bodies 53C. As a result, as eccentricity can be absorbed only by the plurality of cross guides 53, torque from the rotor 3R can be transmitted to the wheel 2 smoothly.

According to this Embodiment 5, in the in-wheel motor system in which the non-rotating side case 3a for supporting the stator 3S of the in-wheel motor 3 is connected by the damping mechanism 20 in such a manner that it can move in the vertical direction of the vehicle, the rotating side case 3b for supporting the rotor 3R and the wheel 2 are interconnected by the flexible coupling 50 which comprises a plurality of cross guides 53 arranged in such a manner that the moving directions of the motor side guide rails 53A are all 45° from the radial direction of the rotor 3R and all the moving directions of the wheel side guide rails 53B become perpendicular to the moving directions of the above motor side guide rails 53A, thereby making it possible to transmit the drive force of the motor 3 to the wheel 2 without fail.

Since the intermediate plate can be eliminated, the drive force transmission mechanism is reduced in weight, vibration to be transmitted to the motor 3 can be greatly reduced, and the inertia of the drive system can be made small. Also, the degree of design freedom can be improved as there is no need of making a predetermined clearance in the wheel.

Further, since the moving directions of the motor side guide rails 53A and the moving directions of the wheel side guide rails 53B can be limited to crossing directions by using the cross guides 53, assembly is easy, and the operation of the flexible coupling 50 can be stabilized.

In the above Embodiment 5, four cross guides 53 are used. The number of cross guides 53 is not limited to 4 and may be 2, 3 or 5 or more. The cross guides 53 are preferably interposed between the motor side plate 51 and the wheel side plate 52 at equal intervals.

The guide rails 53A and 53B of the cross guides 53 are not limited to a beam-like shape as shown in FIG. 62 and may be members having a projection to be fitted in the guide grooves 53a and 53b of the cross guide. In order to slide the above guide rails 53A and 53B more smoothly, a plurality of steel balls may be placed between the above guide grooves 53a and 53b and the projections of the above guide rails 53A and 53B.

Embodiment 6

In a vehicle having the above dynamic damper type in-wheel motor 3, as the above motor 3 vibrates vertically separately from the frame dress-up part in structure, a certain measure of space is needed between the above motor 3 and the wheel 2. Therefore, when the vehicle runs on a graveled road and gravel enters this space, the motor 3 vibrates in the wheel 2 and may be damaged. For the smooth operation of the flexible coupling 10, it is necessary to prevent the deformation of the coupling portion (direct-acting guides 12A and 12B and hollow disk-like plates 11A to 11C around them) by a flying stone or the entry of dust into the direct-acting guides 12A and 12B.

Since the motor 3 and the frame dress-up part move separately, a bearing for the motor shaft must be installed separately from a bearing for the axle. When a hollow motor such as the above motor 3 is used, the bearing 3j becomes large and its speed becomes high at the time of running. Therefore, a dust seal which is generally used for sealing a small-diameter bearing cannot be used, whereby water may enter the inside of the motor 3 to damage the motor 3 when the vehicle goes through a puddle.

In this embodiment, an effective water and dust preventing measure is taken for the above in-wheel motor system to improve the reliability of the above in-wheel motor system.

Figure 65:
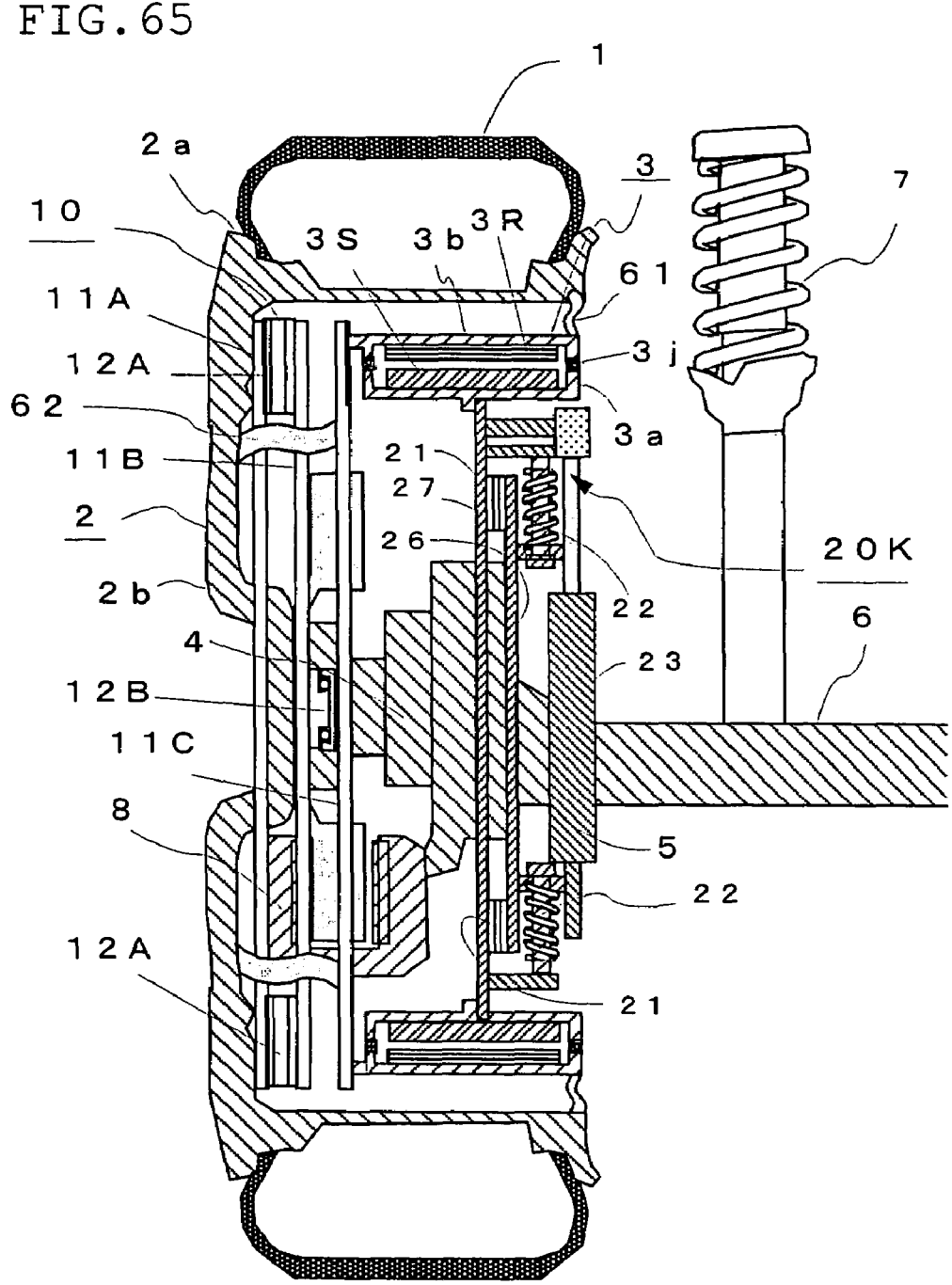
FIG. 65 is a longitudinal sectional view showing the constitution of an in-wheel motor system according to Embodiment 6 of the present invention.

FIG. 65 shows the constitution of an in-wheel motor system according to Embodiment 6. In FIG. 65, reference numeral 1 denotes a tire, 2 a wheel composed of a rim 2a and a wheel disk 2b, and 3 an outer rotor type in-wheel motor comprising a motor stator (to be referred to as "stator" hereinafter) 3S fixed to a non-rotating side case 3a installed on an inner side in the radial direction and a motor rotor (to be referred to as "rotor" hereinafter) 3R fixed to a rotating side case 3b rotatably connected to the above non-rotating side case 3a by a bearing 3j and installed on an outer side in the radial direction.

Numeral 4 denotes a hub portion connected to the rotary shaft of the wheel 2, 5 a knuckle as a frame dress-up part of the vehicle, connected to a suspension arm 6, 7 a suspension member composed of a shock absorber or the like, and 8 a brake unit composed of a brake disk mounted to the above hub portion 4.

Numeral 10 is a flexible coupling for connecting the rotating side case 3b of the motor to the wheel 2, and 20K is a damping mechanism for elastically supporting the non-rotating side case 3a to the above suspension arm 6.

61 is a first annular dust boot interposed between the end opposite to the end to which the above flexible coupling 10 is mounted of the rotating side case 3b of the motor and the end opposed to the above end of the wheel 2, and 62 is a second annular dust boot interposed between the end to which the above flexible coupling 10 is mounted of the above rotating side case 3b and the end opposed to the above end of the wheel 2 to store the above flexible coupling 10.

Figure 66:
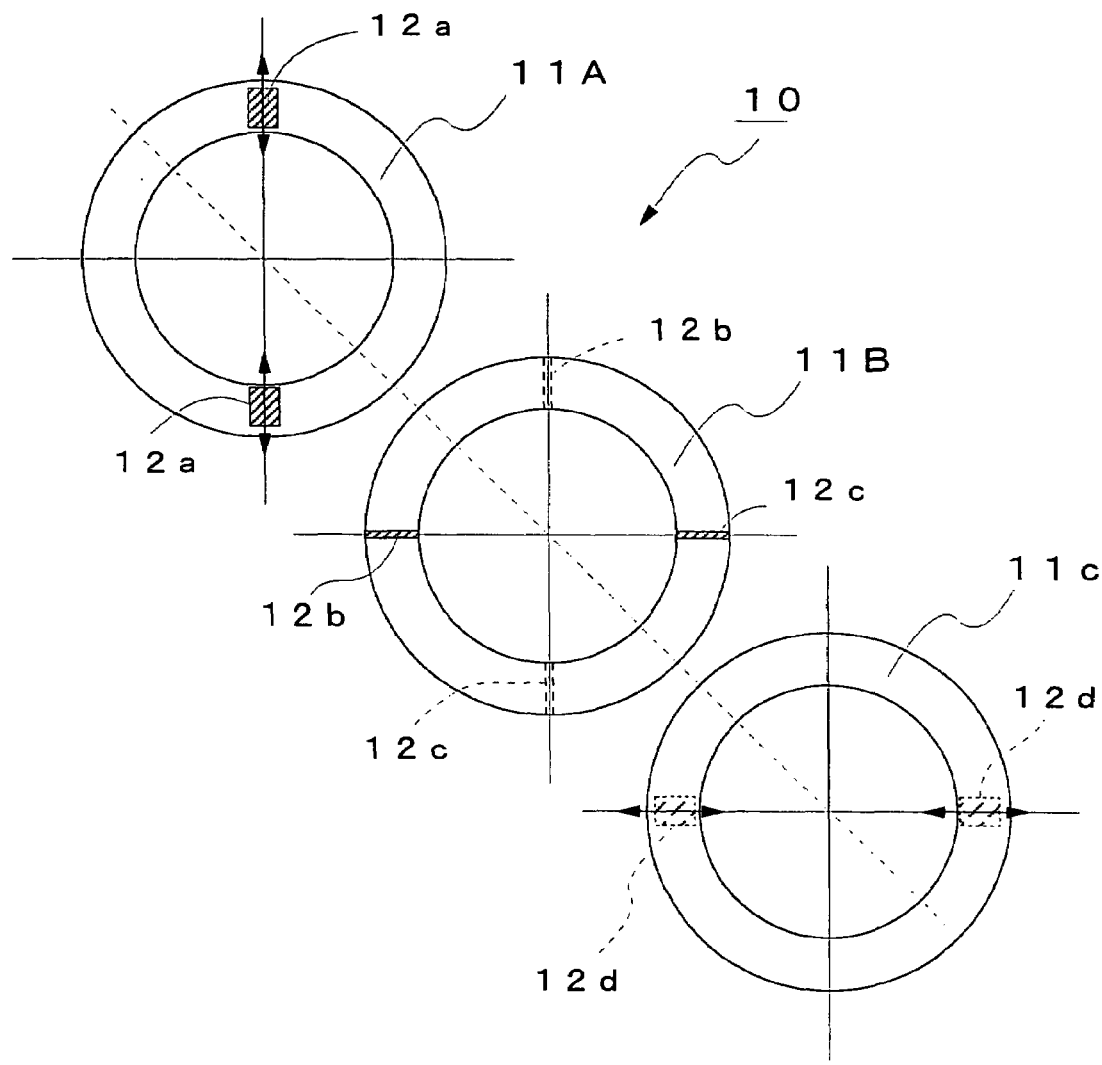
FIG. 66 is a diagram showing an example of a damping mechanism according to Embodiment 6.

FIG. 66 shows an example of the flexible coupling 10. This flexible coupling 10 comprises a plurality of hollow disk-like plates 11A to 11C and direct-acting guides 12A and 12B on the front and rear sides of the central hollow disk-like plate 11B in such a manner that their moving directions cross each other. More specifically, the hollow disk-like plates 11A and 11B are interconnected by the direct-acting guide 12A which consists of guide members 12a and 12a mounted to the surface opposite to the wheel 2 of the plate 11A positioned on the wheel 2 side at an interval of 180° and guide rails 12b and 12b to be mated with the above guide members 12a and 12a, installed on the above plate 11A side of the intermediate plate 11B, and the hollow disk-like plates 11B and 11C are interconnected by the direct-acting guide 12B which consists of guide rails 12c and 12c mounted to the rear side of the above plate 11B at an interval of 180° in directions 90° from the above guide rails 12b and 12b and guide members 12d and 12b to be mated with the above guide rails 12c and 12c, installed on the above plate 11B side of the plate 11C on the motor 3 side. Thereby, the motor shaft and the wheel shaft can be eccentrically interconnected in any direction, whereby it is possible to transmit torque from the rotating side case 3b to the wheel 2 efficiently.

Figure 67:
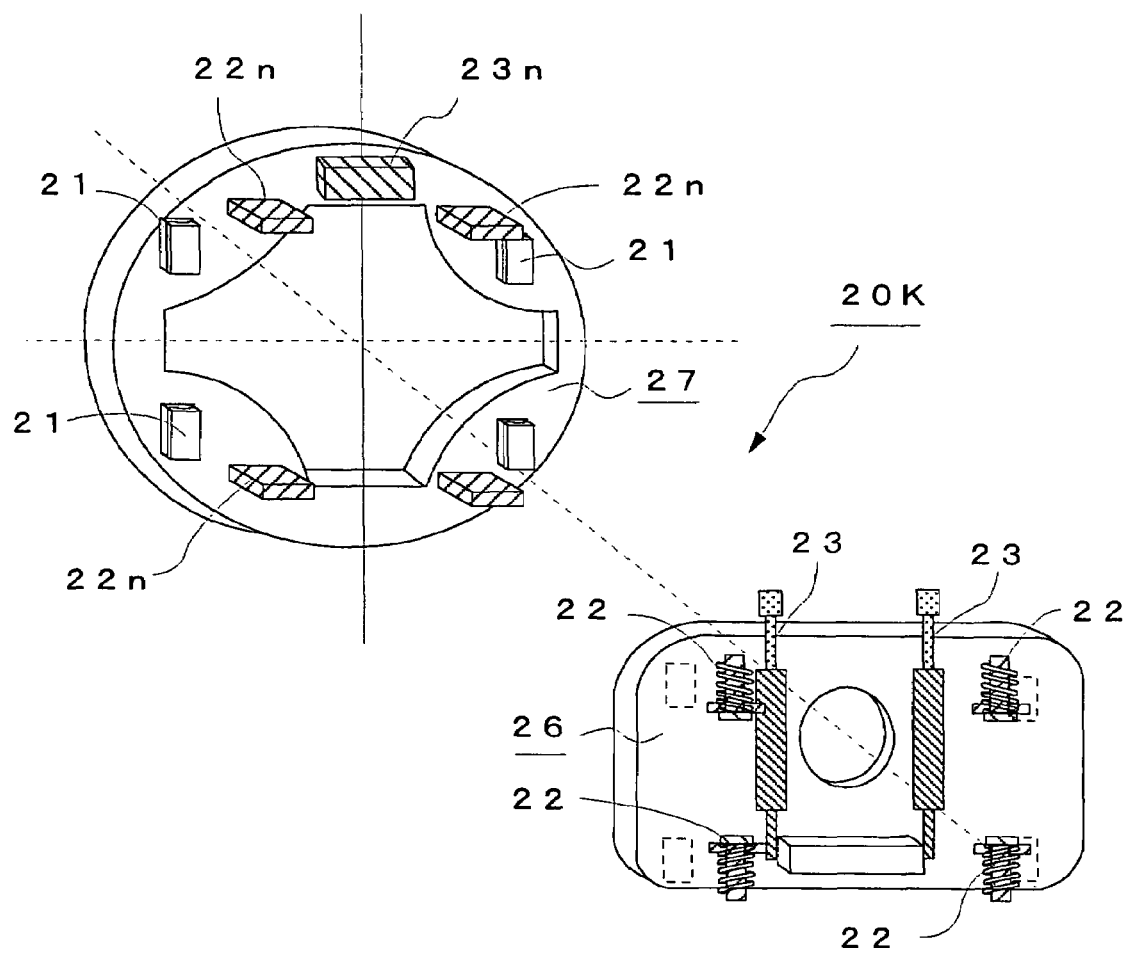
FIG. 67 is a diagram showing an example of a flexible coupling according to Embodiment 6.

FIG. 67 shows an example of the damping mechanism 20K. This damping mechanism 20K comprises two plates 26 and 27 whose moving directions are limited to the vertical direction of the vehicle by direct-acting guides 21 and which are interconnected by spring elements 22 and dampers 23 movable in the vertical direction of the vehicle. More specifically, four spring elements 22 which expand and contract in the vertical direction of the vehicle are installed in the four corners of the knuckle attachment plate 26 positioned on the suspension arm 6 side, two dampers 23 which expand and contract in the vertical direction are installed on the inner side of the spring elements 22, and the above plates 26 and 27 are interconnected by the four direct-acting guides 21 arranged symmetrical to the center of the plate.

Thereby, the above in-wheel motor 3 is float mounted to a frame dress-up part so that the motor itself can serve as the weight of a dynamic damper, thereby making it possible to improve ground contacting performance and riding comfort when the vehicle runs on a rough road.

Figure 68:
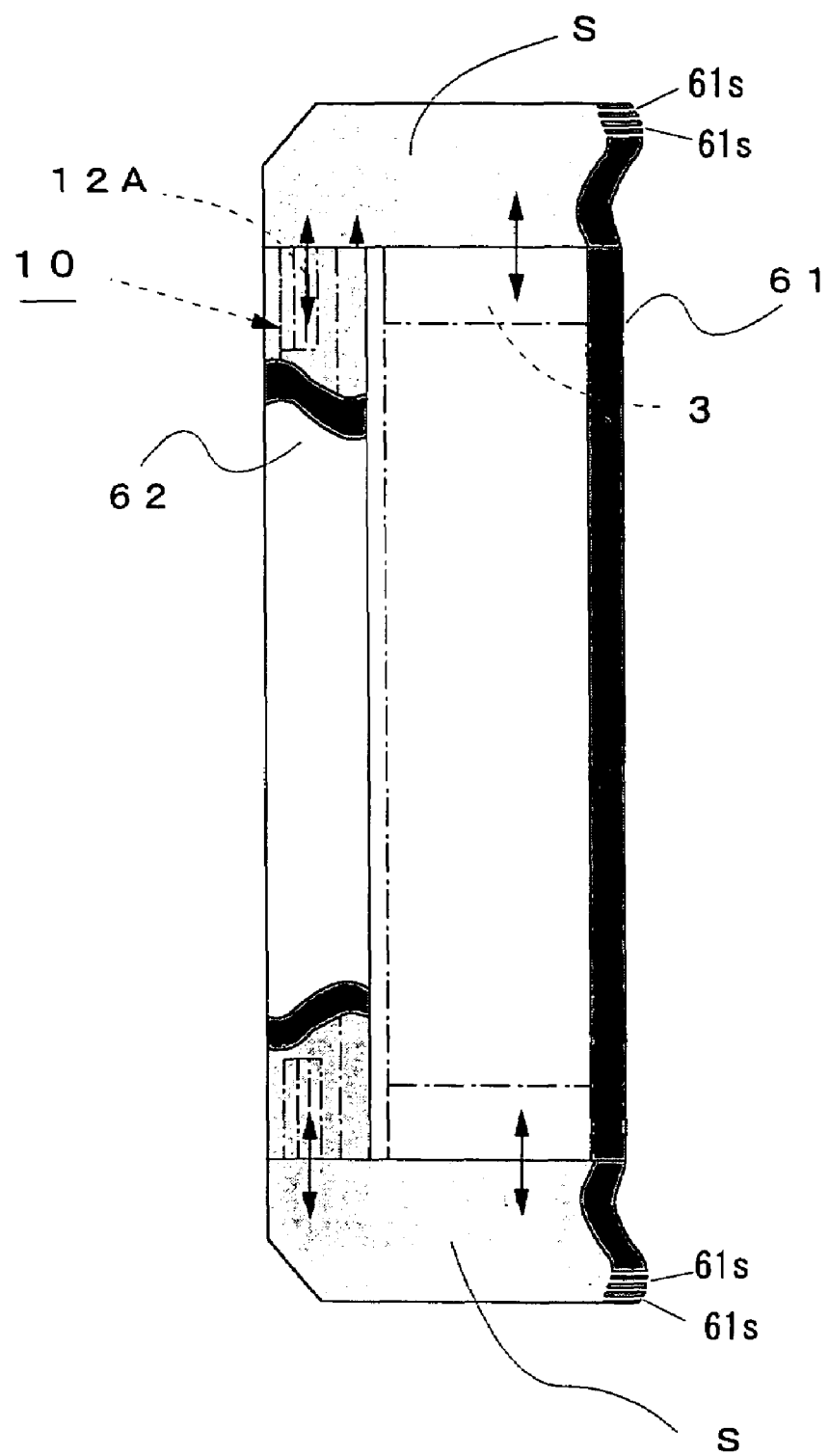
FIG. 68 is a diagram showing the installation of annular dust boots.

In the above in-wheel motor system in which the motor has a dynamic damper function, as the motor shaft can move in the radial direction separately from the axle, as shown in FIG. 68, a space S must be formed between the motor 3 and the wheel 2. In this embodiment, the substantially hollow disk-like first annular dust boot 61 having a wavy sectional form in the direction perpendicular to the axis is installed between the suspension arm 6 side of the rotating side case 3b of the motor, that is, the end on a side opposite to the flexible coupling 10 mounting side and the end opposite to the end of the wheel 2 to form a partition so that the above space S is blocked from the outside. Since the entry of a stone and dust into the above space S can be thereby prevented, the reliability of the in-wheel motor system can be improved.

Since the stiffness in the radial direction of the above first annular dust boot 61 can be reduced by making wavy the sectional form in the direction perpendicular to the axis of the above first annular dust boot 61, the movement of the motor 3 in the wheel 2 can be made smoother. Further, in this embodiment, a plurality of holes 61s are formed in the vicinity of the mounting portion on the wheel 2 side of the above first annular dust boot 61 so that if water enters the above space S, it can be discharged from the above holes 61s to the outside by centrifugal force during driving.

In this embodiment, as shown in FIG. 65 and FIG. 68, the substantially hollow disk-like second annular dust boot 62 having a wavy sectional form in the direction perpendicular to the axis is mounted on the inner side of the above direct-acting guides 12A and 12B between the hollow disk-like plate 11A on the wheel disk 2b side and the hollow disk-like plate 11C on the motor side of the flexible coupling 10 so as to block the coupling portion of the above flexible coupling 10 from the outside.

That is, since the deformation of the above coupling portion by a flying stone and the entry of dust into the direct-acting guides 12A and 12B can be prevented by forming a partition on the inner side of the direct-acting guides 12A and 12B of the above flexible coupling 10 with the above second annular dust boot 62, the above flexible coupling 10 can be moved smoothly and the reliability of the in-wheel motor system can be improved.

Since the stiffness in the radial direction of the above second annular dust boot 62 can be reduced by making wavy the sectional form in the direction perpendicular to the axis of the above second annular dust boot 62, the flexible coupling 10 can be also moved smoothly.

According to this Embodiment 6, in the in-wheel motor system in which the rotating side case 3a of the motor and the wheel 2 are interconnected by the flexible coupling 10 and the non-rotating side case 3a of the motor is connected to the knuckle 5 by the damping mechanism 20K, the space S formed between the above motor 3 and the wheel 2 is blocked from the outside by the first annular dust boot 61 having a wavy sectional form in the direction perpendicular to the axis to prevent the entry of dust and a stone into the above space S, and the partition is formed on the inner side of the above flexible coupling 10 by the second annular dust boot 62 to prevent the deformation of the coupling portion by a flying stone and the entry of dust into the direct-acting guides 12A and 12B in order to move the above flexible coupling 10 smoothly. Therefore, the reliability of the in-wheel motor system can be significantly improved.

Embodiment 7

Figure 69:
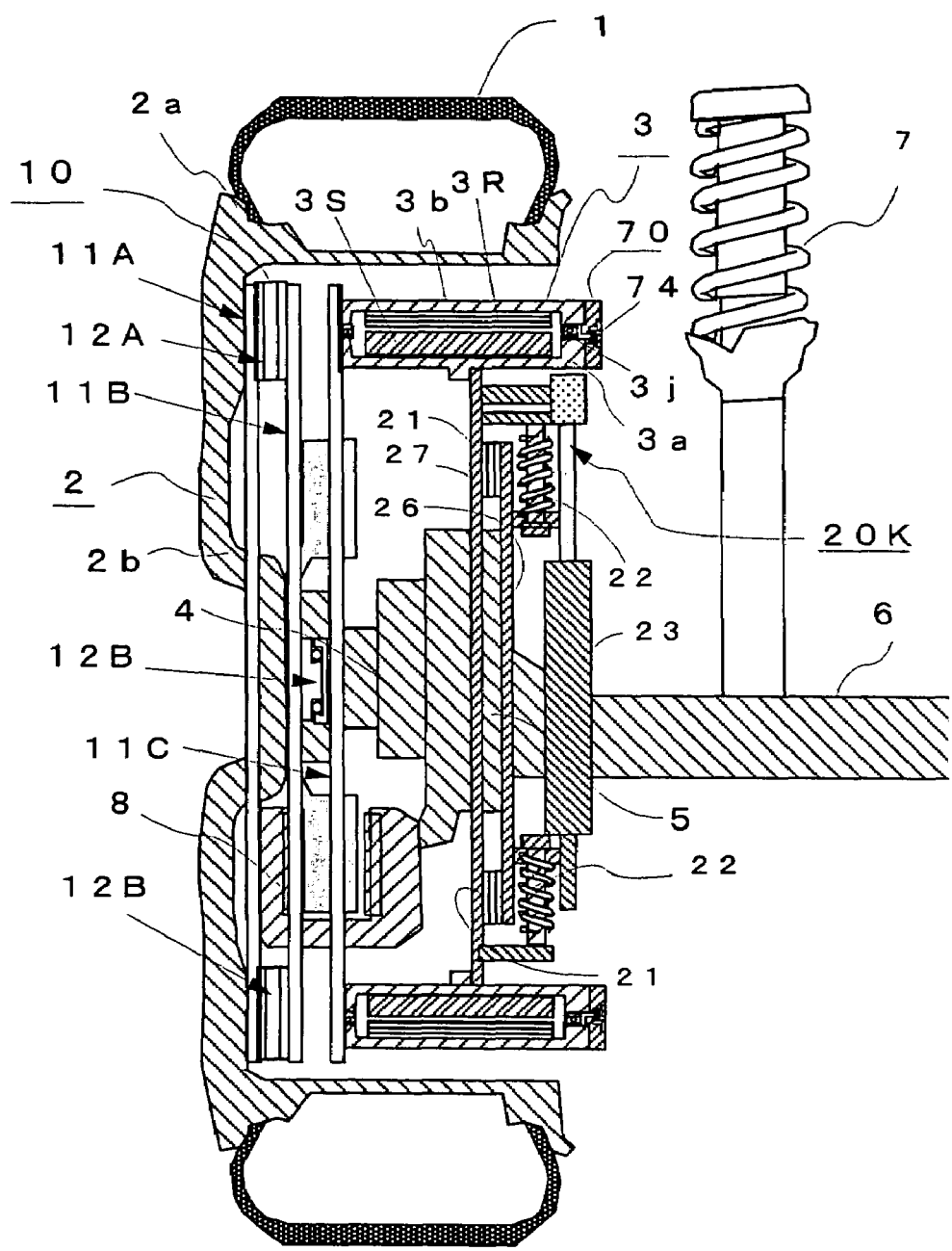
FIG. 69 is a longitudinal sectional view showing the constitution of an in-wheel motor system according to Embodiment 7 of the present invention.

FIG. 69 shows the constitution of an in-wheel motor system according to Embodiment 7. In FIG. 69, reference numeral 1 denotes a tire, 2 a wheel, 3 an outer rotor type in-wheel motor comprising a motor stator 3S fixed to a non-rotating side case 3a installed on an inner side in the radial direction and a motor rotor 3R fixed to a rotating side case 3b rotatably connected to the above non-rotating side case 3a by a bearing 3j and installed on an outer side in the radial direction, 4 a hub portion, 5 a knuckle, 6 a suspension arm, 7 a suspension member, 8 a brake unit, 10 a flexible coupling for interconnecting the rotating side case 3b of the motor to the wheel 2, 20K a damping mechanism for elastically supporting the non-rotating side case 3a of the motor to the above suspension arm 6, and 70 water-proofing means for closing the space in the axial direction of the above motor.

Figure 70:
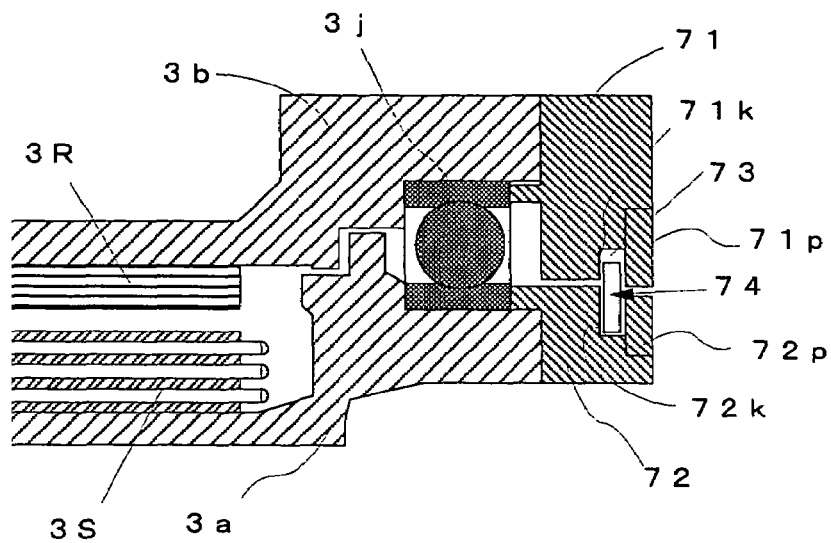
FIG. 70 is a diagram showing the details of water-proofing means according to Embodiment 7.

As shown in FIG. 70, this water-proofing means 70 is constructed such that stepped (two-stepped) notches 71k and 72k are formed in the opposed surfaces of bearing fixing covers 71 and 72 mounted on the exterior side of the bearing 3j of the motor, cover members 71p and 72p are installed on the exterior sides of the bearing fixing covers 71 and 72 in the above notches 71k and 72k to form a hollow portion 73, and a resin ring 74 constituting a hollow disk-like partition able to move in the axial direction of the motor is stored in the hollow portion 73.

Figure 71A:
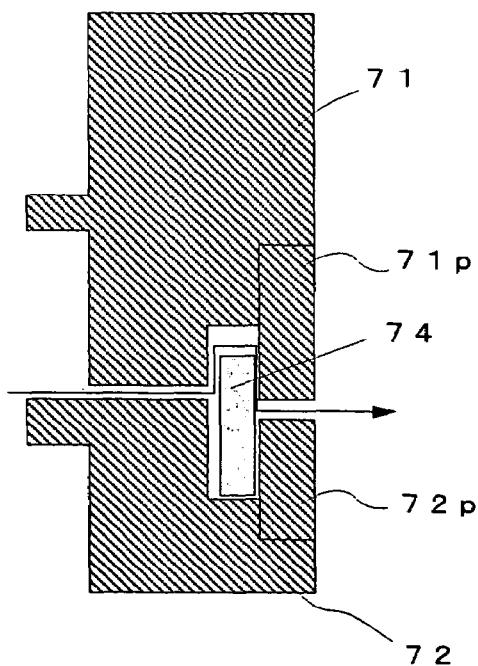
FIGS. 71(a) and 71(b) are diagrams showing the movement of a resin ring according to Embodiment 7.

Thereby, as shown in FIG. 71(a), since the inside temperature of the motor 3 is increased by heat generated by the motor 3 when the motor 3 runs (turns) the inside pressure of the motor becomes higher than the outside air pressure, and the above resin ring 74 moves outward in the axial direction of the motor, that is, toward the above cover members 71p and 72p. Therefore, even when the vehicle goes through a puddle having a certain measure of depth, the entry of water into the motor 3 can be prevented by this pressure difference.

When the motor 3 runs, the above resin ring 74 turns together with the rotation side, expands by its centrifugal force and is pressed against the bearing fixing cover 71 of the rotating side case 3b, whereby the movement of the resin ring 74 in the axial direction of the motor may be prevented. To cope with this, in this embodiment, when the motor 3 turns, the space in the radial direction between the above resin ring 74 and the bearing fixing cover 71 on the rotation side is made larger than the space in the radial direction between the above resin ring 74 and the bearing fixing cover 72 on the non-rotation side to prevent the above resin ring 74 from turning together with the rotation side. As a result, the above resin ring 74 can move smoothly in the axial direction.

Figure 71B:
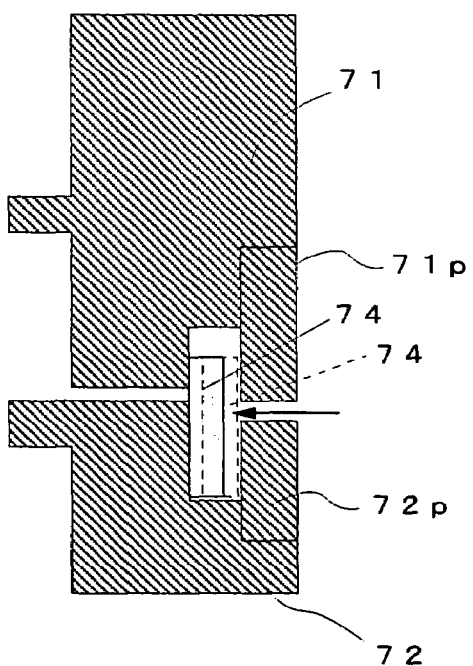

When the vehicle stops in a puddle, as shown in FIG. 71(b), water enters from the space between the above cover members 71p and 72p. The above resin ring 74 is moved inward in the axial direction of the motor by the pressure to close the space between the rotor and the stator formed by the above bearing fixing covers 71 and 72, thereby making it possible to prevent the entry of water into the motor 3.

In this Embodiment 7, the stepped notches 71$k$ and 72$k$ are formed in the opposed surfaces of the bearing fixing covers 71 and 72 mounted to the exterior side of the bearing 3$j$ of the motor, the cover members 71$p$ and 72$p$ are mounted to the exterior sides of the bearing fixing covers 71 and 72 in the above notches 71$k$ and 72$k$ to form the hollow portion 73, and the resin ring 74 constituting the hollow disk-like partition which can move in the axial direction of the motor is stored in this hollow portion 73 to provide water-proofing means 70 so as to close the space in the axial direction of the motor 3. Therefore, even when a hollow motor such as the above in-wheel motor 3 is used, the entry of water into the motor 3 can be prevented and the reliability of the in-wheel motor system can be improved.

In the above Embodiments 6 and 7, there has been described a water-proofing and dust-preventing measure for the in-wheel motor system constituted such that the non-rotating side case 3$a$ for supporting the stator 3S is elastically supported to the knuckle 5 by the damping mechanism 20K comprising two plates 26 and 27 which are interconnected by the spring elements 22 and the dampers 23 movable in the vertical direction of the vehicle and whose moving directions are limited to the vertical direction of the vehicle by the direct-acting guides 21. It is needless to say that the present invention is not limited to this and can be applied to an in-wheel motor system having a hollow motor in which a direct-drive motor installed on a wheel portion and a frame dress-up part vibrate in the vertical direction separately.

INDUSTRIAL FEASIBILITY

As having been described above, according to the present invention, an in-wheel motor system in which an in-wheel motor is mounted to an unsprung portion of a vehicle by a damping member or a damping unit, the above motor is mounted to the unsprung portion of the vehicle by a damping member comprising spring elements and dampers with a spring element, each comprising a spring element and a damper element connected to the spring element in series and arranged parallel to the above spring elements. Therefore, as compared with the dynamic damper type in-wheel motor system of the prior art, variations in the ground-contact load of the tire can be reduced and the road holding properties can be improved.

When the above motor is mounted to the unsprung portion of the vehicle by spring elements, a damper element and a damper with a spring element, comprising a spring element and a damper element connected to the spring element in series and arranged parallel to the above spring elements and the damper element, the road holding properties can be further improved.

By employing the in-wheel motor system of the present invention, an in-wheel motor car having excellent space efficiency and drive force transmission efficiency and small variations in the grounding force of the tire can be realized.

Since the in-wheel motor is connected to an unsprung portion of the vehicle by a plurality of shock absorbers which move in the vertical direction of the vehicle and the movable end of at least one of the above shock absorbers is connected to the motor side and the fixed end thereof is connected to the unsprung side, the movable end of at least one of the other shock absorbers is connected to the unsprung side and the fixed end thereof is connected to the motor side, the shock absorber unit for supporting the in-wheel motor can be made compact and light in weight, variations in the grounding force of the tire can be reduced, and the road holding properties can be improved.

Since the motor rotor and the wheel are interconnected by a plurality of cross guides which are arranged in the circumferential direction of the rotor at equal intervals and move in crossing directions on the front and rear sides, the moving directions of the guide members on the front and rear sides can be restricted without fail and the drive transmission mechanism can be made small in size and light in weight, thereby making it possible to reduce the inertia of the drive system. By reducing the size and weight, vibration transmitted to the motor can be greatly suppressed.

Since the motor side guide rails of the above cross guides are arranged such that all of their moving directions become 45° from the radial direction of the motor rotor and the wheel side guide rails are arranged such that all of their moving directions become perpendicular to the moving directions of the above motor side guide rails, buckling deformation can be suppressed and only torque can be transmitted to the wheel without fail. As a result, an in-wheel motor car having excellent space efficiency and drive force transmission efficiency and small variations in the grounding force of the tire can be realized.

What is claimed is:

1. An in-wheel motor system comprising:
an in-wheel motor, installed in a wheel portion and for driving a wheel, the in-wheel motor being mounted to an unsprung portion of a vehicle by a damping member or a damping unit,
wherein, the motor is mounted to the unsprung portion of the vehicle by a damping member comprising a plurality of shock absorbers, each having a spring element and a damper element connected to the spring element in parallel or a damping member comprising either one or more of at least one damper with a spring element, each comprising a spring element and a damper element connected to the spring element in series and at least one composite connection damper whose spring element and damper element connected in parallel are connected to a spring element in series.

2. The in-wheel motor system according to claim 1, wherein the motor is a hollow motor.

3. The in-wheel motor system according to claim 1, wherein the motor is supported to the unsprung portion of the vehicle in the vertical direction by spring elements and dampers with a spring element, each comprising a spring element and a damper element connected to the spring element in series.

4. The in-wheel motor system according to claim 3, wherein the stator side of the motor is supported to a knuckle by first spring elements in the vertical direction, and the stator side and the unsprung portion of the vehicle are interconnected by dampers with a spring element, each comprising a spring element and a damper element connected to the spring element in series and arranged parallel to the first spring elements.

5. The in-wheel motor system according to claim 3, wherein the motor is supported by springs and dampers with a spring element in the horizontal direction in addition to the vertical direction.

6. The in-wheel motor system according to claim 1, wherein the motor is supported to the unsprung portion in the vertical direction by first spring elements, a first damper element and a damper with a spring element, comprising a second spring element and a second damper element connected to the second spring element in series.

7. The in-wheel motor system according to claim 6, wherein the stator side of the motor is supported to the knuckle by the first spring elements and the first damper element arranged parallel to each other in the vertical direction, and the stator side and the unsprung portion are interconnected by a damper with a spring element, comprising a second spring element and a second damper element connected to the second spring element in series and arranged parallel to the first spring elements and the first damper element.

8. The in-wheel motor system according to claim 7, wherein the motor is supported by springs, dampers and dampers with a spring element in the horizontal direction in addition to the vertical direction.

9. The in-wheel motor system according to claim 1, wherein in the damper with a spring element, a cylinder body is connected in series between the damper element and the spring element.

10. The in-wheel motor system according to claim 1, wherein the spring element constituting the damper with a spring element is a metal spring, air spring or rubber spring.

11. The in-wheel motor system according to claim 1, wherein the spring element constituting the damper with a spring element, is mounted on both sides of a piston of the damper an axial direction thereof.

12. The in-wheel motor system according to claim 1, wherein the motor is supported to the unsprung portion of the vehicle in a vertical direction by a composite connection damper whose spring element and damper element connected in parallel are connected to a spring element in series.

13. The in-wheel motor system according to claim 12, wherein the motor is supported to the unsprung portion of the vehicle in the vertical direction by the composite connection damper and a damper element arranged parallel to the composite connection damper.

14. The in-wheel motor system according to claim 12, wherein the composite connection damper is used as a first composite connection damper, a composite connection damper whose spring element and damper element connected in parallel are connected to a damper element in series is used as a second composite connection damper, and the motor is supported to the unsprung portion of the vehicle in the vertical direction by the first composite connection damper and the second composite connection damper.

15. The in-wheel motor system according to claim 14, wherein the cylinder body of the damper element arranged parallel to the spring element is interposed between a damper element connected to the damper element and spring element of the second composite connection damper in series and the spring element.

16. The in-wheel motor system according to claim 12, wherein a cylinder body of the damper element is situated at an other end of the spring element arranged parallel to the damper element of the composite connection damper.

17. The in-wheel motor system according to claim 12, wherein the spring element constituting the composite connection damper is a metal spring, air spring or rubber spring.

18. The in-wheel motor system according to claim 12, wherein the motor is supported to the unsprung portion of the vehicle by a damper and the composite connection damper, or by a plurality of the composite connection dampers in a horizontal direction in addition to the vertical direction.

19. The in-wheel motor system according to claim 1, wherein the plurality of shock absorbers include at least two shock absorbers which differ from each other in one or both of direction and damping factor.

20. The in-wheel motor system according to claim 19, wherein a movable end of at least one of the shock absorbers is connected to the motor side and a fixed end thereof is connected to the unsprung side of the vehicle, and a movable end of at least one of the other shock absorbers is connected to the unsprung side of the vehicle and a fixed end thereof is connected to the motor side.

21. The in-wheel motor system according to claim 20, wherein the shock absorbers are composed of a hydraulic unit having a spring, piston and hydraulic cylinder.

22. The in-wheel motor system according to claim 21, wherein a piston upper chamber and a piston lower chamber of the hydraulic cylinder of the shock absorber whose movable end is connected to the motor side, are connected to a piston upper chamber and a piston lower chamber of the hydraulic cylinder of the other shock absorber whose movable end is connected to the unsprung side by working oil flow passages having an independent valve, respectively.

23. The in-wheel motor system according to claim 1,
wherein a motor rotor and a wheel are interconnected by a plurality of cross guides which are arranged in a circumferential direction of the rotor at equal intervals and whose moving directions cross each other on front and rear sides.

24. The in-wheel motor system according to claim 23, wherein the cross guides are arranged such that moving directions of all motor side guide rails of the cross guides become 45° from a radial direction of the motor rotor and moving directions of all wheel side guide rails become perpendicular to the moving directions of the motor side guide rails.

25. The in-wheel motor system according to claim 24, wherein one or more elastic annular dust boots are installed between the motor and the wheel to block a space formed between the motor and the wheel from outside.

26. The in-wheel motor system according to claim 25, wherein a rotating side case of the motor and the wheel are interconnected by a flexible coupling, and one of the annular dust boots is mounted between an end portion on a side opposite to the flexible coupling mounting side of the rotating side case of the motor and an end opposite thereof.

27. The in-wheel motor system according to claim 26, wherein one of the annular dust boots is provided to block a coupling portion of the flexible coupling from the outside.

28. The in-wheel motor system according to claim 27, wherein the annular dust boot has a wavy sectional form in a direction perpendicular to an axial direction.

29. The in-wheel motor system according to claim 25, wherein a plurality of holes are formed in a vicinity of a wheel side mounting portion of the one or more annular dust boots.

30. The in-wheel motor system according to claim 24, wherein a hollow disk-like partition, which can move in an axial direction of the motor, is provided on an exterior side of a motor bearing for connecting a rotating side case and a non-rotating side case of the motor.

31. The in-wheel motor system according to claim 30, wherein a hollow portion is formed in bearing fixing covers mounted to the exterior side of the motor bearing and the hollow disk-like partition is stored in the hollow portion.

32. The in-wheel motor system according to claim 31, wherein a space in a radial direction between the hollow disk-like partition and the bearing fixing cover, on the rotation side case is made larger than a space in the radial direction between the hollow disk-like partition and the bearing fixing cover on the non-rotation side case.

* * * * *